United States Patent [19]
Reuther

[11] B 3,919,623
[45] Nov. 11, 1975

[54] INDUSTRIAL GAS TURBINE POWER PLANT CONTROL SYSTEM HAVING CAPABILITY FOR EFFECTUATING AUTOMATIC FUEL TRANSFER UNDER LOAD PREFERABLY EMPLOYING A DIGITAL COMPUTER

[75] Inventor: John F. Reuther, Pittsburgh, Pa.

[73] Assignee: Westinghouse Electric Corporation, Pittsburgh, Pa.

[22] Filed: Dec. 21, 1972

[21] Appl. No.: 308,892

[44] Published under the Trial Voluntary Protest Program on January 28, 1975 as document no. B 308,892.

Related U.S. Application Data

[63] Continuation of Ser. No. 205,263, Dec. 6, 1971.

[52] U.S. Cl. ............... 322/15; 290/40; 60/39.28; 235/151.21
[51] Int. Cl.[2] ........................................ H02P 9/04
[58] Field of Search............ 60/39.28, 39.27, 39.29; 290/40, 40.1, 2; 322/14, 15, 38; 235/151.21

[56] References Cited
UNITED STATES PATENTS

| | | |
|---|---|---|
| 3,382,672 | 5/1968 | French .............................. 60/39.28 |
| 3,469,395 | 9/1969 | Spitsbergen ....................... 60/39.28 |
| 3,482,396 | 12/1969 | Nelson et al. ...................... 60/39.28 |
| 3,552,872 | 1/1971 | Giras et al. ............................ 290/40 |
| 3,588,265 | 6/1971 | Berry .................................... 415/1 |
| 3,606,754 | 9/1971 | White .............................. 60/39.28 |
| 3,643,437 | 2/1972 | Brinbaum ............................ 290/40 |
| 3,678,691 | 7/1972 | Shohet .............................. 60/39.28 |
| 3,688,495 | 9/1972 | Fehler ............................... 60/39.26 |
| 3,733,816 | 5/1973 | Nash et al. ......................... 60/39.28 |

Primary Examiner—G. R. Simmons
Attorney, Agent, or Firm—S. A. Seinberg

[57] ABSTRACT

A gas turbine power plant is provided with an industrial gas turbine capable of sustained operation on either gas or liquid fuel or a mixture of the two. One or more of such turbine-generator plants are operated by a hybrid digital computer control system during all turbine operating modes. Automatic transferring from operation using one fuel to operation sustained entirely by the other is achieved by computer directed dual fuel subsystem operation. Operation on a mixture of fuels is likewise computer directed.

9 Claims, 41 Drawing Figures

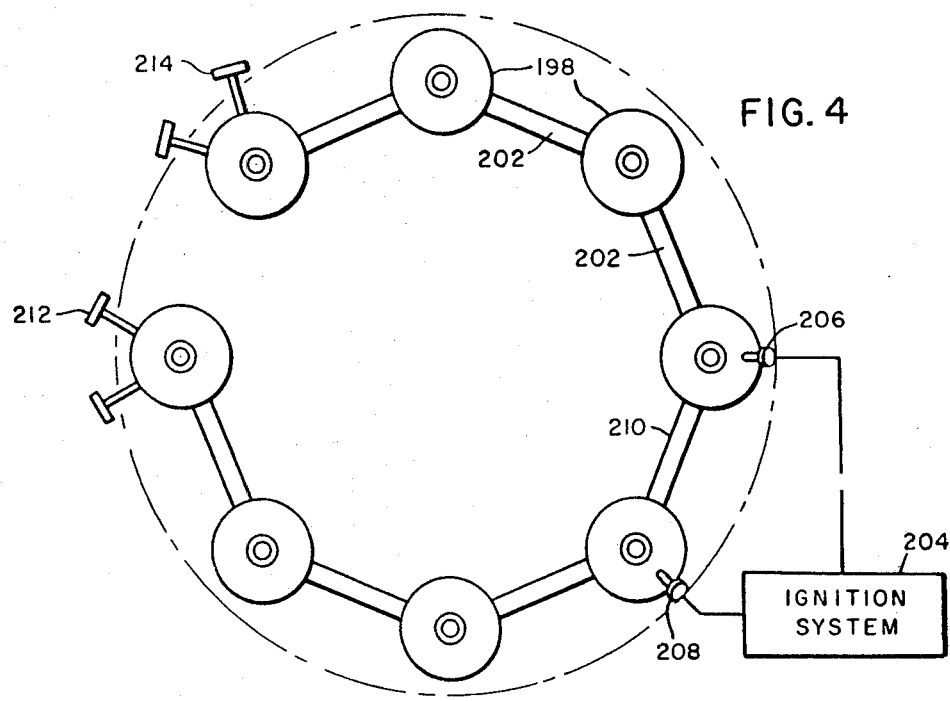
FIG. 4
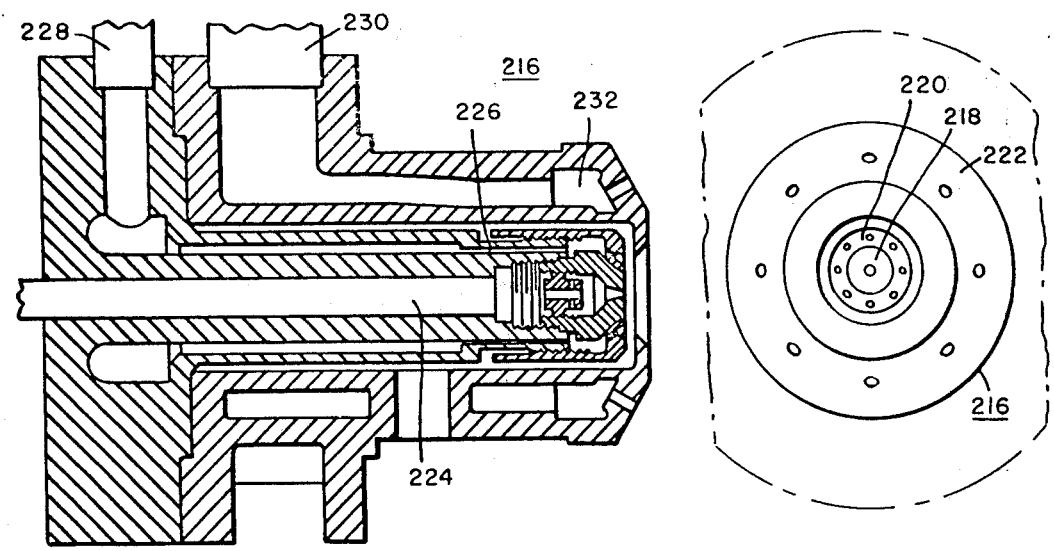
FIG. 6
FIG. 5

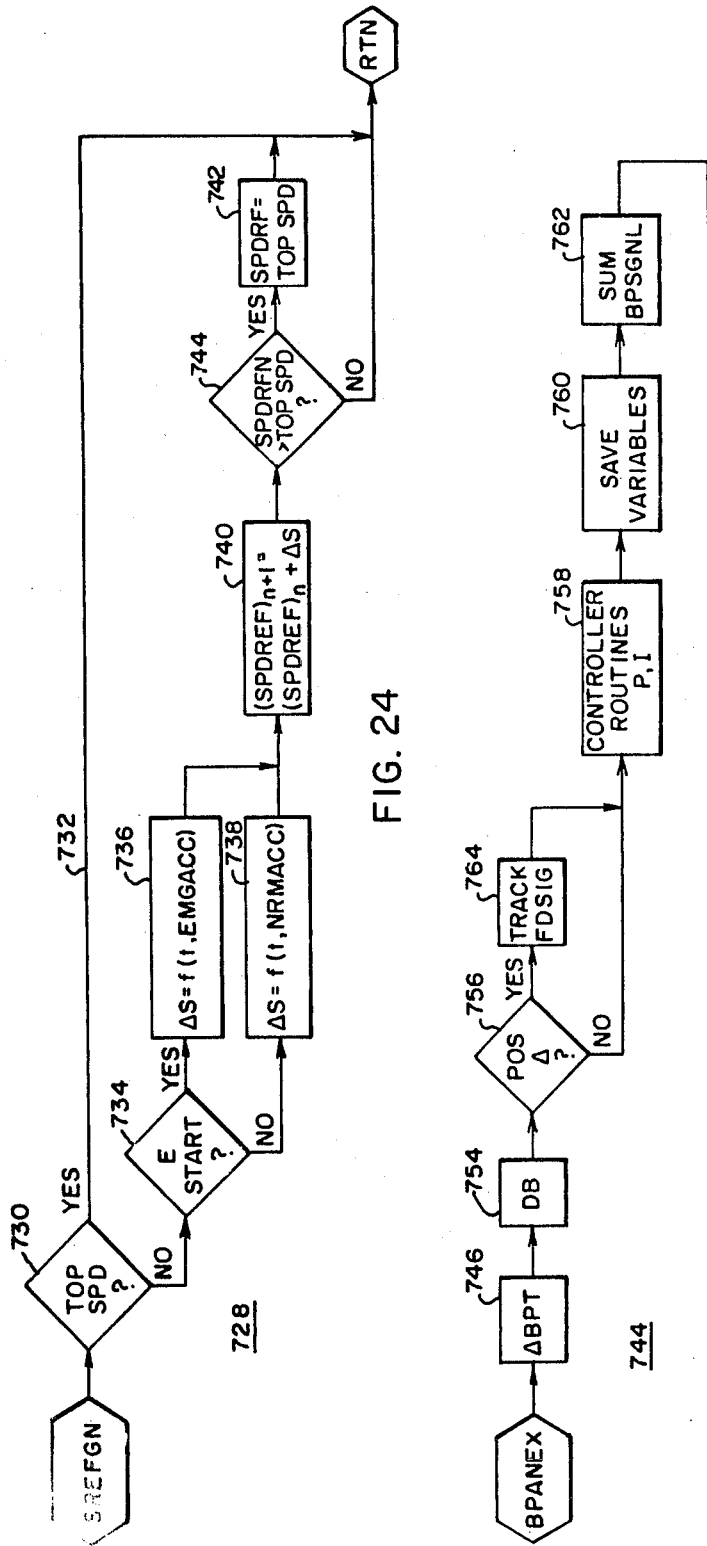
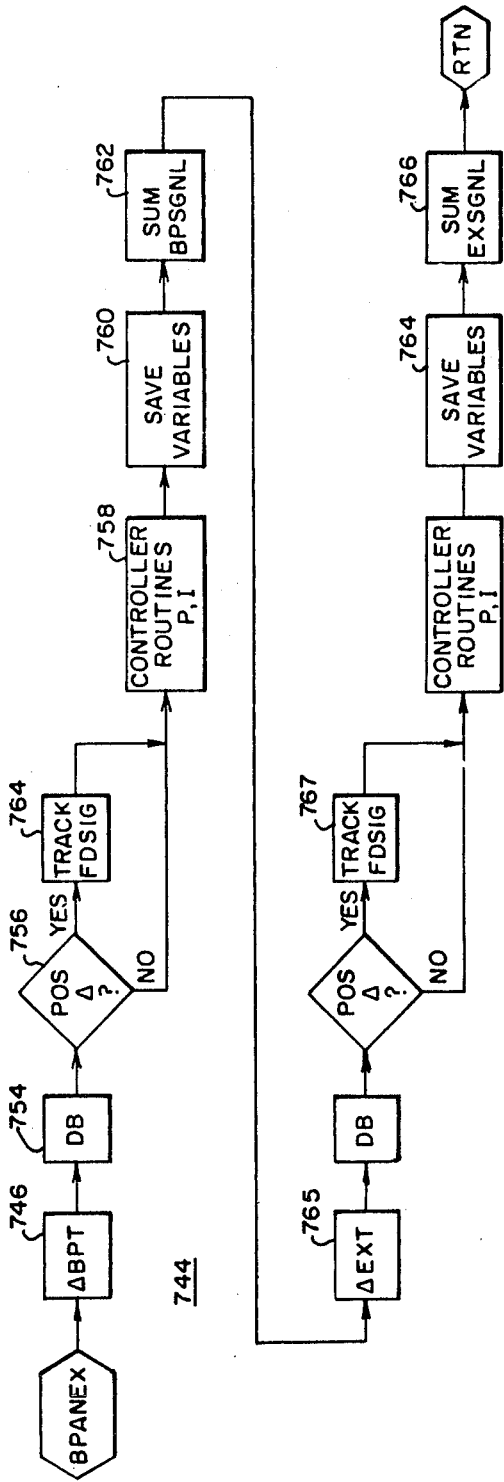
FIG. 24
FIG. 25

INDUSTRIAL GAS TURBINE POWER PLANT CONTROL SYSTEM HAVING CAPABILITY FOR EFFECTUATING AUTOMATIC FUEL TRANSFER UNDER LOAD PREFERABLY EMPLOYING A DIGITAL COMPUTER

CROSS REFERENCE TO RELATED APPLICATIONS

This is a continuation, of application Ser. No. 205,263 filed Dec. 6, 1971.

Reference is hereby made to the following related applications, all of which are assigned to the present assignee:

U.S. patent application Ser. No. 82,470, filed on Oct. 20, 1970 in the names of J. Reuther and T. Giras, entitled "System And Method For Operating Industrial Gas Turbine Apparatus And Gas Turbine Electric Power Plants Preferably With A Digital Computer Control System", now abandoned in favor of U.S. patent application Ser. No. 319,114, filed on Dec. 29, 1972 as a streamline continuation thereof;

U.S. patent application Ser. No. 82,469, filed on Oct. 20, 1970, in the names of R. Kiscaden and R. Yannone, entitled "System and Method For Accelerating And Sequencing Industrial Gas Turbine Apparatus And Gas Turbine Electric Power Plants Preferably With A Digital Computer Control System", now abandoned in favor of U.S. patent application Ser. No. 252,948, filed on May 12, 1972 as a streamline continuation thereof, and U.S. patent application Ser. No. 252,131, filed on May 10, 1972 as a divisional of the originally filed, above mentioned, U.S. patent application Ser. No. 82,469;

U.S. patent application Ser. No. 82,467, filed on Oct. 20, 1970, in the name of T. Reed, entitled "Improved System And Method For Operating Industrial Turbine Apparatus And Gas Turbine Electric Power Plants Preferably With A Digital Computer Control System";

U.S. patent application Ser. No. 99,491, filed on Dec. 18, 1970 in the name of J. Reuther, entitled "System and Method Employing A Digital Computer For Automatically Synchronizing A Gas Turbine Or Other Electric Power Plant Generator With A Power System", now abandoned in favor of U.S. patent application Ser. No. 276,508, filed on July 31, 1972 as a streamline continuation thereof;

U.S. patent application Ser. No. 99,493 filed on Dec. 18, 1970 in the name T. Reed, entitled "System And Method Employing A Digital Computer With Improved Programmed Operation For Automatically Synchronizing A Gas Turbine Or Other Electric Power Plant Generator With A Power System", now abandoned in favor of U.S. patent application Ser. No. 276,343, filed on July 31, 1972 as a streamline continuation thereof;

U.S. patent application Ser. No. 205,261, filed on Dec. 6, 1971, in the names of R. Yannone and R. Kiscaden, entitled "Improved Control System And Method For Controlling Dual Fuel Operation Of Industrial Gas Turbine Power Plants Preferably Employing A Digital Computer", now abandoned in favor of U.S. patent application Ser. No. 310,520, filed on Nov. 29, 1972 as a streamline continuation thereof;

U.S. patent application Ser. No. 155,905 filed on June 23, 1971, in the names of R. Yannone and T. Reed, entitled "Improved System And Method For Monitoring And Controlling Operation Of Industrial Gas Turbine Apparatus And Gas Turbine Electric Power Plants Preferably With A Digital Computer Control System", now abandoned in favor of U.S. patent application Ser. No. 317,839, filed on Dec. 26, 1972 as a streamline continuation thereof;

U.S. patent application Ser. No. 189,632, filed on Oct. 15, 1971 in the names of R. Yannone and R. Kiscaden, entitled "Improved Digital Computer Control System and Method For Monitoring And Controlling Operation Of Industrial Gas Turbine Apparatus To Drive Simultaneously An Electric Power Plant Generator and Provide Exhaust Gases To An Industrial Process", now abandoned in favor of U.S. patent application Ser. No. 323,593, filed on Jan. 15, 1973 as a streamline continuation thereof;

U.S. patent application Ser. No. 189,633 filed on Oct. 15, 1971 in the names of J. Reuther and T. Reed, entitled "Improved Digital Computer Control System and Method For Monitoring And Controlling Operation Of Industrial Gas Turbine Apparatus Employing Expanded Parametric Control Algorithm", now abandoned in favor of U.S. patent application Ser. No. 326,718, filed on Jan. 26, 1973, as a streamline continuation thereof; and U.S. patent application Ser. No. 204,944, filed on Dec. 6, 1971 in the name of G. Rankin, entitled "Industrial Gas Turbine Power Plant Control System And Method For Implementing Improved Dual Fuel Scheduling Algorithm Permitting Automatic Fuel Transfer Under Load", now abandoned in favor of U.S. patent application Ser. No. 332,457, filed on Feb. 14, 1973, as a streamline continuation thereof.

BACKGROUND OF THE INVENTION

The present invention relates to gas or combustion turbine apparatus, gas turbine electric power plants and control systems and operating methods therefor.

Industrial gas turbines may have varied cycle, structural and aerodynamic designs for a wide variety of uses. For example, gas turbines may employ the simple, regenerative, steam injection or combined cycle in driving an electric generator to produce electric power. Further, in these varied uses, the gas turbine may have one or more shafts and many other rotor, casing, support, and combustion system structural features which can vary relatively widely among differently designed units. They may be aviation jet engines adapted for industrial service as described for example in an ASME paper entitled "The Pratt and Whitney Aircraft Jet Powered 121MW Electrical Peaking Unit," presented at the New York Meeting in November–December 1964.

Gas turbine electric power plants are usable in base load, mid-range load and peak load power system applications. Combined cycle plants are normally usable for the base or mid-range applications while the power plant which employs a gas turbine only as a generator drive typically is highly useful for peak load generation because of its startup availability and relatively low investment cost.

Although the heat rate for gas turbines is relatively high in relation to steam turbines, the investment savings for peak load application typically offsets the higher fuel cost factor. Provision for dual or multiple fuel operation in gas turbine design may greatly reduce such increased fuel costs. As will be readily appreciated, optimized scheduling of relatively inexpensive fuels may still further reduce operating costs.

Another economic advantage for gas turbines is that power generation capacity can be added in relatively small blocks such as 25MW or 50MW as needed for expected system growth thereby avoiding excessive capital expenditure and excessive system reserve requirements. Further background on peaking generation can be obtained in articles such as "Peaking Generation", a Special Report of Electric Light and Power dated November 1966.

Other gas turbine uses include drive applications for pipeline or process industry compressors and surface transportation units. An additional application of gas turbines is that which involves recovery of turbine exhaust heat energy in other apparatus such as electric power or industrial boilers or other heat transfer apparatus. More generally, the gas turbine air flow path may form a part of an overall process system in which the gas turbine is used as an energy source in the flow path.

In gas turbine installations which are operated with both gaseous and liquid fuel it is desirable to be able to burn the two fuels simultaneously. Often the less expensive fuel, gas, is obtained in variable quantities so that it becomes necessary to supplement the gas with liquid fuel in order to produce the desired amount of heat representative of the then existing output requirement of the gas turbine. Under conditions wherein the available gas supply is intermittent, it may become necessary to transfer completely over to the more expensive liquid fuel.

In dual fuel gas turbine installations there generally exists a requirement that the operating load be maintained at a constant, or substantially constant value during those periods in which adjustments in fuel scheduling take place. It is important therefore, that positive highly responsive control be maintained over the gas turbine during such time intervals.

In the operation of gas turbine apparatus and electric power plants, various kinds of controls have been employed. Relay-pneumatic type systems form a large part of the prior art. More recently, electronic controls of the analog type have been employed as perhaps represented by U.S. Pat. No. 3,520,133 entitled Gas Turbine Control System and issued on July 14, 1970 to A. Loft or by the control referred to in an article entitled "Speedtronic Control, Protection and Sequential System" and designated as GER-2461 in the General Electric Gas Turbine Reference Library. A wide variety of controls have been employed for aviation jet engines including electronic and computer controls as described for example in a March 1968 ASME Paper presented by J. E. Bayati and R. M. Frazzini and entitled "Digatec (Digital Gas Turbine Engine Control)", an April 1967 paper in the Journal of the Royal Aeronautical Society authored by E. S. Eccles and entitled "The Use Of A Digital Computer For On-Line Control Of A Jet Engine", or a July 1965 paper entitled "The Electronic Control of Gas Turbine Engines" by A. Sadler, S. Tweedy and P. J. Colburn in the July 1965 Journal of the Royal Aeronautical Society. However, the operational and control environment for jet engine operations differs considerably from that for industrial gas turbines. In referencing prior art publications or patents as background herein, no representation is made that the cited subject matter is the best prior art.

In connection with prior art gas turbine electric power plant operating and control systems and operating methods therefor, reference is made to copending related application Ser. No. 82,470 which, in conjunction with other enumerated related patent applications, comprises a description of an improved gas turbine plant operating and control system. The present disclosure represents a further advancement over the prior art discussion herein contained and should be considered as exclusive of the reference application.

Generally, the operation of industrial gas turbine apparatus and gas turbine power plants has been limited in flexibility, response speed, accuracy and reliability. Further limits have been in the depth of operational control and in the efficiency or economy with which single or multiple units are placed under operational control and management. Such limitations have been particularly apparent in applications wherein reliable flexible control and management is required to operate the gas turbine efficiently and economically using more than one fuel. Particular difficulty arises when it is desired to maintain a particular load level while adjusting the fuel ratio, or transferring from operation on one fuel to operation on a mixture of the two fuels or to operation solely on the other of the two fuels.

Overall control loop arrangements and control system embodiments of such arrangements for industrial gas turbines have been less effective in operations control than is desirable. Efficient, reliable, sufficiently responsive control of plural turbine fuel subsystems under a variety of operating conditions has been difficult to attain.

More particularly, optimum dual fuel operations of gas turbine power plants over a wide range of turbine operating conditions and power plant output requirements can be assured only by continuous monitoring of turbine and generator parameters and by reliable, accurate parametric control loop response to variations in one or more of such parameters. A facility for rapidly determining control variable outputs to subsystem control apparatus as a function of joint variations in determined parameters is essential to sustaining dual fuel gas turbine power plant operation at or near a desired load level, particularly during fuel transfer.

Although known prior art gas turbine control systems have included means for scheduling dual or multiple fuel operation, the flexibility of control requisite to sustaining reliable, safe power plant operation or to provide a source of energy to an industrial process while simultaneously satisfying a plurality of operating constraints has been lacking. Such prior art control systems have lacked a facility for directing dual fuel subsystem control based upon parametric consideration of a broad range of combinations of temperature and pressure inputs obtained from process sensors located at the various turbine operation cycle positions. Consequently, such control systems, although responsive to variations in turbine speed, compressor inlet temperatures, combustor shell pressures, and turbine exhaust temperatures, have lacked a capability for directing the cooperative operation of plural fuel subsystems necessary to achieving continuous turbine operation at a specified load level, or within a narrow range of permissible exhaust temperatures, as a function of one or more combinations of turbine parameters.

Of considerable importance in a flexible dual fuel control system is a mechanism or algorithm for automatically effectuating changes in fuel scheduling on the occurrence of one or more specified events, e.g., diminution in the supply of the primary fuel, gas. Both scheduled and unscheduled events may give rise to a requirement for initiating changes in fuel scheduling.

The operating environment may dictate a need for one or more of the following:

a. changing from operation on one fuel to operation on a mixture of fuels;

b. changing ratios of fuels when previously operating on a mixture of fuels;

c. changing from a mixture of fuels to operations solely on one or the other; and d. transferring from operations solely on one fuel to operations solely on the other.

For certain of the enumerated operations it may be desirable to gradually change the relative proportions of the fuels, by either discrete steps or a smooth bumpless transition. In other instances it may be necessary to effectuate a change as rapidly as possible, consistent with a simultaneous requirement of maintaining turbine operations subject to other constraints. Further, different operating criteria may dominate over different time intervals, e.g., maintaining turbine speed, maintaining a constant exhaust temperature or maintaining a constant generator output.

In applications of industrial gas turbines wherein it may be expected that the supply of primary fuel will be intermittent, one significant need is a capability for transferring over from operation on the primary fuel to operation on the liquid fuel under load. As previously discussed, considerable difficulty has existed in maintaining load and temperature stability during fuel transfer operations.

Various dual fuel control apparatus and methods have been utilized in earlier prior art gas turbine control systems. Cumbersome, complicated arrangements of mechanical and electromechanical components have yielded some measure of dual fuel subsystem control. Such arrangements have lacked responsiveness to variations in plural turbine parameters. Characteristically, response is limited to variations in gas pressure or turbine speed, or to discrete setpoint inputs.

Later control systems have employed arrangements of contact relays and sensing devices such as pressure switches, to implement dual fuel operation control. Again, such systems have been necessarily limited in response and flexibility. A limited number of logic functions may be feasibly implemented in this manner.

More recently, various combinations of wired logic functions have been utilized in conjunction with a plurality of computing circuits to determine conditions dictating a need for fuel transfer. Such systems have expanded, to a degree, the capability to effectuate fuel transfers in response to simultaneous variations in turbine parameters. Here again, control systems implemented in strictly hardware form lack sufficient flexibility to ensure smooth, bumpless transfers over a wide range of gas turbine power plant operating conditions.

No known prior art turbine control system provides the full range of dual fuel control functions enumerated above. Characteristically, even the more advanced systems require operator intervention in certain situations. Fully automatic fuel mixing and transfer functions in response to a wide range of inputs reflecting turbine operating conditions, as yet, have not been provided. Further, wide fluctuations in generator output during fuel mixing or transfer operations have been the rule. Temperature control has been inadequate as well.

Known prior art dual fuel control systems have not provided a mechanism for varying fuel transfer time, which facility may greatly reduce undesirable surging and fuel scheduling overshoots resulting in unsafe and damaging operating conditions, usually in the form of large thermal transients. No provision has been made for varying control signal step size for initiating a transfer which would serve to decrease initial thermal transients. These and other deficiencies existing in prior art control systems have greatly limited accuracy and safety required to ensure long life of critical turbine components.

SUMMARY OF THE INVENTION

One or more industrial gas turbines or gas turbine generator power plants are operated by a control system which preferably employs a programmed digital computer in a hybrid control system arrangement. The control system operates in a gas turbine control loop arrangement, preferably to control fuel flow and thereby provide load and loading rate control over the turbine and generator or other load units and further provides speed, surge and temperature limit control with nonlinear control loop characterization. In dual fuel gas turbine operations, the preferred computer determines control actions for implementation by the dual fuel control subsystem.

More specifically, as regards automatic fuel transfer under load, a computer determined fuel demand signal is applied across a signal ratioing device to produce a gas fuel demand output signal and a liquid fuel demand output signal which serve as control inputs to respective dual fuel subsystem control apparatus. The ratio of the two subsystem apparatus control signals is computer determined, varying with time, such that a transfer from operation on a given fuel to operation on another proceeds in accordance with predefined operating constraints.

BRIEF DESCRIPTION OF THE DRAWINGS

FIGS. 4-6 show a fuel nozzle and parts thereof employed in the gas turbine of FIG. 3;

FIG. 24 shows a more detailed flowchart for a speed reference generation function included in the program of FIG. 23;

FIG. 25 shows a more detailed flowchart for a gas turbine blade path and exhaust temperature limit function employed in the program of FIG. 23;

DESCRIPTION OF THE PREFERRED EMBODIMENT

A. POWER PLANT

1. General Structure

Figure 1:
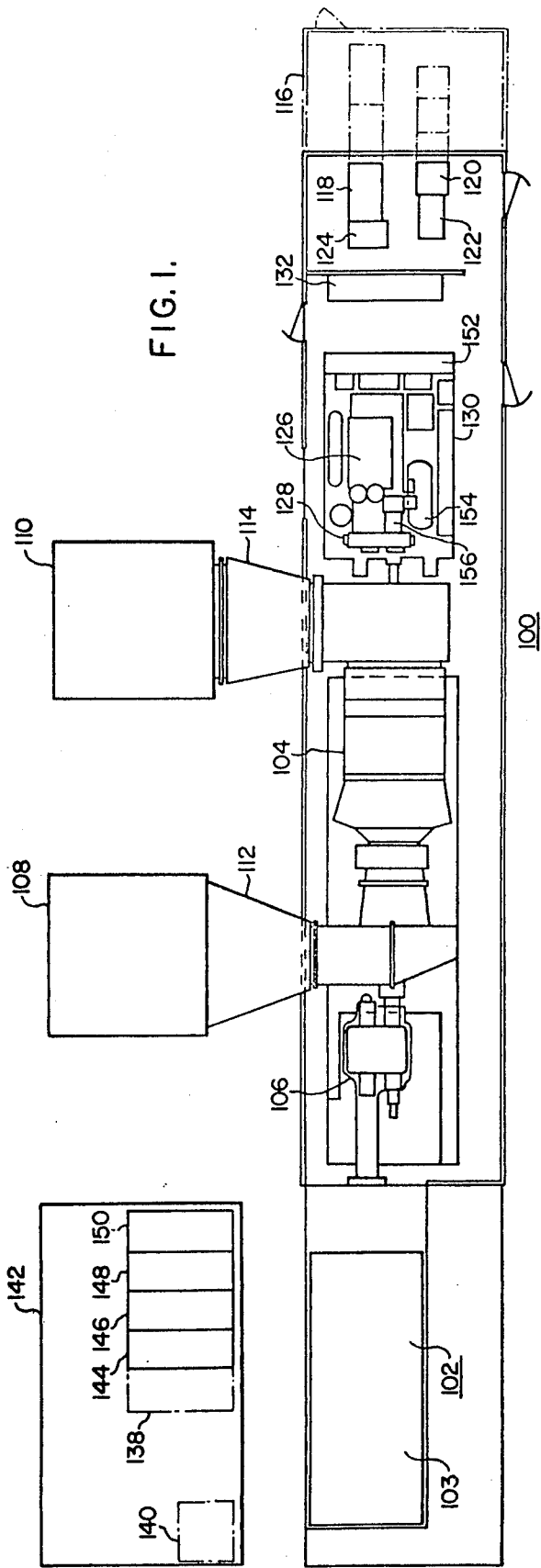
FIG. 1 shows a top plan view of a gas turbine power plant arranged to operate in accordance with the principles of the invention.

More particularly, there is shown in FIG. 1 a gas turbine electric power plant 100 which includes an AC generator 102 driven by a combustion or gas turbine 104 through a reduction gear unit 106. In this application of the invention, the gas turbine 104 is the W-251G simple cycle type manufactured by Westinghouse Electric Corporation. In other power plant generator applications, other industrial drive applications, and combined steam and gas cycle applications of various aspects of the invention, industrial gas turbines having larger or smaller power ratings, different cycle designs, different number of shafts or otherwise different from W-251G can be employed.

The plant 100 may be housed in an enclosure (not shown) and then placed on a foundation approximately 106 to 115 feet long dependent upon the number of optional additional plant units to be accommodated thereon. Up to three additional units may be provided. Exhaust silencers 108 and 110 coupled respectively to inlet and exhaust duct works 112 and 114 significantly reduce noise characteristically associated with turbine power plants.

Digital computer and other control systems circuitry in a cabinet 118 provides for operation of the power plant 100 when a single plant unit is selected by the user. Associated therewith is an operator's panel 120, an automatic send/receive printer 122 and a protective relay panel 124 for sensing abnormal electric power system conditions. The number of basic master and slave units 118 through 124 provided may vary according as the number of plants being monitored and controlled.

Startup or cranking power for the plant 100 is provided by a starting engine 126 such as a diesel engine. Starting engine 126 is mounted on an auxiliary bedplate and coupled to the drive shaft of the gas turbine 104 through a starting gear unit 128. A DC motor 154 operates through a turning gear 156 which is also coupled to the gas turbine shaft starting gear 128 to drive the gas turbine at turning gear speed.

A motor control center 130 is also mounted on the auxiliary bedplate and it includes motor starters and other devices to provide for operating the various auxiliary equipment items associated with the plant 100.

A plant battery 132 is disposed adjacent to one end of the auxiliary bedplate or skid. The battery provides power for emergency lighting, auxiliary motor loads, and DC computer and other control power for a period following shutdown of the plant 100 due to a loss of AC power. Also included on the auxiliary skid is pressure switch and gauge cabinet 152 which contains the pressure switches, gauges, regulators and other miscellaneous elements needed for gas turbine operation.

A switchgear pad 142 is included in the plant 100 for 15 KV switchgear including the generator breaker as indicated by the reference characters 144, 146 and 148. Excitation switchgear 150 associated with the generator excitation system is also included on the switchgear pad 142.

2. Generator and Exciter

Figure 2:
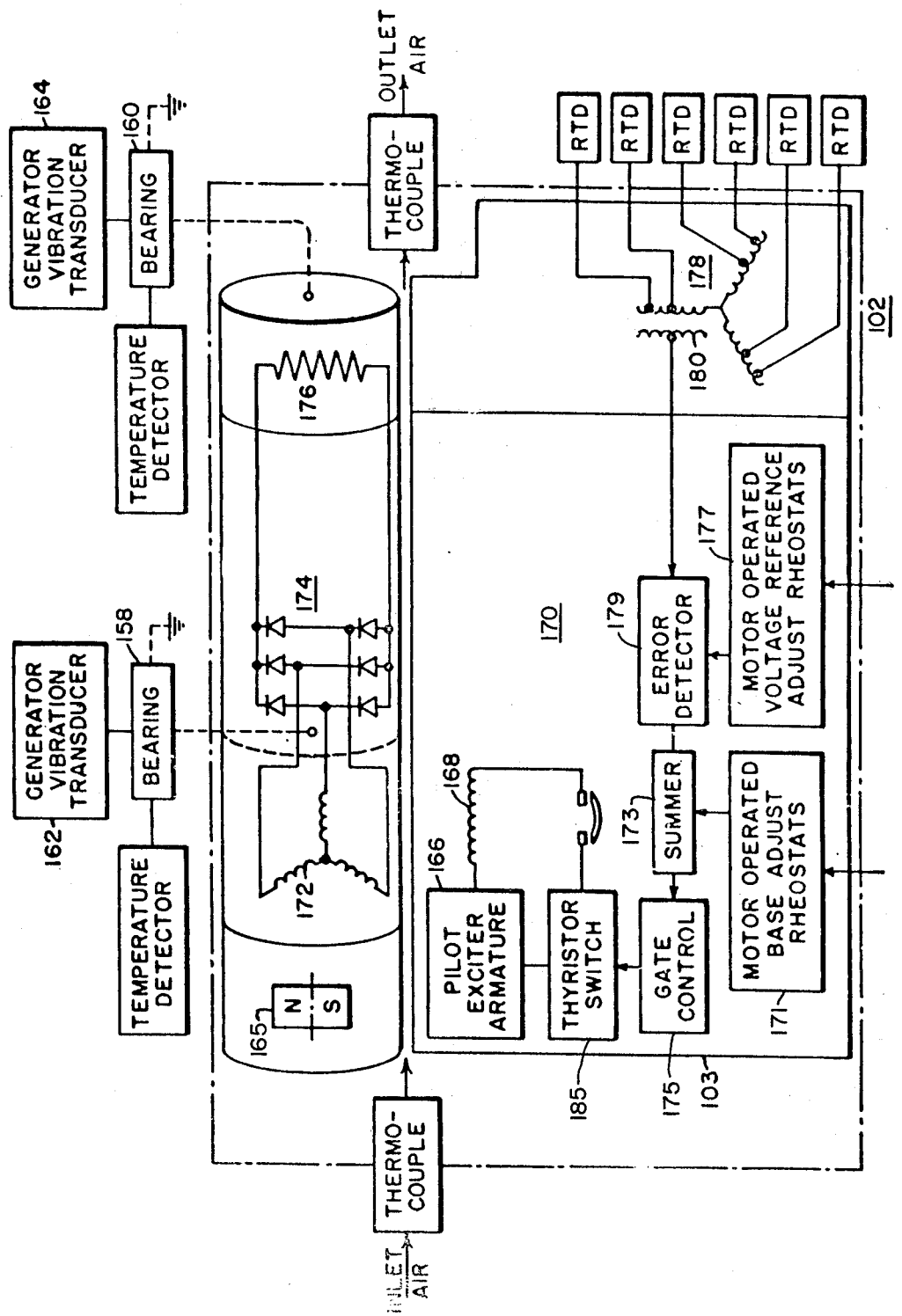
FIG. 2 shows a schematic view of a rotating rectifier exciter and a generator employed in the gas turbine power plant of FIG. 1.

The generator 102 and its brushless exciter 103 are schematically illustrated in greater detail in FIG. 2. Structural details as well as details of operation are considered more fully in the aforementioned copending application Ser. No. 82470, Section A2, pages 21 to 24.

Briefly, a permanent magnet field member 165 is rotated to induce voltage in a pilot exciter armature 166 which is coupled to a stationary AC exciter field 168 through a voltage regulator 170. Voltage is thereby induced in an AC exciter armature 172 formed on the exciter rotating element and it is applied across diodes mounted with fuses on a diode wheel 174 to energize a rotating field element 176 of the generator 102. Generator voltage is induced in a stationary armature winding 178 which supplies current to the power system through a generator breaker when the plant 100 is synchronized and on the line. A transformer 180 supplies a feedback signal for the regulator 170 to control the excitation level of the exciter field 168.

Various monitoring devices to be hereinafter more fully described are provided which generate input data for the plant control system. Included are vibration transducers 162 and 164 resistant temperature detectors embedded in the stator winding and thermocouples installed to measure air inlet discharge temperature and bearing oil drain temperatures. In this manner alarm conditions are provided to the control system. Additional control functions are provided to adjust base adjust rheostats 171 and 177 to provide fine generator voltage control.

3. Gas Turbine a. Compressor

Figure 3:
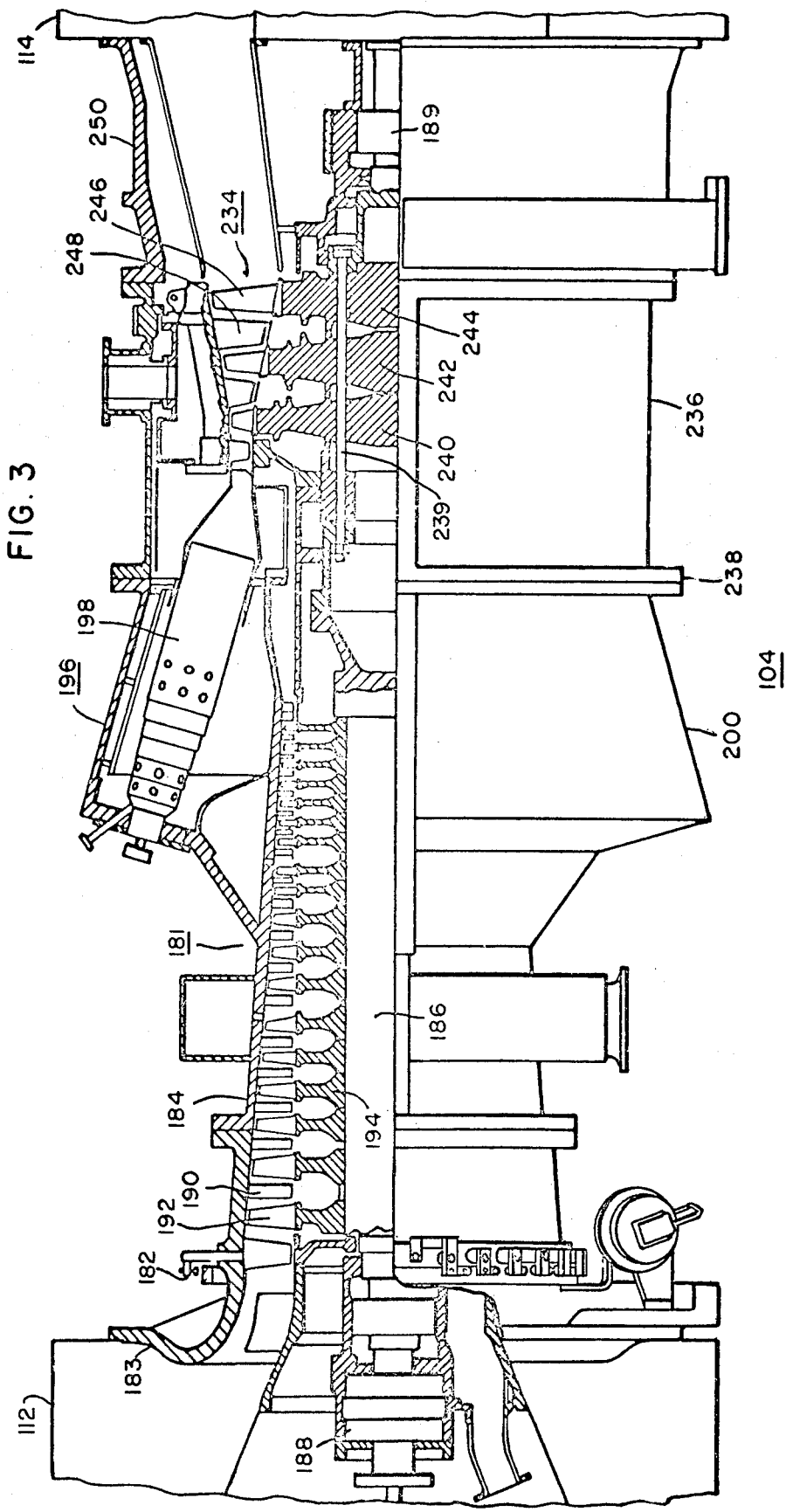
FIG. 3 shows a front elevational view of an industrial gas turbine employed in the power plant to drive the generator and it is shown with some portions thereof broken away.

The gas turbine 104 in this case is the single shaft simple cycle type having a standard ambient pressure ratio of 9.0 to 1 and a rated speed of 4894 rmp and it is illustrated in greater detail in FIG. 3. Filtered inlet air enters a multistage axial flow compressor 181 through a flanged inlet manifold 183 from the inlet ductwork 112. An inlet guide vane assembly 182 includes vanes supported across the compressor inlet to provide for surge prevention particularly during startup. The angle at which all of the guide vanes are disposed in relation to the gas stream is uniform and controlled by a pneumatically operated positioning ring coupled to the vanes in the inlet guide vane assembly 182.

The compressor 181 is provided with a casing 184 which is split into base and cover parts along a horizontal plane. The turbine casing structure including the compressor casing 184 provides support for a turbine rotating element including a compressor rotor 186 through bearings 188 and 189. Vibration transducers (FIG. 9) are provided for the gas turbine bearings 188 and 189.

The compressor casing 184 also supports stationary blades 190 in successive stationary blade rows along the air flow path. Further, the casing 184 operates as a pressure vessel to contain the air flow as it undergoes compression. Bleed flow is obtained under valve control from intermediate compressor stages to prevent surge during startup.

Figure 9:
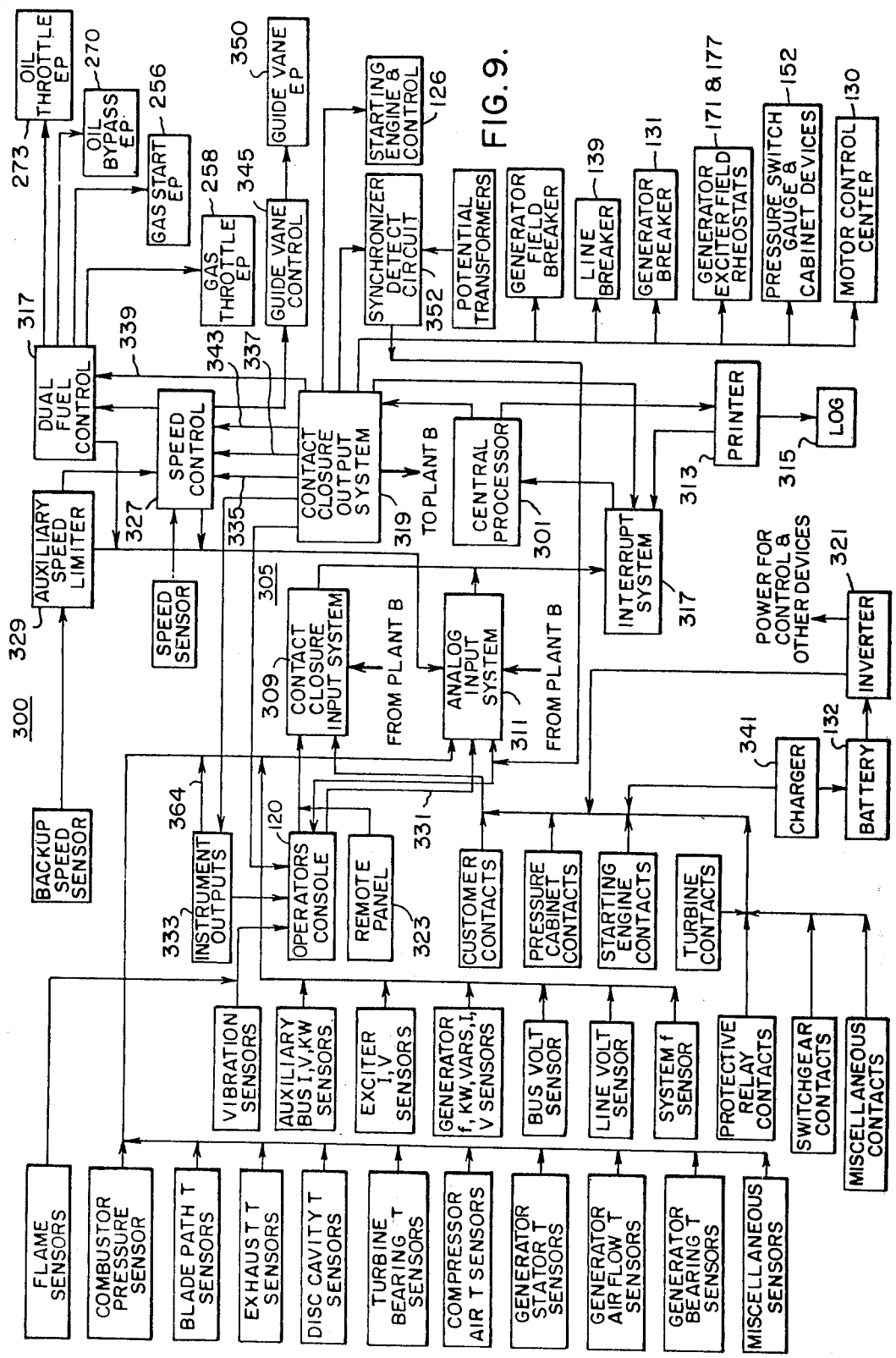
FIG. 9 shows a block diagram of a digital computer control system employed to operate the gas turbine power plant of FIG. 1.

The compressor inlet air flows annularly through a total of 18 stages in the compressor 181. Blade 192 mounted on the rotor 186 by means of wheels 194 are appropriately designed from an aerodynamic and structural standpoint for the intended service. A suitable material such as 12% chrome steel is employed for the rotor blades 192. Both the compressor inlet and outlet air temperatures are measured by suitably supported thermocouples (FIG. 9).

b. Combustion System

Pressurized compressor outlet air is directed into a combustion system 196 comprising a total of eight combustor baskets 198 conically mounted within a section 200 of the casing 184 about the longitudinal axis of the gas turbine 104. Combustion shell pressure is detected by a suitable sensor (FIG. 9) coupled to the compressor-combustor flow paths located in the pressure switch and gauge cabinet 152.

As schematically illustrated in FIG. 4, the combustor baskets 198 are cross-connected by cross-flame tubes 202 for ignition purposes. A computer sequenced ignition system 204 includes igniters 206 and 208 associated with respective groups of four combustor baskets 198. In each basket group, the combustor baskets 198 are series cross-connected and the two groups are cross-connected at one end only as indicated by the reference character 210.

Generally, the ignition system 204 includes an ignition transformer and wiring to respective spark plugs which form a part of the igniters 206 and 208. The spark plugs are mounted on retractable pistons within the igniters 206 and 208 so that the plugs can be withdrawn from the combustion zone after ignition has been executed.

A pair of ultraviolet flame detectors 212 and 214 are associated with each of the end combustor baskets in the respective basket groups in order to verify ignition and continued presence of combustion in the eight combustor baskets 198. The flame detectors 212 can for example be Edison flame detectors Model 424-10433.

In FIG. 5, there is shown a front plan view of a dual fuel nozzle mounted at the compressor end of each combustor basket 198. An oil nozzle 218 is located at the center of the dual nozzle 216 and an atomizing air nozzle 220 is located circumferentially about the oil nozzle 218. An outer gas nozzle is disposed about the atomizing air nozzle 220 to complete the assembly of the fuel nozzle 216.

As indicated in the broken away side view in FIG. 6, fuel oil or other liquid fuel enters the oil nozzle 218 through a pipe 224 while atomizing air for the fuel oil enters a manifold pipe arrangement 226 through entry pipe 228 for flow through the atomizing air nozzle 220. Gaseous fuel is emitted through the nozzle 222 after flow through entry pipe 230 and a manifold pipe arrangement 232.

c. Fuel

Generally, either liquid or gaseous or both liquid and gaseous fuel flow can be used in the turbine combustion process. Various gaseous fuels can be burned including gases ranging from blast furnace gas having low BTU content to gases with high BTU content such as natural gas, butane or propane.

With respect to liquid fuels, the fuel viscosity must be less than 110 SSU at the nozzle to assure proper atomization. Most distillates meet this requirement.

A portion of the compressor outlet air flow combines with the fuel in each combustor basket 198 to produce combustion after ignition and the balance of the compressor outlet air flow combines with the combustion products for flow through the combustor basket 198 into a multistage reaction type turbine 234 (FIG. 3). The combustor casing section 200 is coupled to a turbine casing 236 through a vertical casing joint 238. No high pressure air or oil seal is required between the compressor 181 and the turbine 234.

d. Turbine Element

The turbine 234 is provided with three reaction stages through which the multiple stream combustion system outlet gas flow is directed in an annular flow pattern to transform the kinetic energy of the heated, pressurized gas into turbine rotation, i.e. to drive the compressor 181 and the generator 102. The turbine rotor is formed by a stub shaft 239 and three disc blade assemblies 240, 242 and 244 mounted on the stub shaft by through bolts. Thermocouples (FIG. 9) are supported within the disc cavities to provide cavity temperature signals for the control system.

High temperature alloy rotor blades 246 are mounted on the discs in forming the disc assemblies 240, 242 and 244. Individual blade roots are cooled by air extracted from the outlet of the compressor 181 and passed through a coolant system in the manner previously indicated. The blade roots thus serve as a heat sink for the rotating blades 246. Cooling air also flows over each of the turbine discs to provide a relatively constant low metal temperature over the unit operating load range.

In addition to acting as a pressure containment vessel for the turbine 234, the turbine casing 236 supports stationary blades 248 which form three stationary blade rows interspersed with the rotor blade rows. Gas flow is discharged from the turbine 234 substantially at atmospheric pressure through a flanged exhaust manifold 250 to the outlet ductwork 114.

The generator and gas turbine vibration transducers (FIG. 9) can be conventional velocity transducers or pickups which transmit basic vibration signals to a vibration monitor for input to the control system. A pair of conventional speed detectors (FIGS. 9 and 12A) are associated with a notched magnetic wheel (FIG. 12A) supported at appropriate turbine-generator shaft locations. Signals generated by the speed detectors are employed in the control system in determining power plant operation.

Thermocouples (FIG. 9) are associated with the gas turbine bearing oil drains. Further, thermocouples (FIG. 9) for the blade path are supported about the inner periphery of the exhaust manifold 250 to provide a fast response indication of blade temperature for control system usage particularly during plant startup periods. Exhaust temperature detectors (FIG. 9) are disposed in the exhaust ductwork 114 primarily for the purpose of determining average exhaust temperature for control system usage during load operations of the power plant 100. Suitable high response shielded thermocouples for the gas turbine 104 are those which use compacted alumina insulation with a thin-wall high alloy swaged sheath or well supported by a separate heavy wall guide.

c. Fuel System

Figures 7, 8:
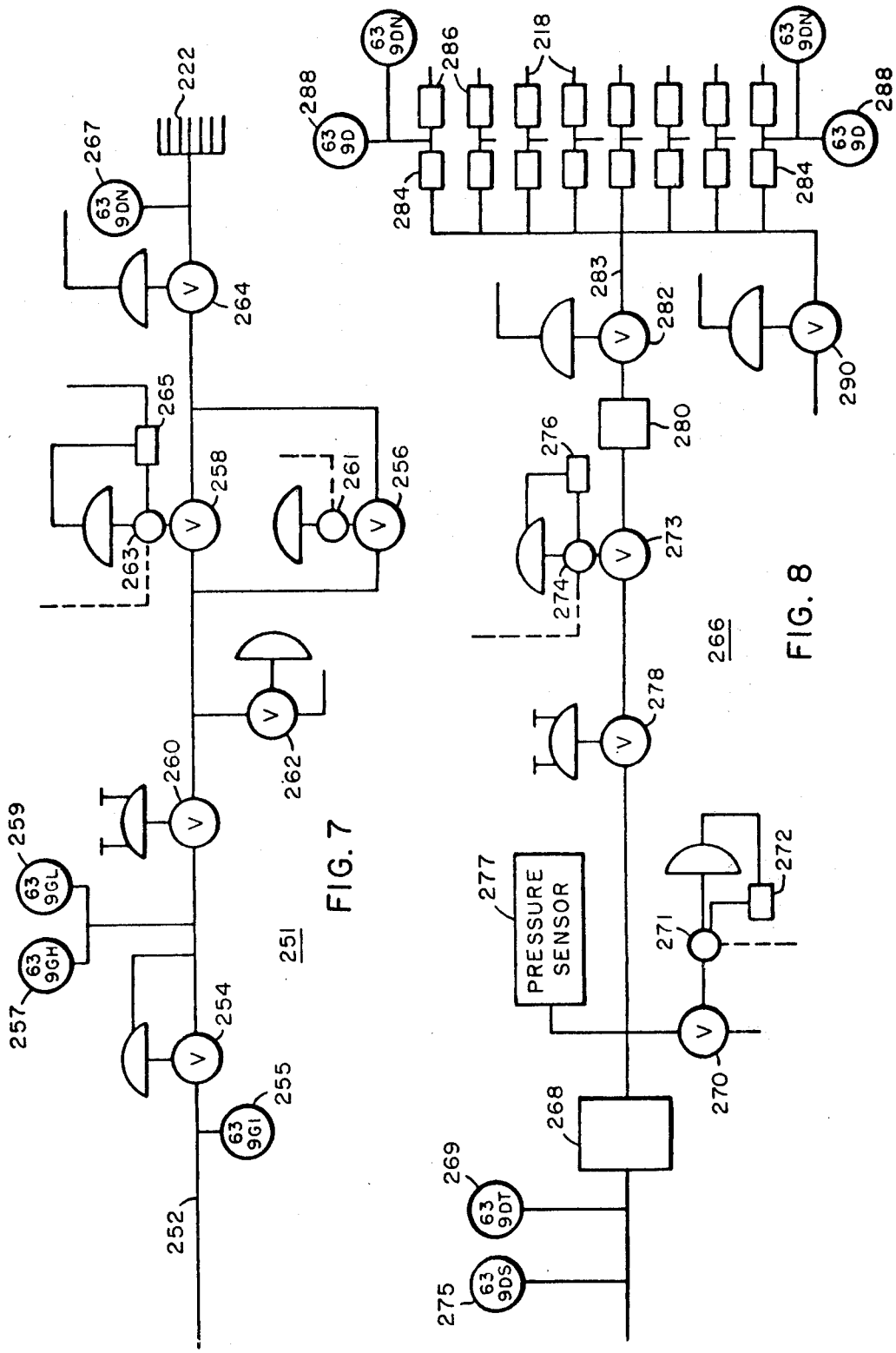
FIGS. 7 and 8 respectively show schematic diagrams of gas and liquid fuel supply systems employed with the gas turbine of FIG. 3.

A fuel system 251 is provided for delivering gaseous fuel to the gas nozzles 222 under controlled fuel valve operation as schematically illustrated in FIG. 7. Gas is transmitted to a diaphragm operated pressure regulating valve 254 via line 252 from the plant gas source. A pressure switch 255 provides for transfer to oil fuel at a low gas pressure limit. Pressure switches 257 and 259 provide high and low pressure limit control action on the downstream side of the valve 254. It is noted at this point in the description that IEEE switchgear device numbers are generally used herein where appropriate as incorporated in American Standrad C37.2–1956.

A starting valve 256 determines gas fuel flow to the nozzles 222 at turbine speeds up to approximately 10 percent rated flow, and for this purpose it is pneumatically positioned by an electropneumatic converter 261 in response to an electric control signal. At gas flow from 10% to 100% rated, a throttle valve 258 determines gas fuel flow to the nozzles 222 under the pneumatic positioning control of an electropneumatic converter 263 and a pneumatic pressure booster relay 265. The converter 263 also responds to an electric control signal as subsequently more fully considered.

A pneumatically operated trip valve 260 stops gas fuel flow under mechanical actuation if turbine overspeed reaches a predetermined level such as 110 percent rated speed. A pneumatically operated vent valve 262 allows trapped gas to be vented to the atmosphere if the trip valve 260 and an on/off pneumatically operated isolation valve 264 are both closed. The isolation valve fuel control action is initiated by an electric control signal applied through the pressure switch and gauge cabinet 152 (FIG. 1 and FIG. 9). A pressure switch 267 indicates fuel pressure at the inlet to the nozzle 222.

As schematically shown in FIG. 8, a liquid fuel supply system 266 provides for liquid fuel flow to the eight nozzles 218 from the plant source through piping and various pneumatically operated valves by means of the pumping action of a turbine shaft driven main fuel pump 268. Pump discharge pressure is sensed for control system use by a detector 277. A bypass valve 271 is pneumatically operated by an electropneumatic converter 270 and a booster relay 272 to determine liquid fuel bypass flow to a return line and thereby regulate liquid fuel discharge pressure. An electric control signal provides for pump discharge pressure control, and in particular it provides for ramp pump discharge pressure control during turbine startup. A throttle valve 273 is held at a minimum position during the ramp pressure control action on the discharge pressure regulator valve 270. A pressure switch 269 provides for DC backup pump operation on low pressure, and a pressure switch 275 indicates whether the pump 268 has pressurized intake flow.

After pressure ramping, the pneumatically operated throttle valve 273 is positioned to control liquid fuel flow to the nozzle 218 as determined by an electropneumatic converter 274 and a booster relay 276. An electric control signal determines the converter position control action for the throttle valve 273. The bypass valve 270 continues to operate to hold fuel discharge pressure constant.

As in the gas fuel system 251, a mechanically actuated and pneumatically operated overspeed trip valve 278 stops liquid fuel flow in the event of turbine overspeed. A suitable filter 280 is included in the liquid fuel flow path, and, in the gas fuel system 251, an electrically actuated and pneumatically operated isolation valve 282 provides on/off control of liquid fuel to a liquid manifold 283.

Eight positive displacement pumps 284 are respectively disposed in the individual liquid fuel flow paths to the nozzles 218. The pumps 284 are mounted on a single shaft and they are driven by the oil flow from the manifold 283 to produce substantially equal nozzle fuel flows. Check valves 286 prevent back flow from the nozzles 218 and a pressure switch 288 indicates fuel pressure at the oil nozzle 218. A manifold drain valve 290 is pneumatically operated under electric signal control during turbine shutdown to drain any liquid fuel remaining in the manifold 283.

4. Plant Performance Characteristics

Details concerning plant performance characteristics are contained in the aforementioned related application Ser. No. 82,470, Section A4, pages 32 to 36.

B. Power Plant Operation And Control

1. Control System — General

The preferred embodiment of the integrated turbine generator control system 300 (FIG. 9) employs analog digital computer circuitry to provide sequenced start-stop plant operation, monitoring and alarm functions for plant protection which accurately, reliably and efficiently performs speed/load control during plant startup, running operation and shutdown. The plant control system 300 is characterized with centralized systems packaging having a single operator's panel and embracing elements disposed in the control cabinet 118, the pressure switch and gauge cabinet 152 and other elements included in the electric power plant 100 of FIG. 1. If multiple plants like the power plant 100 are to be operated, plural control cabinets may be required to provide the additional circuitry needed for the additional plant operations.

The control philosophy embodied in the control system 300 provides flexible operator/control system interfaces. Under automatic control, the power plant 100 can be operated under local operator control or it can be unattended and operated by direct wired remote or supervisory control.

2. Control Loop Arrangement — Characterization

Figure 10:
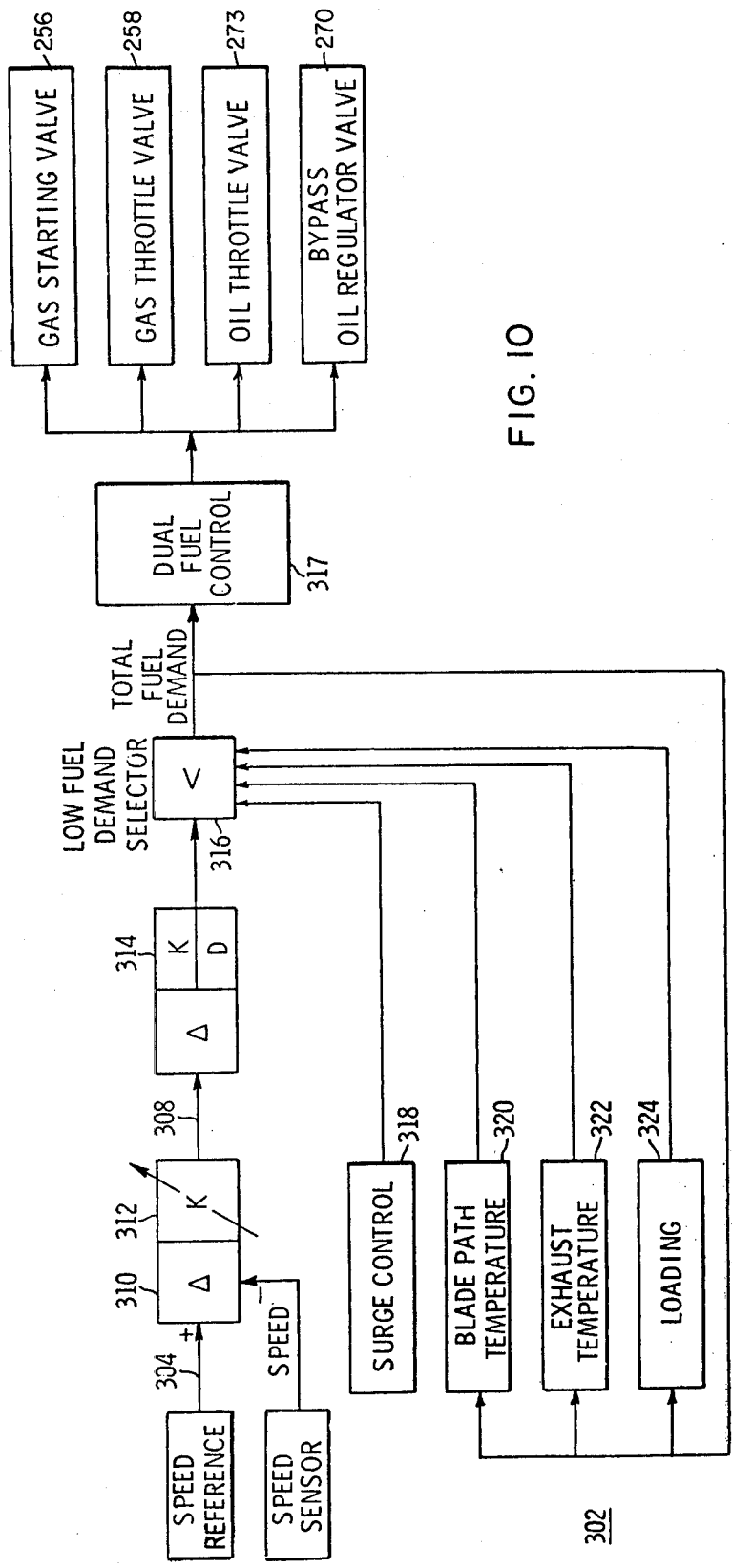
FIG. 10 shows a schematic diagram of a control loop which may be employed in operating the computer control system of FIG. 9 and the power plant of FIG. 1.
Figure 11A:
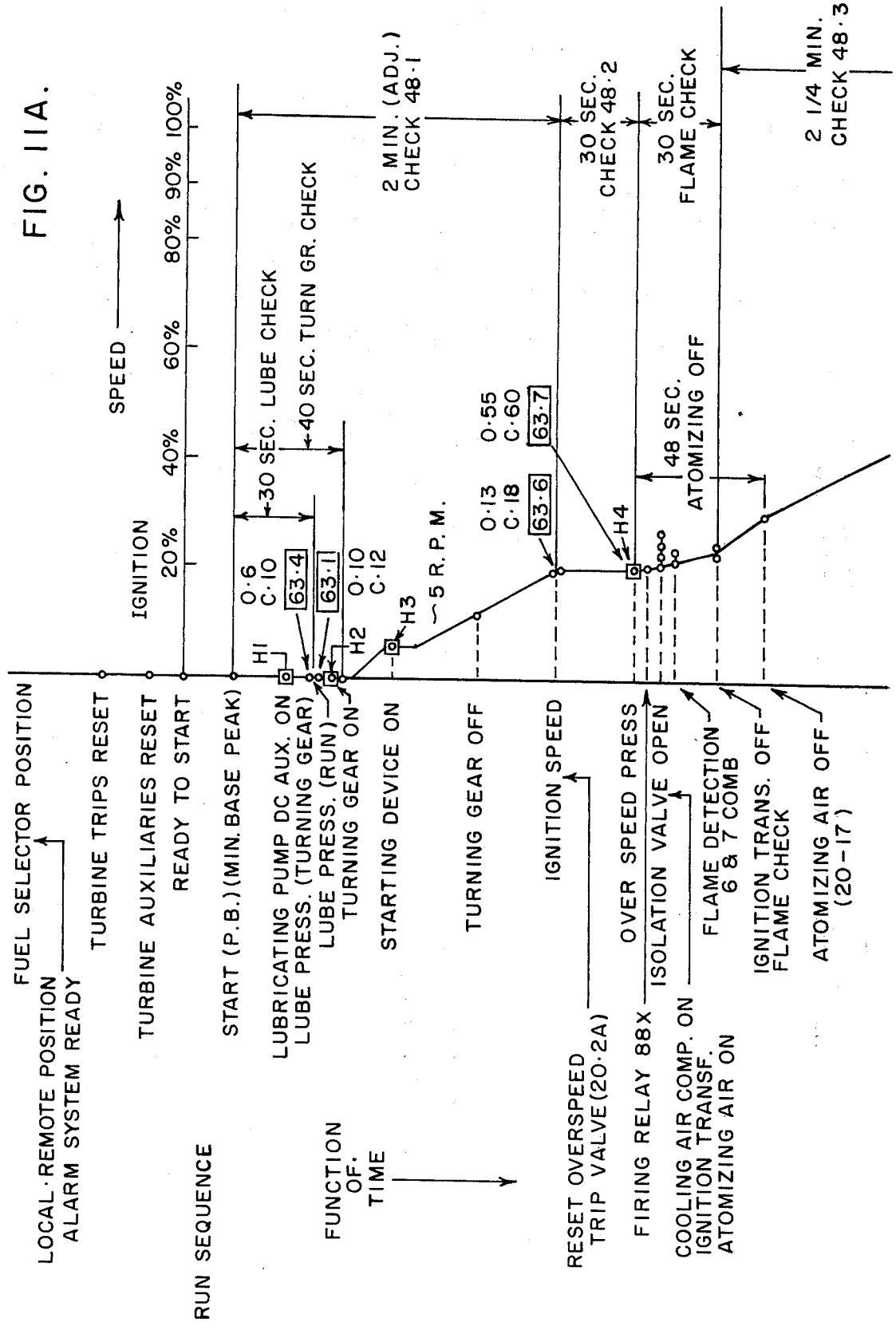
FIGS. 11A-B show a sequence chart for startup and shutdown of the gas turbine power plant.
Figure 11B:
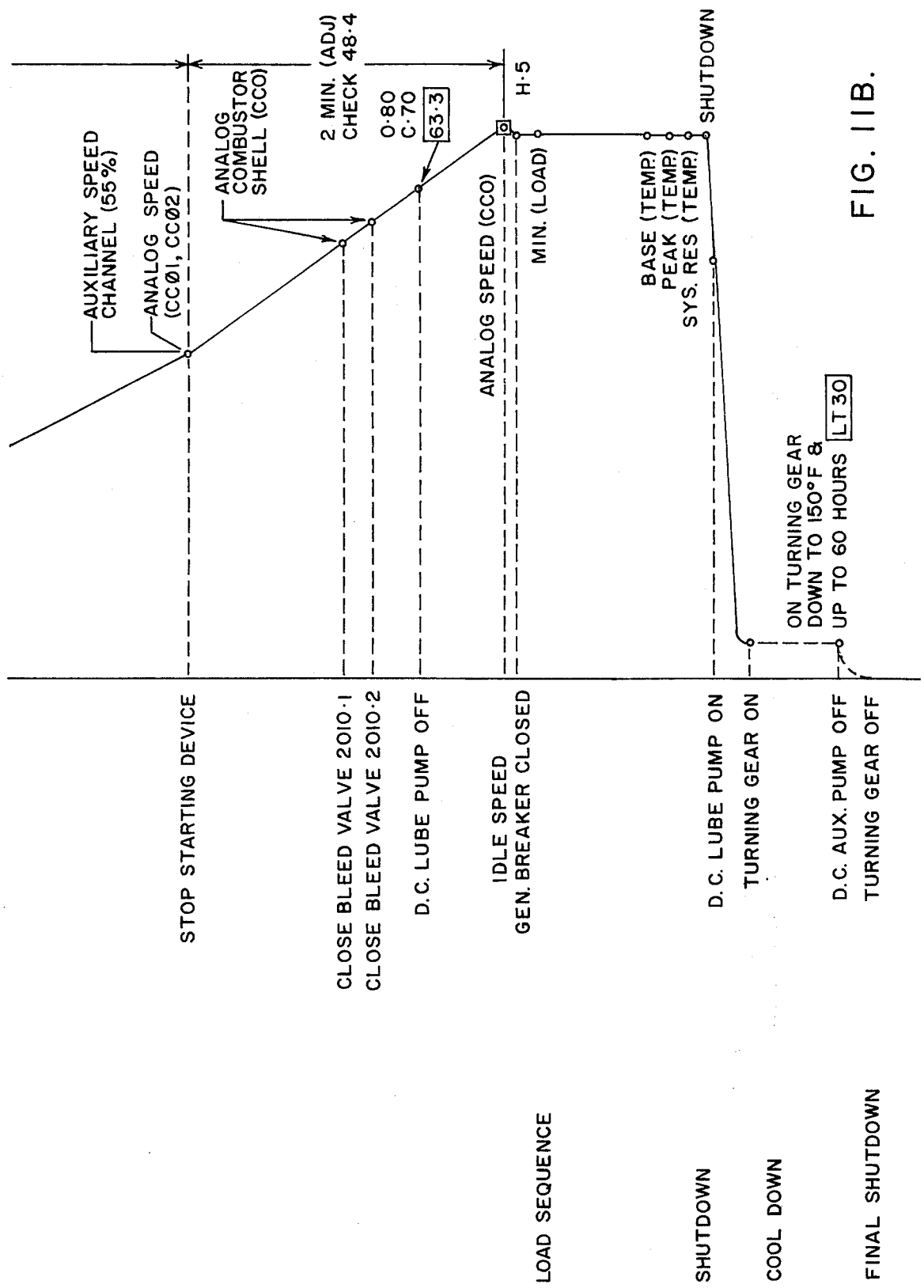

In FIG. 10, a control loop arrangement 302 represented by SAMA standard function symbols characterizes the preferred general control looping embodied in the preferred control system 300 and applicable in a wide variety of other applications of the invention. Reference is made to the aforementioned copending application Ser. No. 83,470, Section B2, pages 39 to 51, wherein there is contained a more detailed discussion of the control loop 302.

Briefly, the control loop arrangement 302 comprises an arrangement of blocks in the preferred configuration of process control loops for use in operating the gas turbine power plant 100 or other industrial gas turbine apparatus. No delineation is made in FIG. 10 between hardware and software elements since many aspects of the control philosophy can be implemented in hard or soft form. However, it is noteworthy that various advantages are gained by hybrid software/hardware implementation of the control arrangement 302 and preferably by implementation in the hybrid form represented by the control system 300.

Generally, in the various control mode sequences to be hereinafter more fully discussed, the plant 100 is started from rest under control of loop 302, accelerated under accurate and efficient control to synchronous speed, preferably in a normal fixed time period, synchronized manually or automatically with the power system, and loaded under preferred ramp control to a preselectable constant or temperature limit controlled load level, thereby providing better power plant management.

In the combination of plural control loop functions in the arrangement 302, a low fuel demand selector block 316 is preferably employed to limit the speed reference fuel demand representation if any of three limit representations are exceeded by it during startup. These limit representations are generated respectively by a surge control 318, a blade path temperature control 320, and an exhaust temperature control 322. In this application, a load control block 324 becomes operative after synchronization with the limit blocks 318, 320 and 322. Thus, the operation of the plural control loop 302 as a function of the various limit representations varies during the various control modes of operation.

At the output of the low fuel demand selector 316 the fuel demand representation is applied to a dual fuel control 317 where the fuel demand signal is processed to produce a gas fuel demand signal for application to the gas starting and throttle valves 256 and 258 respectively, or a liquid fuel demand signal for application to the oil throttle and pressure bypass valve or, in accordance with the principles of the present invention, as a combination of gas and liquid fuel demand signals for application to the gas and oil valves together. Thus, the fuel demand in the control arrangement 302, provides position control for both turbine gas and liquid fuel valves (FIG. 7). Further, the control arrangement 302 provides both simultaneous burning of gas and liquid fuel, as well as automatic transfer from one fuel to the other, as will be hereinafter more fully described.

In order to start the plant 100, the control system 300, operating in control Mode 0, requires certain status information generated by the various process sensors. Once it is logically determined that the overall plant status is satisfactory, the plant startup is initiated. Plant devices are started in parallel when possible to increase plant availability for power generation purposes.

As control is transferred through the various control modes a feedforward characterization is preferably used to determine representation of fuel demand needed to satisfy speed requirements. Measured process variables including turbine speed, the controlled load variable or the plant megawatts, combustor shell pressure and turbine exhaust temperature are employed to limit, calibrate or control the fuel demand so that apparatus design limits are not exceeded. The characterization of the feedforward speed fuel demand, a surge limit fuel demand and a temperature limit fuel demand are preferably non-linear in accordance with the non-linear characteristics of the gas turbine to achieve more accurate, more efficient, more available and more reliable gas turbine apparatus operation. The control arrangement 302 has capability for maintaining cycle temperature, gas turbine apparatus speed, acceleration rate during startup, loading rate and compressor surge margin.

The control arrangement 302 is implemented such that different process variables are given greater weight in determining the control function to be performed as control progress sequentially through the modes of operation.

3. Control System

The control system 300 is shown in block diagram detail in FIG. 9. It includes a general purpose digital computer system comprising a central processor 301 and associated input/output interfacing equipment such as that sold by Westinghouse Electric Corporation under the trade name Prodac 50 (P50). Generally, the P50 computer system employs a 16,000 word core memory, with a word length of 14 bits and a 4.5 microsecond cycle time.

More specifically, the interfacing equipment for the computer 301 includes a contact closure input system 309 and a conventional analog input system 311. Sixty-four input/output channels each having 14 bit parallel paths into and out of the main frame are provided. Each of the employed interrupt inputs causes a separate and unique response within the computer main frame without need for additional input operations thereby allowing the processing of interrupt input signals with very little main frame duty cycle.

Process inputs are provided by the contact closure input system 309 and the analog input system 311. The contact closure input (CCI) system is coupled to the operator console panel 120 and remote operator's panel 323. Characteristic CCI's are those related to the starting engine contacts. Also, a facility exist for customer selection of devices to be coupled to the CCI system.

Characteristic inputs to the analog input system 311 are the outputs from the various plant process sensors and detectors, namely, turbine 104 sensors such as blade path and exhaust manifold thermocouples. Additional inputs are those from a combustor shell pressure sensor and the main and backup speed sensors. The speed sensor outputs are coupled to the analog input system 311 through an analog speed control 327 and an auxiliary speed limiter 329, respectively.

The computer supplies essential outputs of various descriptions for display at the operator's console 120 or the like. They are also applied as analog inputs as indicated by reference character 364. The contact closure output system 319 transfers digital speed reference, speed/load limit and fuel transfer outputs to external circuitry as indicated respectively by the reference characters 335, 337 and 339.

An embodiment of one aspect of the principles of the present invention is represented in FIG. 9 by analog dual fuel control system 317. In the instant embodiment, dual fuel control system 317 is operated by the speed control 327 to determine the position of the liquid and gas fuel valves, considered in connection with FIGS. 7 and 8, and in a manner to be hereinafter more fully described.

Briefly, within the framework of gas turbine control system 300, programmed computer operations determine the relative positioning of the fuel valves so that sufficient fuel is continuously provided to gas turbine 104 to satisfy fuel demands, over all modes of turbine operation. As depicted in FIG. 9, a contact closure output coupling to the dual fuel control 317 indicated by reference character 343 provides for communication of the computer determined values. Thus, relative fuel settings are provided for two fuel or single fuel operation. Also in this arrangement dual fuel control 317 is continuously responsive to updated fuel settings so that automatic fuel transfers occur as a smooth transition from operation on one fuel to operation on the other.

The coupling of the contact closure output system 319 with the analog speed control 327 is within the framework of the preferred software/hardware hybrid control system. Another contact closure output 343 to the analog speed control 327 provides for a minimum fuel flow into the turbine combustor system in order to prevent flameout after ignition.

The contact closure output system 319 is also connected to the operator's panel 120 and to sequence the starting engine 126. A synchronizer detection circuit 352 has bus line and generator potential transformers coupled to its input and the contact closure output system 319 signal provides a visual panel indication for manual synchronization. The detection circuit 352 also supplies signals to the analog input system 311 for automatic synchronization when such synchronization is employed as considered more fully in the aforementioned Reuther and Reed copending patent applications.

Other devices operated by the contact closure outputs include the generator field breaker and the generator line breakers 131 and 139. The motor operated generator exciter field rheostat 171 and 177 and various devices in the motor control center 130 and the pressure switch and gauge cabinet 152 also function in response to contact closure outputs. The printer or teletype 313 is operated directly as a special input/output channel to the main frame 301.

The foregoing is an abbreviated specification of a control system employed in implementing the preferred embodiment of the present invention, suitable for use in gas turbine electric power plant control. A more complete discussion of the preferred control system may be found in the aforementioned copending application Ser. No. 82,470, Section B3, pages 51 to 62.

4. Analog Circuitry

Figure 12A:
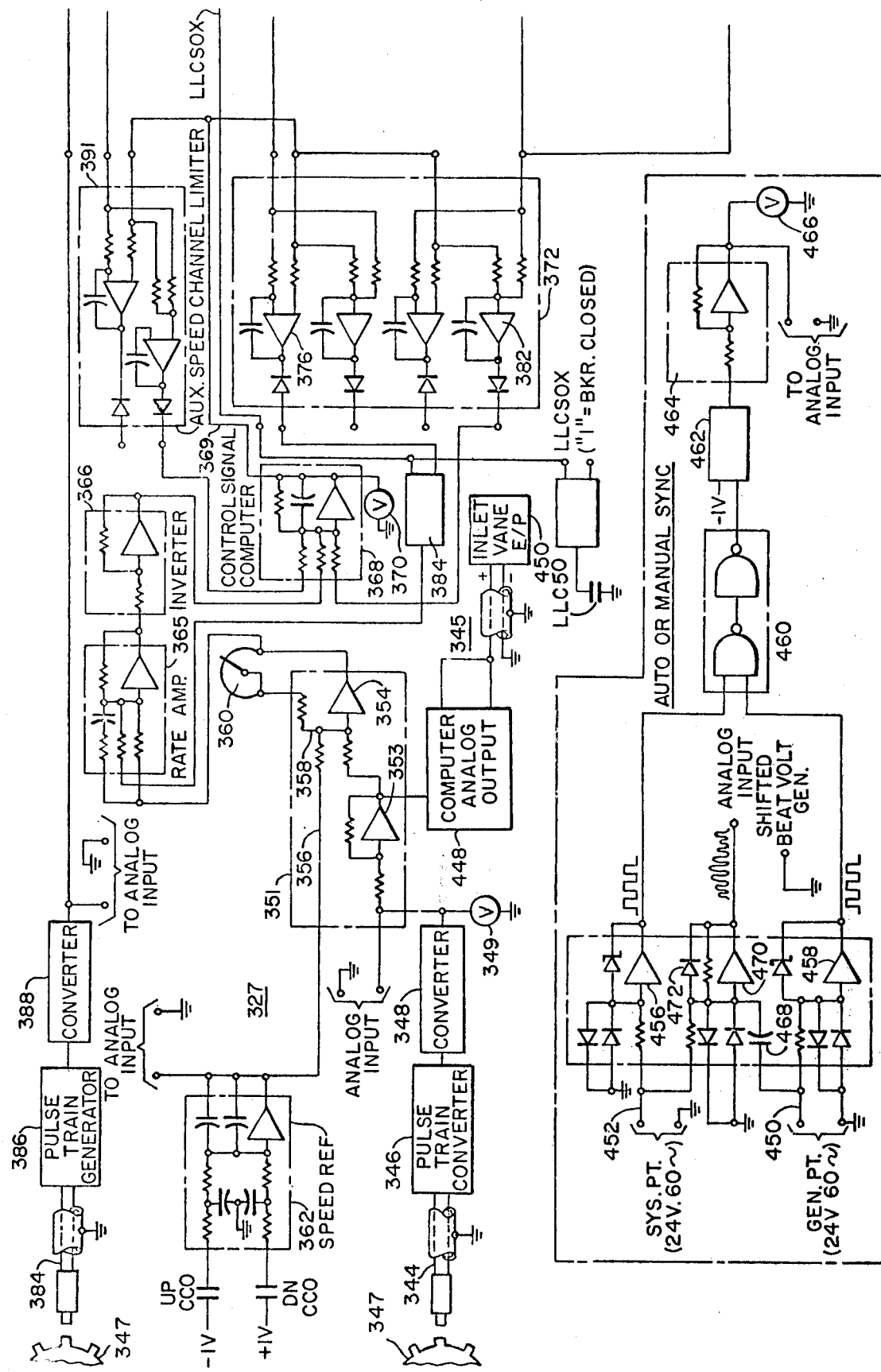
FIGS. 12A and 12B show a schematic diagram of analog circuitry associated with the computer in the control system to provide control over gas turbine fuel supply system operations and certain other plant functions.
Figure 12B:
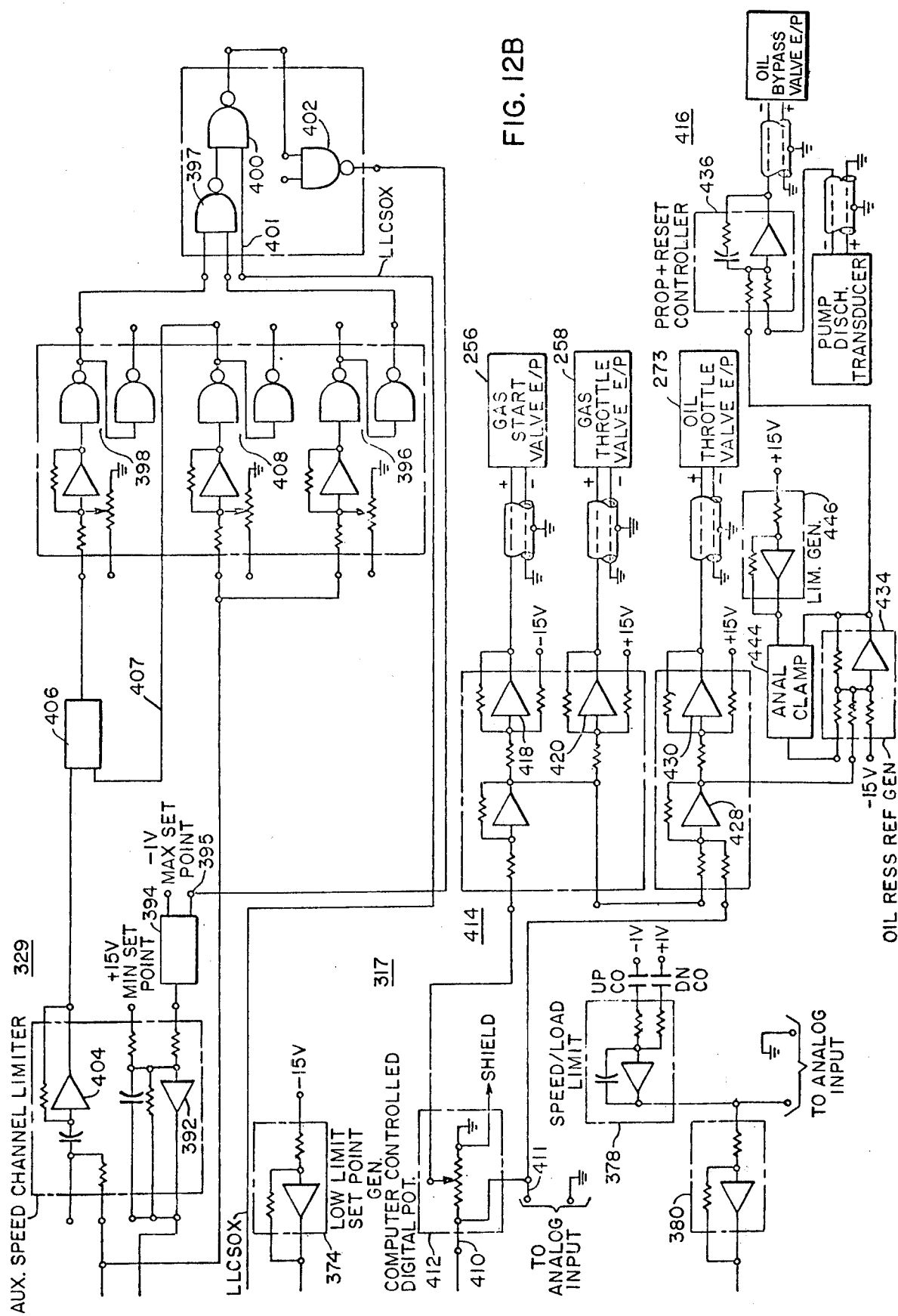

The speed control circuit 327 operates in response to a main speed signal generated by a main turbine speed sensor 344 associated with a 44 tooth magnetic rotor wheel 347 as shown in greater detail in FIG. 12A. The speed sensor 344 is a conventional reluctance type device which generates a sinusoidal output waveform. Circuit block 346 converts the sinusoidal speed signal into an output signal having a constant width pulse at twice the input frequency.

Generally, the circuit block 346 includes a zero crossing sense amplifier which produces a pulse of approximately 15 microseconds duration every time the input waveform crosses zero. To detect zero crossing, to the block 346, the input is compared with zero by a two stage comparator which changes state every time the input crosses zero. The edges of the comparator square wave output are differentiated to produce a pulse train having twice the input frequency. In turn, the resultant output pulse train is applied to counter enable circuitry which initiates the operation of a clocked counter on the occurrence of each pulse. The counter enable circuitry is reset by the clocked counter 85 microseconds after the application of each set pulse. Accordingly, a circuit block output is generated by the counter enable circuitry in the form of a train of 85 microsecond pulses occurring at twice the input frequency.

The output pulse train from the circuit block 346 is applied to circuit block 348 which converts the pulse train into a direct voltage proportional to the pulse frequency. Generally, the circuit block 348 comprises a transistor switch network which is coupled to an R-C averaging network. The ON time of the transistor switch network is a constant 85 microseconds but the OFF time varies inversely with the input frequency. The averaging network generates a DC voltage output which is amplified and it is a function of the relationship between the ON and OFF times of the transistor switch network. Accordingly, the amplitude of the averaging network output is directly proportional to the frequency of the input constant width pulse train.

From the circuit block 348, an output is applied to a turbine speed meter 349 and to the input of an error detector circuit block 351. It is noted at this point in the description that each circuit block in FIGS. 12A and B denotes a circuit card which is mounted in the control cabinet.

The actual speed signal at the output of the circuit block 348 is also applied to the analog input system 311 (FIG. 9). The computer thereby obtains a representation of the actual turbine speed determined by the main turbine speed sensor 344.

At the input of the speed error detector circuit 351, the speed signal is amplified and inverted by an operational amplifier 353. It is then applied to the input summing junction of an error detector operational amplifier 354.

A speed reference signal as indicated by the reference 356 and an adjustable speed regulation feedback signal indicated by the reference character 358 are also applied to the error detector summing junction. An adjustable potentiometer 360 determines the gain of the amplifer 354 by determining the magnitude of the amplifier circuit feedback signal, and the potentiometer resistance variation provides for adjustment in the gain and the speed regulation over a range from 2 percent to 6 percent.

The speed reference signal is an analog signal obtained from an analog output circuit block 362 which operates as a digital to analog converter in responding to a speed reference signal generated at the computer output in digital form. Generally, the analog output block 362 comprises an integrating amplifier to which up and down computer contact closure outputs are coupled. Programmed computer operation determines the period of closure of the respective contact outputs to determine the output voltage from the analog output block 362. In turn, the output voltage from the analog output block 362 is coupled to the computer 301 through the analog input system 311. The output contacts associated with the block 362 are held open when the speed reference analog voltage is detected to be at the digital command value.

With reference again to the error detector block 351, the summation of the speed reference, actual speed and speed feedback regulation signals results in the generation of a speed error output signal for application to a proportional plus rate amplifier 364. The amplified speed error signal is then inverted to obtain the correct polarity by an inverter block 366. If no fuel demand limit action is applied, the speed error signal is further amplified by a mixer amplifer circuit block 368 to generate a contact signal output (CSO) or a fuel demand signal on line 369 for input to the fuel control system 317 and for fuel demand or control output signal monitoring by meter 370.

A clamp circuit block 372 includes two circuits which are used to impose high and low limits on the fuel demand signal. A low limit setpoint of 1.25 volts is generated by a low limit setpoint generator circuit block 374 and applied to the negative input of clamp amplifier 376 for comparison with the fuel demand signal which is applied to the positive input from the fuel demand amplifier 368.

Similarly, a high limit for the fuel demand signal is established by a setpoint signal generated by an analog output circuit block 378 and an inverter 380 and applied to the positive input of another clamp amplifier for comparison with the fuel demand signal which is also applied to the positive clamp amplifier input. The computer output signal coupled to the analog output block 378 is the lowest of the fuel demand limit representations generated by control blocks 318, 320, 322 and 324 (FIG. 10) under programmed computer operation.

The output of the clamp amplifier 382 is coupled to the input of the amplifier block 368 to produce low select fuel demand limit action on the fuel demand signal. Similarly, the output of the clamp amplifier 376 is applied to the input of the proportional plus rate amplifier 364 through an analog switch 384 which becomes conductive if a low fuel limit signal LLCSOX has been generated by the computer, i.e. if the fuel demand signal has reached 1.25V, to prevent flameout particularly on load transients through low limit fuel demand action.

If the fuel demand signal tends to drop below 1.25 volts, the low limiter clamp amplifier 376 operates through the analog switch 384 to clamp the input to the proportional plus rate amplifier at a level which results in the fuel demand signal output from the circuit block 368 having a voltage level of 1.25 volts. Similarly, the high limiter clamp amplifier 382 clamps the fuel demand amplifier 368 to prevent the fuel demand signal from exceeding the present value of the fuel demand limit as determined and output by the computer 304.

The auxiliary or backup speed limiter 329 is preferably employed to provide backup speed protection in conjunction with the main speed control 327. The turbine speed value at which the backup speed protection is provided is above the maximum speed range over which the speed control 327 is intended to provide control. For example, the maximum speed reference value within the speed control range of the speed control 327 may be 104 percent rated speed and the auxiliary speed limiter circuit 329 may provide backup speed limit protection at a speed of 108 percent rated. The mechanical backup speed limiters associated with the fuel systems referred to previously in connection with FIGS. 9 and 10 then provide further backup speed protection at a speed of 110 percent rated.

An auxiliary speed sensor 384 cooperates with the 44 tooth magnetic wheel 345 on the turbine-generator rotating element to generate a sinusoidal speed signal in the manner described for the main speed sensor 344. A pulse train is then generated by pulse train generator block 386 in the manner described for the circuit block 346 in the main control channel. Next, a converter block 388 generates an analog speed signal in response to the pulse train output from the circuit block 386 in the manner considered in connection with the main speed converter circuit 348.

The backup speed limit is imposed on the turbine operation by an analog clamp circuit in circuit block 391. The output of the amplifier clamp circuit block 391 is applied to the summing junction input of the mixing amplifier 368 to produce limit action on the fuel demand signal generated by the amplifier 368 in a manner similar to that described in connection with the limit action produced by the clamp amplifier circuit 376.

More particularly, the backup speed clamp amplifier circuit block 391 causes the fuel demand signal to be cut back to the minimum value of 1.25 volts to cause turbine deceleration without flameout when a speed limiter setpoint generator circuit 392 is caused to apply a low limit setpoint of −1.25 volts to the positive input of the clamp amplifier for comparison with the fuel demand signal which is also applied to the positive input. An analog switch 394 is made conductive by input 395 to couple a one volt supply to the input of the setpoint generator circuit 392 and cause the generation of the low limit setpoint if either of two logic conditions is satisfied.

To provide low limit setpoint generation and auxiliary speed backup protection if the turbine speed exceeds the predetermined limit value of 108 percent as a first logic condition, the auxiliary speed signal is applied to the input of a comparator circuit 396 which generates an output signal for application to a NAND circuit 397 when the speed signal is too high. A NAND circuit 400 reponds if LLCSOX exists to generate a switching signal at the input 395 of the analog switch 394 through a logic inverter 402.

The second logic condition which causes auxiliary speed backup limit protection is preferably included so that the turbine operation is cut back if the rate of speed change is too great at any turbine speed value over a predetermined speed range such as 102 percent rated speed to 108 percent rated speed. For this purpose, the auxiliary speed signal is applied to the input of a rate amplifier 404 which generates a speed derivative signal applied to the switching path of an analog solid state switch 406.

The speed derivative signal is coupled through the switch path of the switch 406 to the input of another comparator 398 if the turbine speed is above the bottom range value of 102 percent rated speed. As indicated by reference character 407, a switching action input is applied to the speed derivative analog switch 406 by a comparator 408 if the auxiliary speed signal applied to its input exceeds the predetermined value corresponding to 102 percent rated speed. If the turbine speed is excessive, the speed derivative signal is compared to a predetermined acceleration limit by the comparator 398. If the acceleration is also excessive, an output from the comparator 398 is coupled through the logic circuits 397, 400 and 402 to the control input of the logic switch 394 which causes low limit action on the fuel demand signal through the clamp amplifier 392 as already described.

The fuel demand signal generated at the output of the fuel demand amplifier 368 accordingly is representative of the fuel needed to satisfy the computer generated speed reference, the fuel needed to satisfy a computer determined limit action, the low limit fuel demand needed to prevent flameout during normal speed operations, or to cause turbine speed cutback without flameout when overspeed conditions are detected by the auxiliary speed limiter circuit 329. In the instant embodiment of one aspect of the present invention, the fuel demand signal is applied across a digital potentiometer 412, illustrated schematically as an analog potentiometer, via an input 410 to the dual fuel control system 317. The fuel demand signal is also applied to the computer analog input system 311 for programmed computer operations as indicated by the reference character 411.

In the leftmost position of the dual fuel demand potentiometer 412, the fuel demand signal is fully applied to a gas fuel control system 414. In the rightmost potentiometer position, the fuel demand signal is fully applied to a liquid fuel control system 416. At intermediate potentiometer positions, the total fuel demand signal is ratioed between the gas and fuel control systems 414 and 416 to produce the individual fuel flows which satisfy gas turbine operation demands.

The digital potentiometer position is determined by programmed computer operation of contact output closures to produce the desired fuel or mixed fuel flow to the burners. Fuel transfer operations are also placed under automatic computer control through the digital potentiometer 412.

Figure 13:
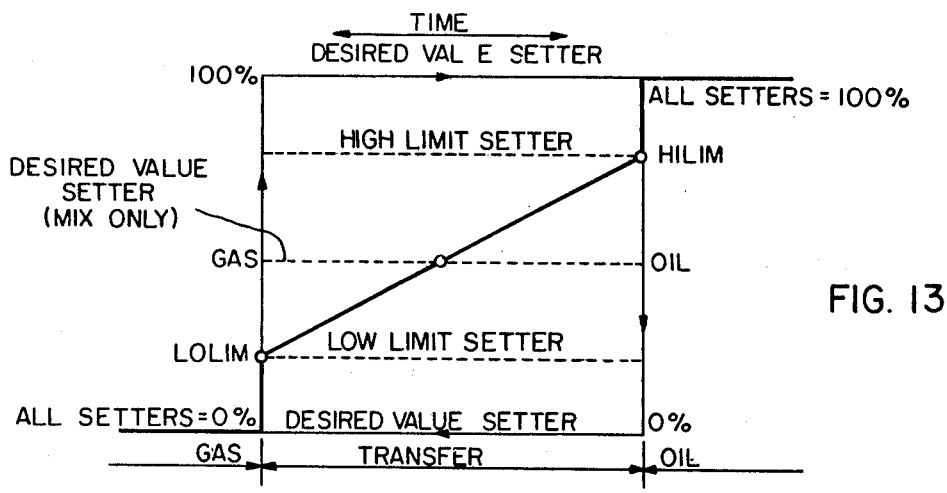
FIG. 13 demonstrates the step and ramp functions as they are implemented in the computer directed automatic fuel transfer in accordance with the principles of the present invention.

Referring to FIG. 13, the action of digital potentiometer 412 during fuel transfer operations is demonstrated. Step and ramp functions are illustrated. The initial action taken upon a determination of the existence of a condition dictating a need for fuel ratioing or transfer is to schedule sufficient of the other fuel to sustain operation at a level presently determined as optimal, given a desired load level. For simplicity optimum operation may be assumed to be determined as that which may be sustained on gaseous fuel solely, so that at any given time the fuel scheduling optimality criterion would be satisfied by burning all available gas while making up deficiencies with liquid fuel.

In FIG. 13 there is shown a transfer from gas to oil. Prior to the initiation of transfer the gas turbine 104 is operated consistent with the above-discussed optimality criterion. Upon a determination of a need to mix the two fuels, in response to a setpoint input, for example, the computer functions to determine the set of values defining the potentiometer settings required to implement the depicted step and ramp functions. The initial step may be varied. Characteristically, it is set at 12½ percent oil, a value which normally slightly over-compensates for gradually failing gas supply. In this manner, the worst case anticipated, i.e., sudden fuel supply diminution, is handled by the standard step setting.

Figure 16A:
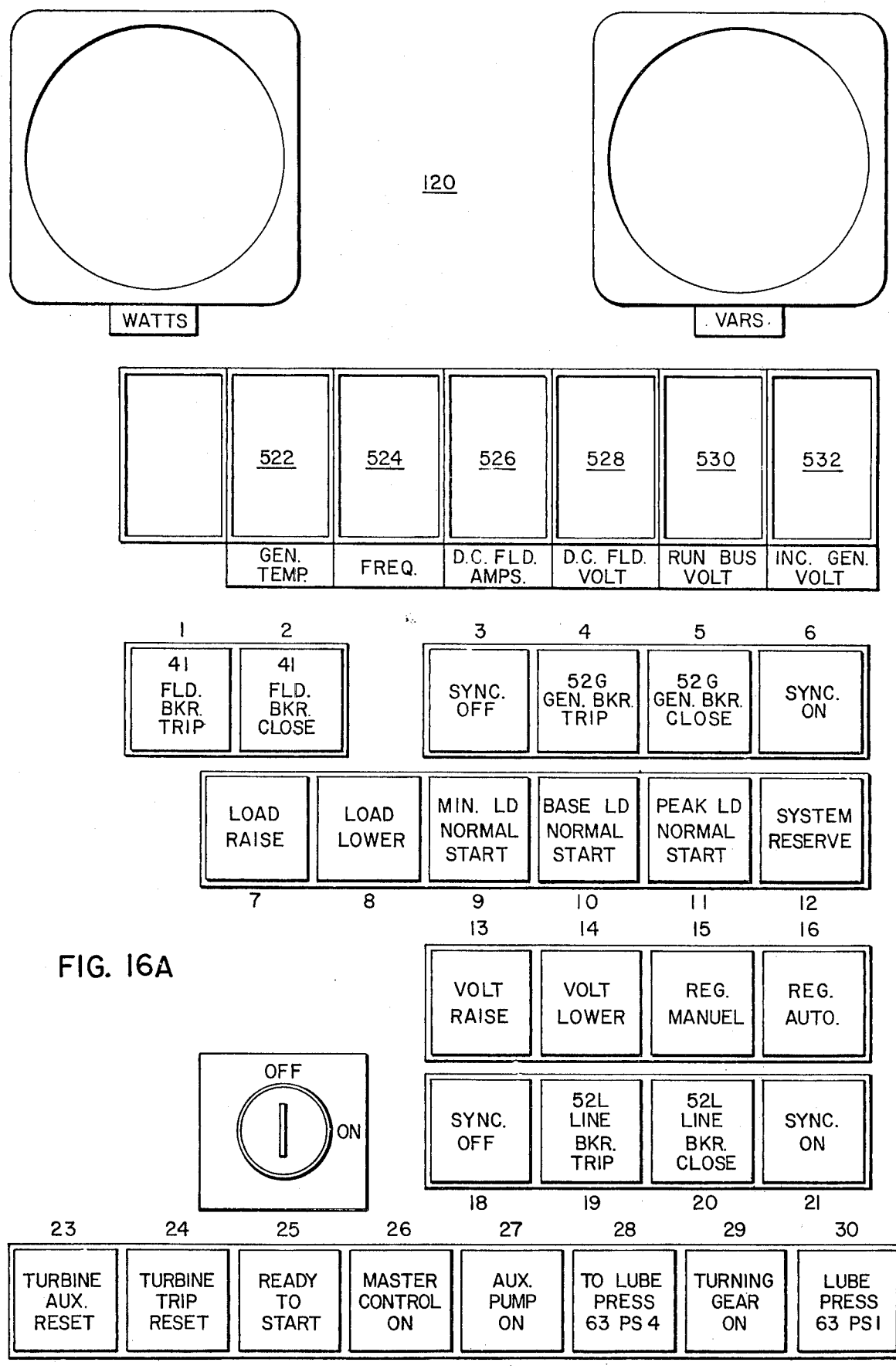
FIGS. 16A–C show a front plan view of a local operator's panel employed in the control system.
Figure 16B:
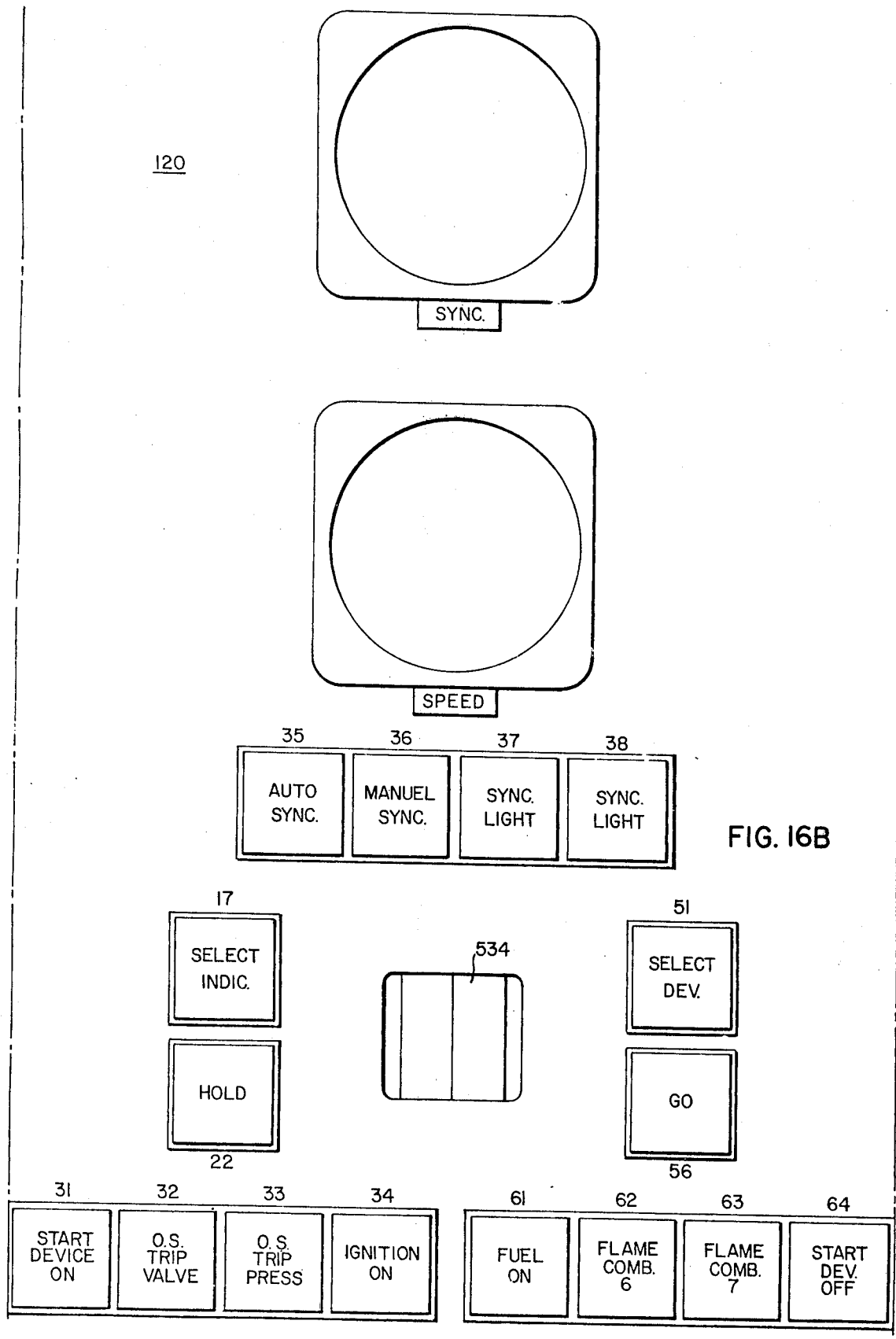
Figure 16C:
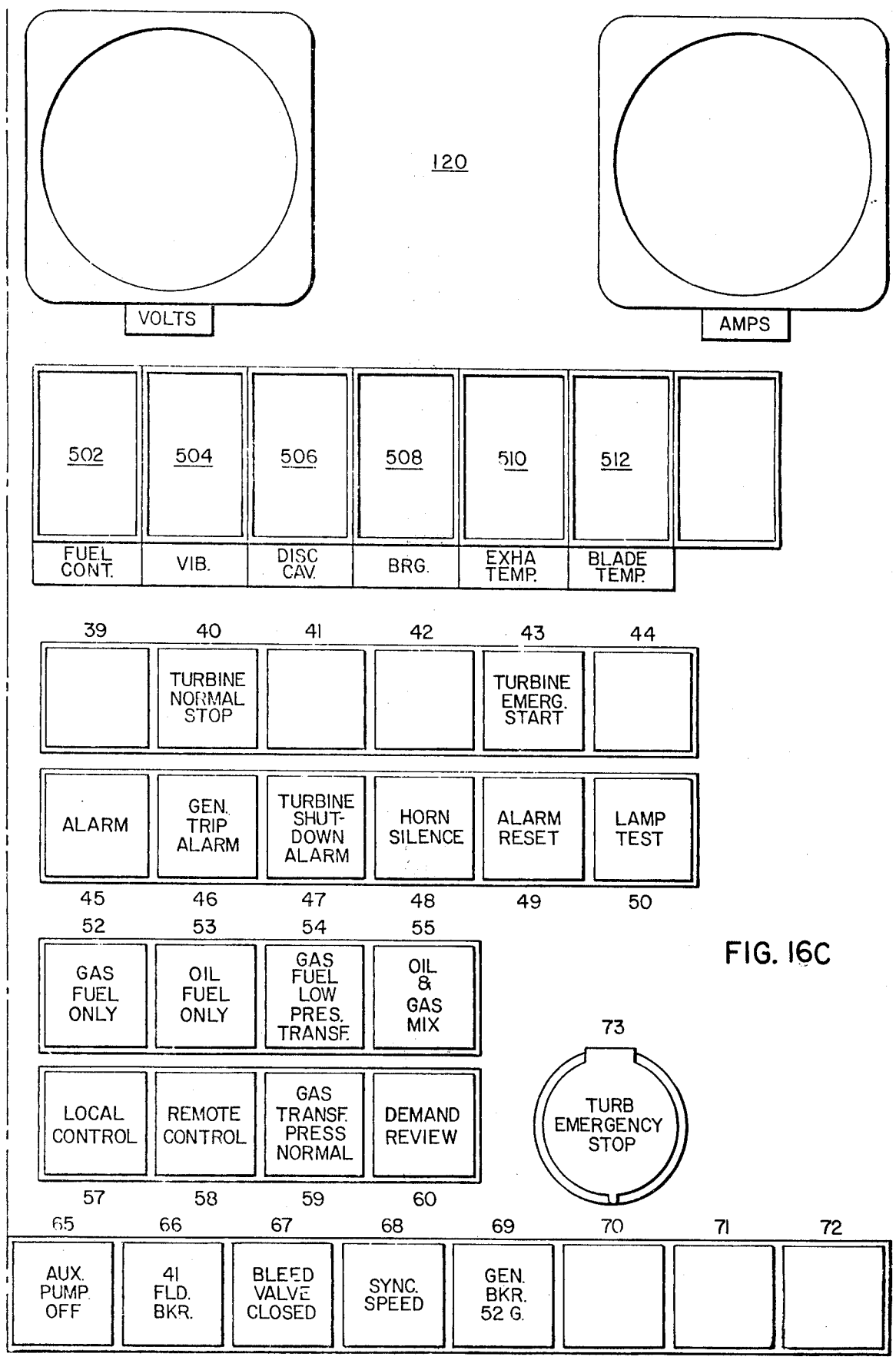

The ramping action controlled by the output from digital potentiometer 412 commences immediately upon completion of the initial step and continues until the desired fuel mix is reached, as defined by a control panel setting (FIG. 16), or until the fuel transfer computer output signal has defined an 87½ percent oil and 12½ percent gas mixture. At this point, the computer directs a final 12½ percent oil step, thereby completing the transfer. Again these values may be varied so that both step and ramp values are different. The derivation of the computer control signal in accordance with the principles of the present invention is described subsequently herein in Section D8.

Figure 14:
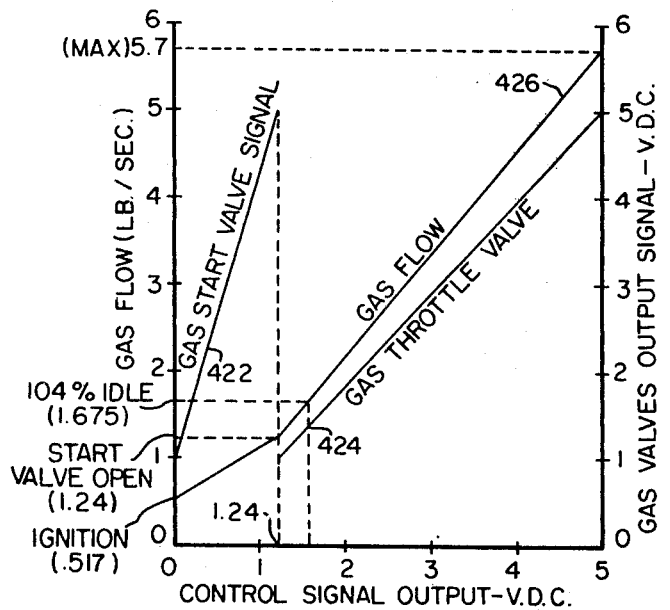
FIGS. 14 and 15 show fuel system control signal characteristics associated with the analog circuitry of FIGS. 12A and B.

The gas fuel demand signal is applied to the input of a signal range adjuster amplifier 418 to produce the predetermined gain and bias characterization for operation of the gas start valve. Similarly, the gas demand signal is applied to the input of a signal range adjuster amplifier 420 to provide the predetermined gas throttle valve characterization. In FIG. 14, there are shown the respective characterizations 422 and 424 for the adjuster amplifiers 418 and 420. Further, there is shown a net starting valve and throttle valve gas flow characteristic 426 which results from the characterized control placed on the starting valve and throttle valve electropneumatic converters by the amplifiers 418 and 420 as a function of the fuel demand control signal.

The gas fuel demand signal and the total fuel demand signal are differenced at the summing junction of an operational amplifier 428 to generate the liquid fuel demand signal. As already indicated, the liquid fuel demand signal is equal to the total fuel demand signal when the potentiometer 412 is positioned at its rightmost location to make the gas fuel demand signal zero.

Figure 15:
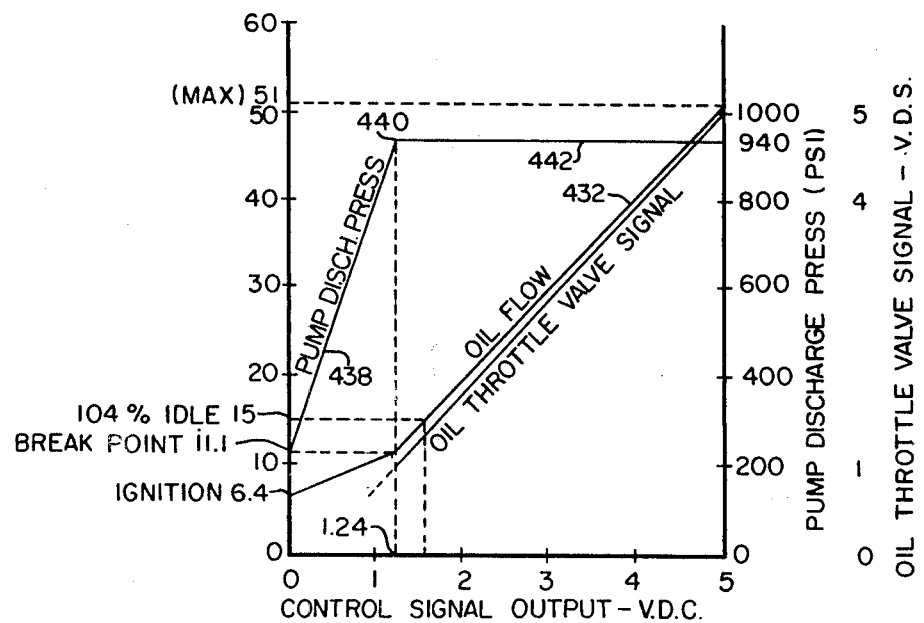

A signal range adjuster amplifier 430 operates on the liquid fuel demand signal to produce control on the liquid fuel throttle valve electropneumatic converter in accordance with the characteristic 432 shown in FIG. 15. The oil demand signal is also applied to the input of an oil pressure reference generator 434 which generates a ramp reference for a proportional plus reset plus rate controller 436. The pump discharge pressure transducer (FIG. 8) generates a feedback signal which is summed with the ramp reference and the resultant error signal is operated upon the proportional plus reset plus rate action by the controller 436 to operate the liquid fuel bypass valve electropneumatic converter 270 in accordance with the pump discharge pressure characterization indicated by the reference character 438 in FIG. 15. When gas fuel is selected, the oil discharge pressure is regulated to a predetermined minimum value.

When the liquid fuel demand signal reaches a value of 1.25 volts, the pump discharge pressure ramp is terminated as indicated by the reference character 440 in FIG. 15 and the pump discharge pressure is then held constant as indicated by the reference character 422 for higher liquid fuel demand signals. Thus, an analog clamp circuit 444 compares a limit voltage generated by a limit setpoint generator 446 to the oil pressure reference signal and clamps the output from the oil pressure reference generator 434 at a value which causes the pump discharge pressure to remain constant at the value indicated by the reference character 442.

The inlet guide vane control 345 considered previously in connection with FIG. 9 is more fully described in the aforementioned copending applications Ser. No. 82,470 and 189,633.

The synchronizer detection circuit 352 is responsive to sensed system voltage derived in this case from a bus potential transformer as indicated by the reference character 452 and sensed generator voltage derived in this instance from a generator potential transformer as indicated by the reference character 454 to detect the relative conditions of the two sensed waveforms for operator or automatic synchronization of the generator 102 with the system by closure of the generator breaker after completion of the startup period. For line breaker synchronization, the inputs are computer switched to the proper potential transformers. Respective square wave signals are generated by Zener diode clipped amplifiers 456 and 458 to which the system and generator voltage signals are respectively applied.

The two square waves are applied to an AND circuit block 460 which generates an output only when both squarewave signals are in the ON condition. In turn, an analog switch 462 applies an input to a phase difference amplifier 464 during the time period that a signal is generated by the AND circuit block 460.

The output voltage from the phase difference amplifier is proportional to the phase difference between the generator and system voltages and it is applied to an operator's panel voltmeter 466 for use by the plant operator during manual synchronization. At the extreme limits, a 180° phase difference results in a phase difference voltage approaching 0 volts and a 0° phase difference results in a phase difference voltage of 5 volts. The phase difference voltage is also applied to the computer 301 through the analog input system 308 when programmed automatic synchronization is employed.

It is also noteworthy that the generator voltage signal is phase shifted 90° by a capacitor 468 for vector summation with the system voltage signal at the input of a beat voltage generator amplifier 470. A diode 472 operates in the amplifier circuit to cause a beat frequency signal to be generated for input to the computer 304 through the analog input system 311 as a relative speed indication for programmed automatic synchronizing.

Additional functions performed by the analog system indicated in FIG. 9, as well as a more definitive discussion of those elements enumerated above may be found in copending application Ser. No. 82,470, pages 63 to 74.

5. Control Panels

The operator's panel considered in connection with FIG. 1 is included as part of an operator's console through which various process control functions may be initiated or altered. Additionally, process monitoring is provided in the form of various meters and alarms.

General control functions provided are the following:
  a. Breaker pushbutton control,
  b. Automatic synchronization ON/OFF,
  c. Synchronizing mode selection.

Among the control functions specific to the gas turbine are as follows:
  a. Normal start/stop,
  b. Emergency start/stop,
  c. Fuel selection,
  d. Automatic fuel transfer.

Flexible generator control is provided in the form of panel functions which permit selection of manual or automatic voltage regulation.

Alarm condition indicators are provided by alarm lights and a horn blow. Typical conditions giving rise to alarm status indications are those pertaining to system failures during startup. Alarms are provided which are associated with specific process monitoring devices such as generator vibration detectors, combustor basket flame detectors, and blade path and exhaust manifold thermocouples. A facility is provided for initiating computer determined alarm status responsive control functions.

Turning now to a consideration of the control panel functions (FIG. 16) relating to the dual fuel control system of the present invention, four pushbuttons are provided for fuel selection in the instant embodiment of the principles of the present invention:
  a. GAS FUEL ONLY
  b. OIL FUEL ONLY
  c. GAS FUEL LOW PRES TRANSFER
  d. OIL & GAS MIX
  A fifth, GAS XFER PRESS NORMAL, may allow for selection of a control option not considered as essential to an implementation of the preferred dual fuel control system, and will therefore not be discussed. A fuel ratio two digit thumb wheel switch 534 is provided for selecting the percent of oil to be used in mixed fuel operation.

Fuel system operating options selected at startup are as follows:
  a. GAS FUEL ONLY—STARTUP ON GAS. No change may be made until after generator breaker closing.
  b. OIL FUEL ONLY—STARTUP ON OIL. No change may be made until after generator breaker closing.
  c. OIL & GAS MIX—ALWAYS STARTUP ON GAS. Change to a mixture of gas and oil after generator breaker closing. The percent of oil to be used is entered from the panel 120, as previously discussed.
  d. GAS FUEL LOW PRES TRANSFER—STARTUP ON GAS. Change to oil on sensing a loss of gas pressure.

As indicated, changes in fuel system operating mode may be made after generator breaker closing, so that maximum flexibility of control exists during all modes of gas turbine operation.

A second set of pushbuttons function to initiate startup as well as to allow operating mode selection. The normal turbine startup selection is combined with load selection. Thus, pressing the pushbuttons associated with minimum, base or peak load provides for initiating a normal turbine start. After the generator breaker is closed the selected load level is automatically generated. The minimum, base and peak load levels can be selected at any time, but the system reserve load level can be selected by the associated pushbutton only after the generator breaker has been closed. The SYSTEM RESERVE pushbutton accordingly cannot be used to initiate a start. On emergency start, the gas turbine unit 104 is driven to the base load level of operation after it has reached idle speed and the generator breaker has been closed. However, a different load can be selected if desired. The LOAD RAISE and LOAD LOWER pushbuttons provide manual control over speed reference during synchronizing in Mode 2 and during temperature control in Mode 4. In Mode 3, these pushbuttons control the kilowatt reference.

The inter-relationship of the functions initiated by pressing MIN LD NORMAL START, BASE LD NORMAL START or PEAK LD NORMAL START and those functions initiated by the previously discussed fuel system operating mode selection pushbuttons will be discussed in more detail in Section D8. Briefly, the load selection functions dictate the operating mode for the gas turbine, so that, the fuel mixing and transfer functions are in part determined in response to selected load mode. Under minimum load control fuel transfer and mixing operations are executed while the turbine is on kilowatt control. The same functions are executed in BASE and PEAK load control mode while the gas turbine is under temperature control.

In the preferred embodiment increased control flexibility is achieved through the provisions of one or more remote control panels which, desirably, duplicate the functions of the local operator's panel.

A detailed discussion of the control panels may be found in the aforementioned copending application Ser. No. 82,470, at pages 74 through 97 thereof. Included is a listing of local and remote operator's panel contact closure output assignments, and a description of the entering of control parameter changes into the control system 300.

D. PROGRAM SYSTEM

1. General Configuration

Figure 17:
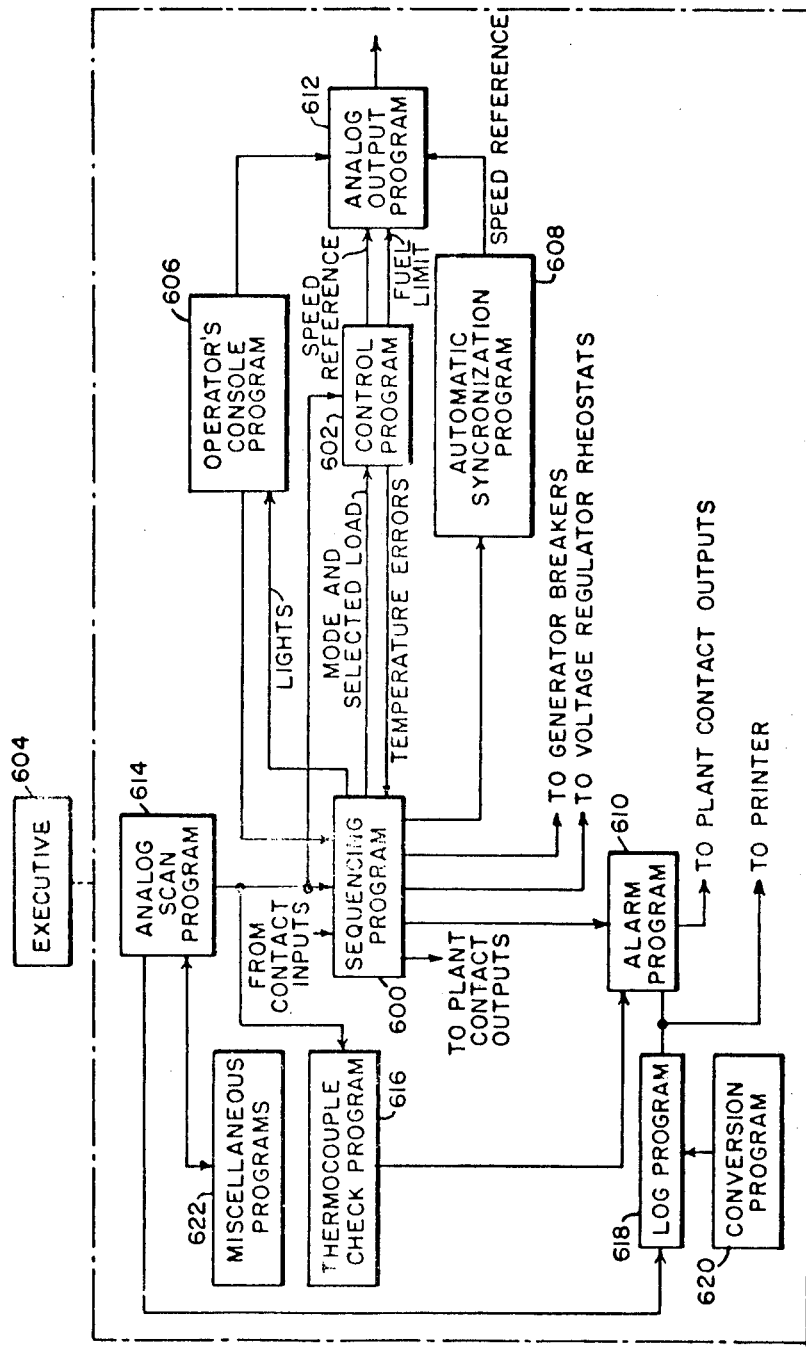
FIG. 17 shows a general block diagram of the organization of a program system employed in the control system computer.

The computer program system is organized to operate the computer system 305 so that it interacts with other control system elements and plant devices to operate the gas turbine plant 100 and other similar plants as required to produce electric power with many user advantages. As schematically illustrated in FIG. 17, the program system comprises a sequencing program 600 and a control program 602 which make most of the plant operational determinations for output to the control system interfacing and control hardware. An executive program 604 schedules the use of the computer 301 by the various programs in the software system in accordance with a predetermined priority structure. The executive program 604 also provides certain other functions considered more fully subsequently.

Generally, the sequencing program 600 accepts contact closure inputs, analog inputs, and operator console inputs from an operator console program 606 to provide through contact closure outputs plant startup and other functions including alarm and housekeeping tasks prior to, during and after startup. As indicated in FIG. 17, the sequencing program 600 supervises the control program 602 by specifying the control mode and the selected load. The control program 602 transmits data to the sequencing program 600 including, for example, hot blade path temperature indications during load operation which require plant alarm and shutdown.

An automatic synchronization program 608 is also supervised by the sequencing program 600 to provide for generator voltage regulator rheostat operation and turbine speed adjustment during automatic synchronization. The sequencing program 600 processes manual synchronization operation. It also transmits lamp light determinations to the operator's console program 606 and alarm determinations to an alarm program 610.

The operator's console program 606 is a package of subprograms which provides for interfacing the operator's panel 120 with the computer 301. The alarm program 610 provides for printout of detected alarms.

During the various modes of plant operation, the control program 602 makes intermediate control determinations which result in the determination of a turbine speed reference representation and a fuel demand limit representation for application as analog signals to the analog speed control 324 as previously described. Analog outputs from the control program 602, the automatic synchronization program 608 and the operator's console program 606 are processed by an analog output pulser program 612 to provide for generation of accurate external analog voltages corresponding to the internal digital determinations. Analog inputs for the sequencing program 600 and the control program 602 and other programs are determined and stored by an analog scan executive program 614.

A thermocouple check program 616 makes a validity check on the thermocouples not checked by the sequencing program 600 or the control program 602 and generates an alarm for alarm program printout when a thermocouple reading indicates an open circuit.

A log program 618 operates in conjunction with a conversion program 620 to generate a periodic printout of the values of predetermined analog inputs. Other programs included in the program system are classified as miscellaneous programs 622.

2. Executive System

In the program system, the individual programs are repeatedly executed under control of executive program 604, typically with only the program variables changed. An executive priority system consisting of sublevel structured dominant and secondary levels defines the order in which programs are executed.

Dominant sublevel programs are executed according to real time, i.e., a program which is first bid is executed first if two programs are bidding to run simultaneously. Secondary sublevel programs are executed according to a preestablished hierarchy.

3. Programmer's Console Package

The programmer's console programs are provided to facilitate communication with the P50 computer. Generally, the console package provides a means for loading programs into the computer, executing programs, loading constants or instructions and dumping areas of main and extended core memory. Core locations can be dumped in binary on tape or in octal on a keyboard. The programmer's console package operates within the priority structure of the executive program 604, and its elements are generally classified as a part of that program.

4. Operator's Console Program

As indicated in FIG. 17, an operator's console program is provided with interfaces with both the sequencing program 600 and the analog output program 612. Generally, a depressed local operator pushbutton causes the interrupt routine to bid a dominant level operator's console program, which when active determines the requested action. In the event that generator breaker closing, line breaker closing or emergency shut-down have been requested, priority execution of associated programs results. Other indicated actions occasion the requesting of an associated secondary sublevel program, which is then placed into the bidding state. Operator/Executive System communication is provided during all modes of gas turbine control.

5. Analog Scan Program

Generally, the analog scan program provides an executive function in reading all analog points associated with the power plant 100 and any similar plant units. The frequency at which the analog points are read is determined by the needs of the process operation, and in this instance, it is set at 30 points per second. The analog scan program can be executed under hardware or software interrupt lockout.

6. Analog Output Program

As previously considered, the general approach employed for generating analog outputs is to employ external holding type operational amplifiers with the amplifier output measured by the computer through the analog input system 311. The measured value is compared with the desired value and the difference is employed in determining how long raise or lower contact closure outputs must be closed to make the holding amplifier integrate to the desired value. The raise or lower value is computed in tenths of a second, and it is determined by an element of the analog output program 612, which is run on a secondary level while the actual contact closure output pulsing is performed by a pulser element of the analog output program 612, run on a dominant level every tenth of a second. The secondary level analog output program element is run every second for speed reference and load limit and every five seconds for the remaining outputs.

The foregoing brief discussions of system components 2 through 6 are herein included to provide in summary form a general description of the control environment which is more fully described in copending application Ser. No. 82,470 Sections D2 through D6, pages 101 through 115.

7. Sequencing Program a. Functional Philosophy

Figure 18:
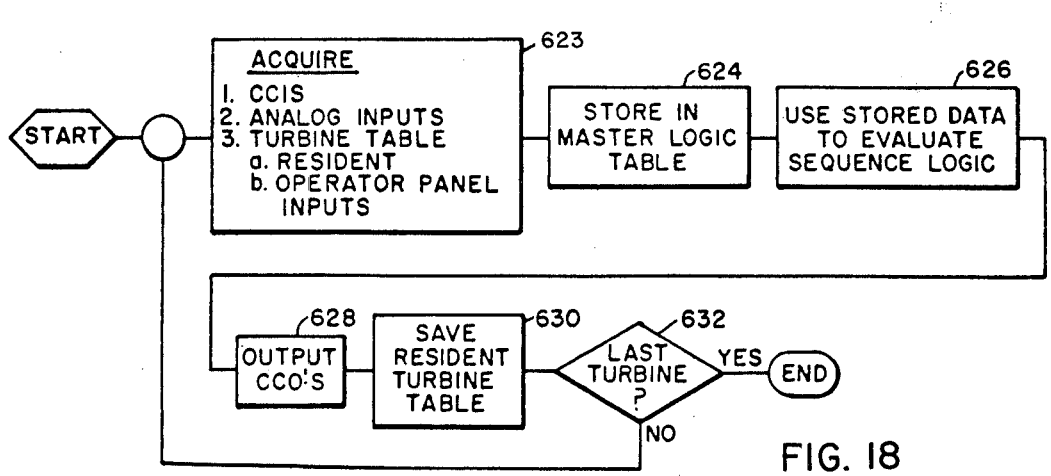
FIG. 18 illustrates a flowchart for a sequencing program associated principally with startup operations for the gas turbine.

Generally, the sequencing program 600 is represented by a flowchart shown in FIG. 18 and it is run once every second to provide the plant sequencing operations required during turbine startup, to provide certain alarm detections and to provide sequencing for various plant tasks during time periods other than the turbine startup time period. As indicated by block 623, certain information regarding the status of the turbine plane 100 and other controlled plants is required for sequencing program execution. The required plant status information which is acquired includes continuous analog data and contact input closures generated by operator panel switches, pressure switches, and other plant devices. The acquired information is stored in a master logic table as indicated by the block 624. Next, in providing ultimately for better plant startup management and better plant management generally, the stored data is employed in the evaluation of a plurality of blocks of sequence logic as indicated by block 626.

The results of the evaluation of the sequence logic may require communication with other programs in the program system in which event the results are stored for use by those programs. As indicated by block 628, the results of the evaluation of the sequence logic may also require certain contact closure outputs. In block 630, a resident table of turbine data acquired from core memory by the acquisition block 623 is saved in the original core memory location while nonresident turbine data comprising operator panel inputs is allowed to be destroyed.

Block 632 then determines whether any additional turbines need to be processed in the current run of the sequencing program 600. If not, the sequencing program 600 is ended. If one or more gas turbines remain for sequencing logic determinations in the current run of the sequencing program 600, the program 600 is re-executed for the next turbine and the process is repeated until the last turbine has been serviced with sequence logic processing in the current sequencing program execution.

Figure 19:
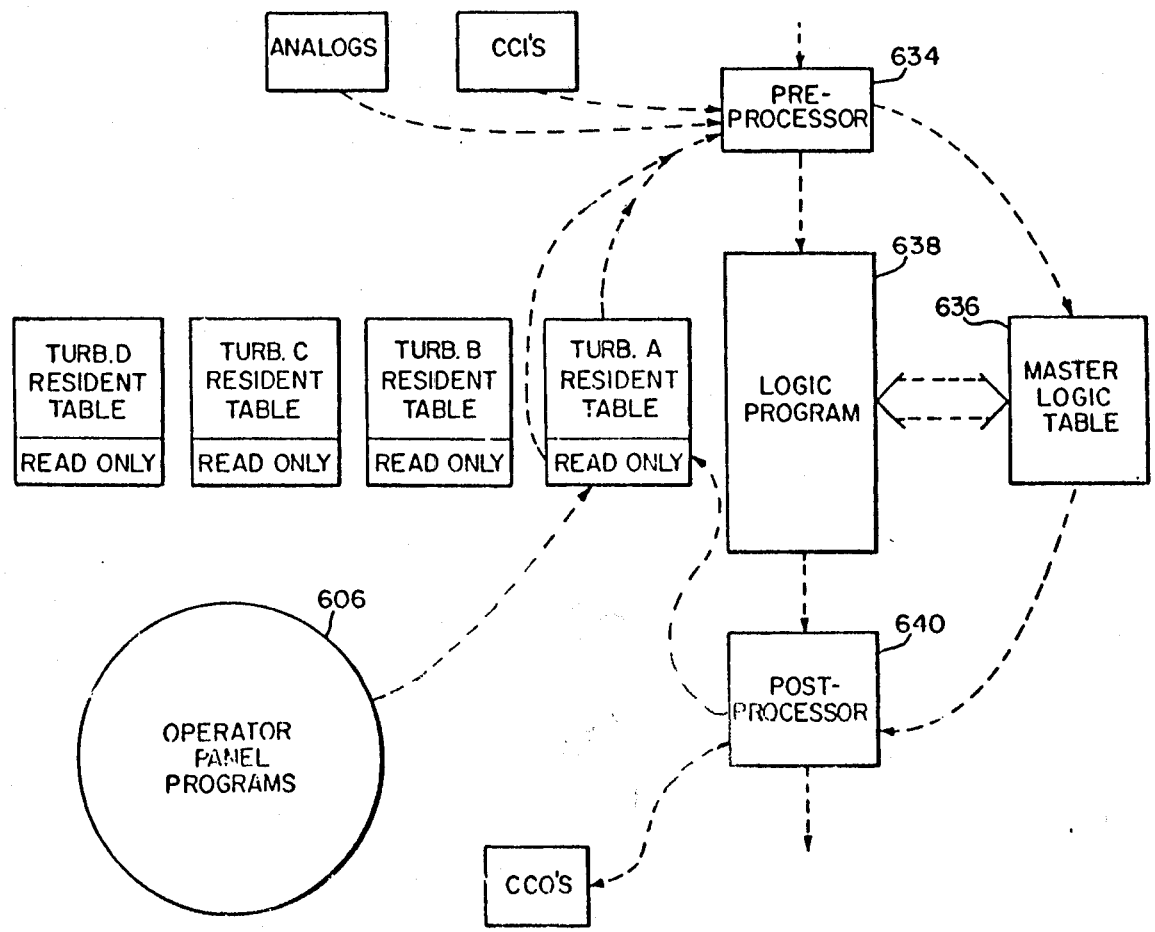
FIG. 19 shows a data flow diagram which illustrates the manner in which the sequencing program is executed to provide multiple power plant operations with a single control computer.

In FIG. 19, there is illustrated a data flow map for the sequencing program 600. As shown, there are four turbine data tables for the respectively designated gas turbines A, B, C and D. Each gas turbine data table comprises a resident portion and a read only portion which is derived from the operator panel program 606. A preprocessor block 634 corresponds to the block 623 shown in FIG. 18, and it obtains data from analog inputs, contact closure inputs, the resident turbine A table and the read only turbine A table. The acquired data is stored in a master logic table as indicated by block 636 which corresponds to block 624 in FIG. 18. The master logic table is employed in the execution of logic program block 638 which corresponds to block 626 in FIG. 18.

After the sequence logic has been evaluated by the program 638, a postprocessor 640 is entered and it corresponds to blocks 628, 630 and 632 in FIG. 18. Thus, contact closure outputs are generated and the turbine A resident table is saved. The postprocessor 640 then provides for a repeat program execution for turbine B table data if a second gas turbine plant is under control. Similarly, repeat executions are made to provide for entry and restorage of turbine C table data and turbine D table data if C and D gas turbine plants are under control. After the last turbine sequence program execution has been employed, an exit is made from the postprocessor block 640.

b. Sequencing Program Table Data Tables and Preprocess and Postprocess Routine

Information on core organization of the turbine read/write and read only tables, contact closure input and output data tables, the master logic table and turbine alarm data tables may be found in Section D7b., pages 117 to 150 of the aforementioned copending application Ser. No. 82,470. Additional information on the contact closure input routines, analog input routines and contact and contact closure output routines employed in blocks 622 and 628 is included therein.

c. Plant Sequence Functions

Generally, the sequence control subsystem embraces certain logic operations which provide for an orderly advance of the process through startup, run and shutdown operations while providing many operating advantages. In providing sequence operations, the sequence control subsystem includes the sequencing program which interacts with the control program and with plant devices to provide direction to process events and simultaneously to provide plant and turbine protection.

In the startup process, a programmed computer master contactor function and operation selectors are employed to force the sequence of starting and operation to assure that turbine startup will normally take place over a fixed predetermined time interval. The software master contactor serves to establish and disestablish logic conditions necessary for initiating the making and breaking of external control circuits for equipment startup and shutdown operations under predetermined plant and equipment conditions.

After ignition programmed sequencing logic causes the control system 300 to be placed in Mode 1 operation, the gas turbine speed reference is increased in a program controlled nonlinear manner to determine fuel valve positioning.

When the turbine 104 has been advanced to idle (or top or synchronous) speed, it is ready to be synchronized and the control system 300 is transferred to Mode 2 operation in which either manual or automatic synchronzing is performed following field breaker closure. When the turbine-generator unit is synchronized and the generator breaker is closed, the control system 300 is transferred to Mode 3 or Mode 4 operation and the speed reference is set at a value of 106 percent rated speed. Load is ramped to a predetermined level at a predetermined rate under programmed computer operation.

Shutdown of the gas turbine is caused if any of three time checks fail during the startup sequence. The first time check measures time from initiation of the master contactor function to ignition speed. In addition, a check is made on the time from detection of flame in combustor baskets of 60 percent speed. Further, a check is made on the time from starting engine trip at 60 percent rated speed to idle speed.

d. Sequence Logic Charts

In FIG. 20, there are shown logic diagrams of representative alarm and sequencing functions performed by the sequencing program 600 in the block 626 (FIG. 18) each time it is executed. Predetermined logic building blocks are employed in defining the conditions for the performance of the sequencing program functions. Each block contains a symbol identifying its function and a number of alphanumeric character providing a program block identification. The logic function identifying symbol is generally located above the program block identification character. The following is a list of the logic symbols and the logic functions to which they correspond:

| A | And |
| OR | OR |
| FL | FLIP FLOP |
| SS | SINGLE SHOT |
| DB | DEAD BAND |
| NOT | INVERSION |
| TDH | TIME DELAY — HOURS |
| TDS | TIME DELAY — SECONDS |

There is principally shown the logic associated with start/stop operations and the master contactor or control function to which reference has already been made. Generally, logic diagram 642 pertains to the master contactor or control function generated by flip-flop FL7 as a function of pushbutton operations and other conditions. Similarly, logic diagram 644 relates to the generation of a shutdown operation in response to pushbutton, shutdown alarm and other conditions. Thus, shutdown OR block OR6 resets the master contact function flip-flop FL7 when a shutdown is initiated. In the logic diagram 644, alarm shutdowns are initiated by line L86 through block OR4. On shutdown, single shot block 6 provides for registering predetermined data.

Other sequencing program logic functions set forth in logic diagrams form in FIG. 20 include a plurality of generator alarms designated as OR GEN BLK blocks. In addition, block OR1 provides for immediate shutdown on blade path over-temperature through block OR4. Single shot blocks 4, 5 and 14 respectively provide normal start counts, emergency start counts, and abort counts. A list of miscellaneous alarms is also included.

Figure 20A:
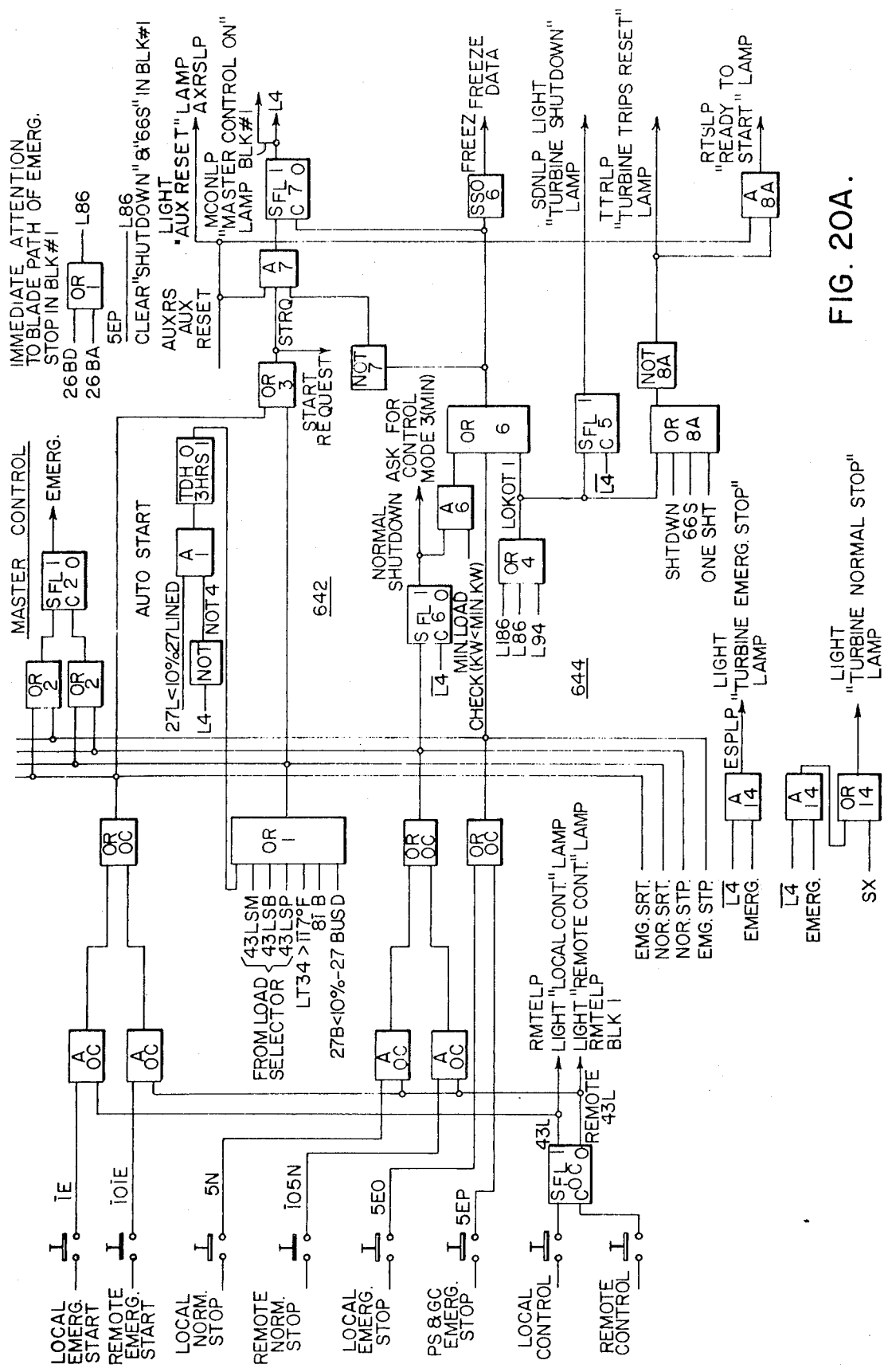
FIGS. 20A–C show logic diagrams representative of the sequencing logic performed by the sequencing program a portion of which may be considered an alternate embodiment of the principles of the present invention.
Figure 20B:
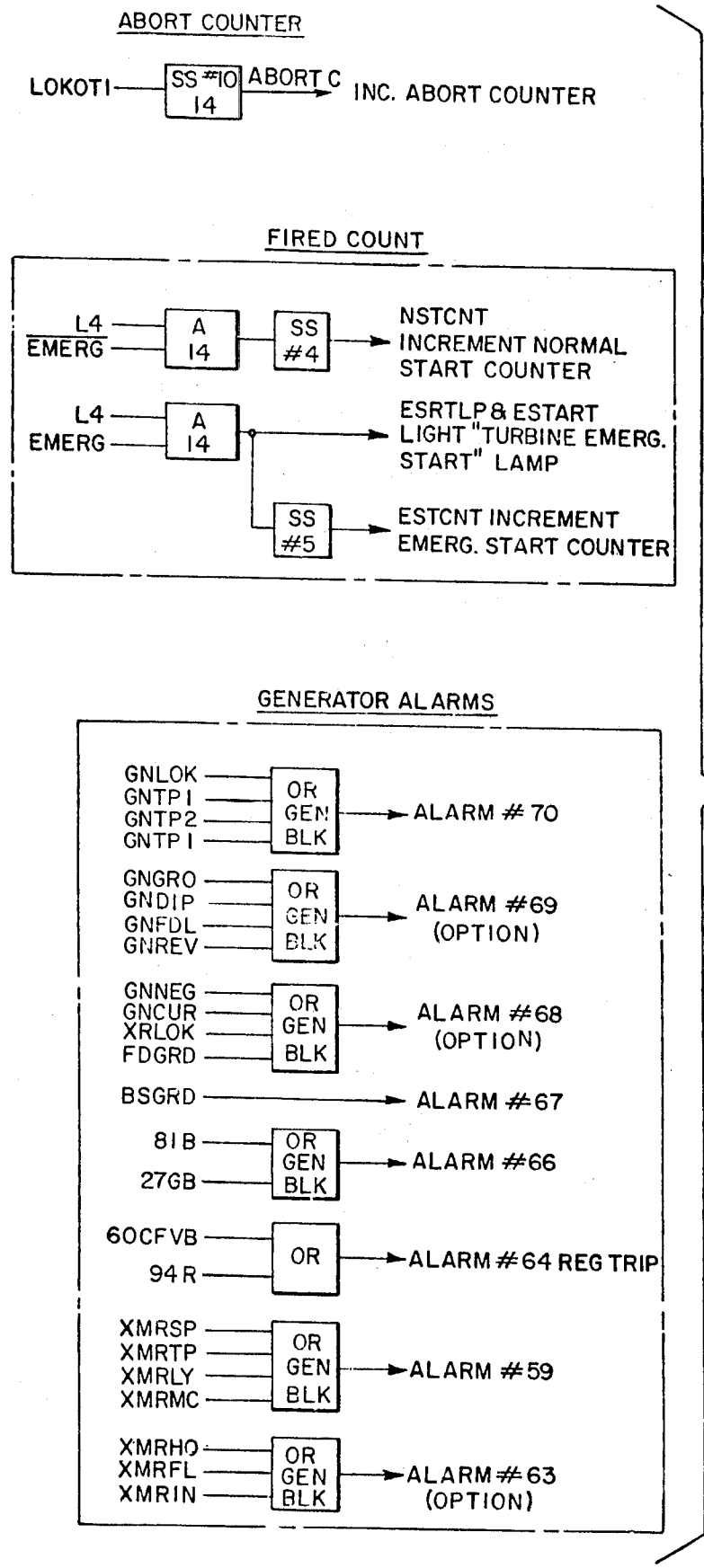
Figure 20C:
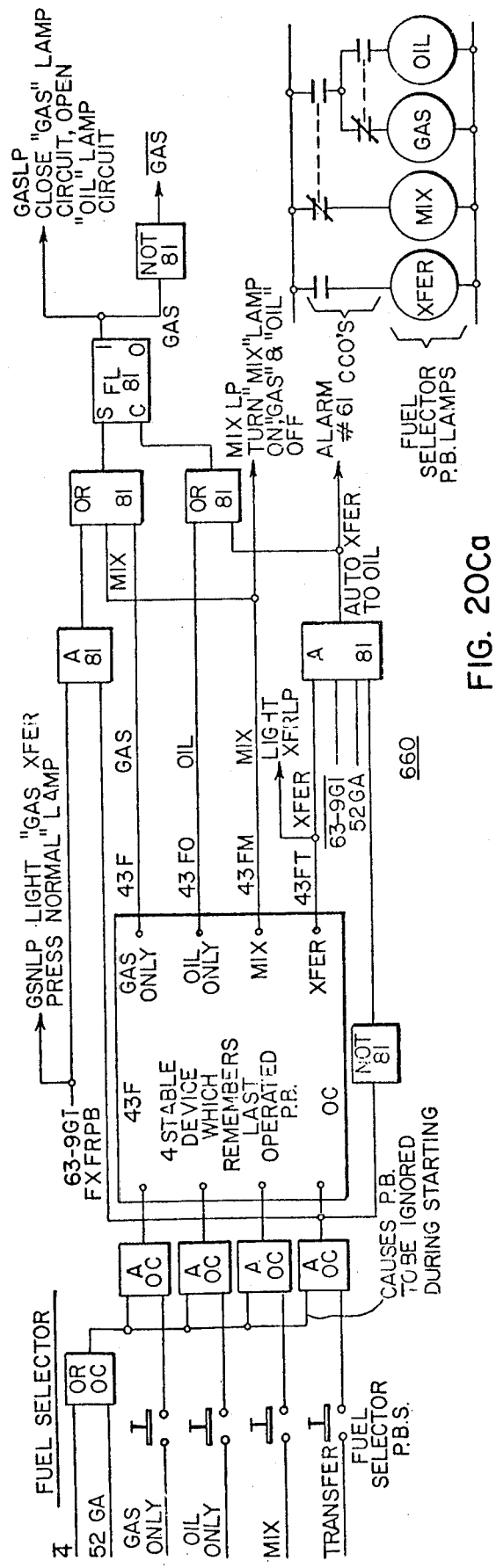
Figure 20C:
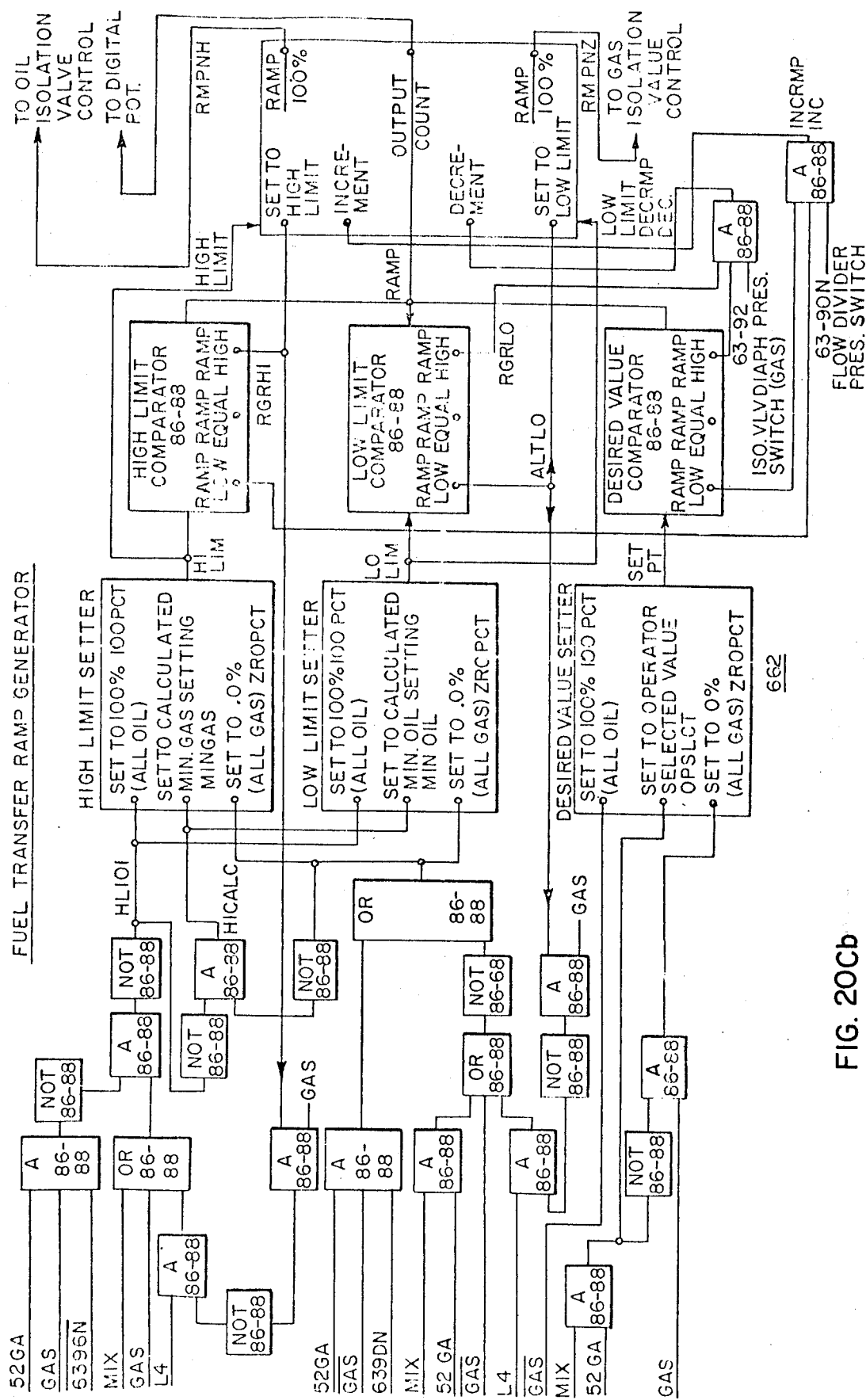

In FIG. 20C, there is represented in logic diagram form a fuel selector 660 and a fuel transfer ramp generator 662. As with the other alarm sequencing functions, logic diagrams 660 and 662 may be implemented in either hardware or software form. A selection of logic elements and circuits suitable for a hardware implementation of the functions herein represented is within the ability of one of ordinary skill in the art.

The instant embodiment of the principles of the present invention is represented by FIG. 30, to be hereinafter fully discussed, in Section D8. As will be readily appreciated a one-to-one correspondence exists between equivalent functions in FIGS. 20C and 30 so that a discussion of the instant embodiment essentially encompasses both.

Further description of the plant sequence functions, associated sequence logic charts, macro instructions for sequencing logic and logic subroutines and macros related thereto may be found in the aforementioned copending application Ser. No. 82,467, Section D.7c, through D.7e, found at pages 151 to 164 thereof.

8. Control Program

The following brief discussion of a control program suitable for use in the preferred embodiment of the present invention may be considerably amplified by a reference to the corresponding section of one of the aforementioned copending related applications, e.g., Ser. No. 82,470.

Figure 21:
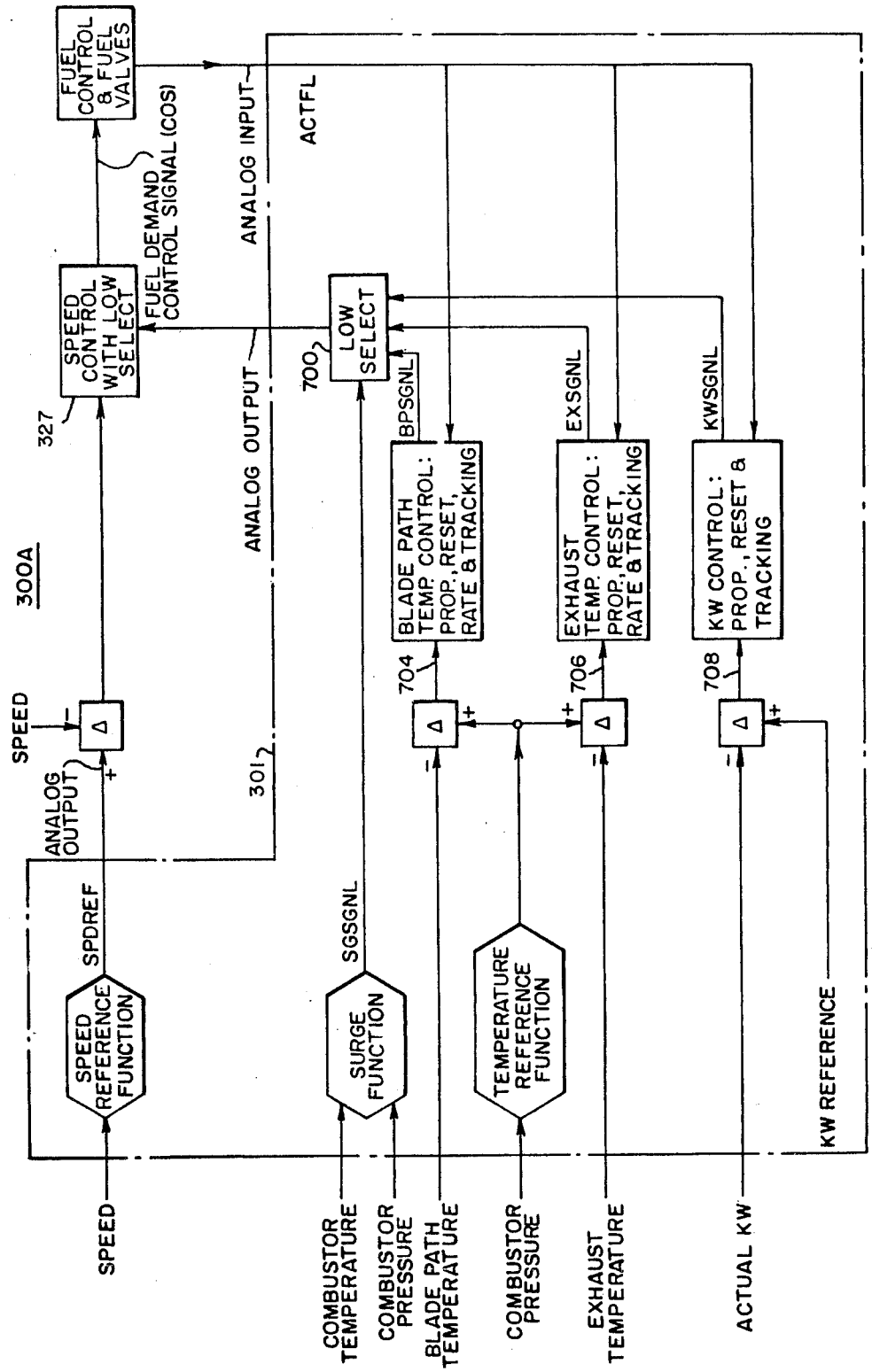
FIG. 21 shows a block diagram of a control loop arrangement implemented in the preferred embodiment.
Figure 29:
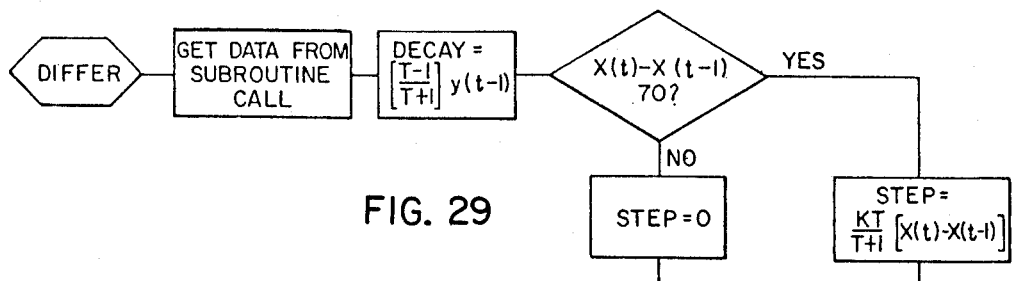
FIG. 29 shows a flowchart for a rate function employed in temperature limit operations.

As indicated in FIG. 17, the control program 602 interacts with the sequencing program 600 providing control loop determination of the operation of the gas turbine plant 100 and like plants if provided. A preferred control arrangement is considered in FIG. 21. Upon determination by the sequencing program 600 of the control mode in which the control program 602 is to be operated and the accomplishment of the sequencing steps previously discussed, control program 602 becomes active, operating in the control loop arrangement 300A. The hybrid interface depicted provides for software speed reference generation and selection of a single low fuel demand limit in software low select block 700 for application to analog hardware speed control 327.

The output fuel demand signal is selected as the lower of a speed error fuel demand signal and the computer output fuel demand limit signal as previously considered. The actual fuel demand control signal ACTFL is read as an analog input for tracking in various software control paths as considered more fully subsequently. Surge limit, blade path and exhaust temperature limit and load limit control loops are all provided with software control functions which respond to external data and generate outputs to the software low select block 700 as indicated by the respective reference characters 702, 704, 706 and 708.

Figure 22:
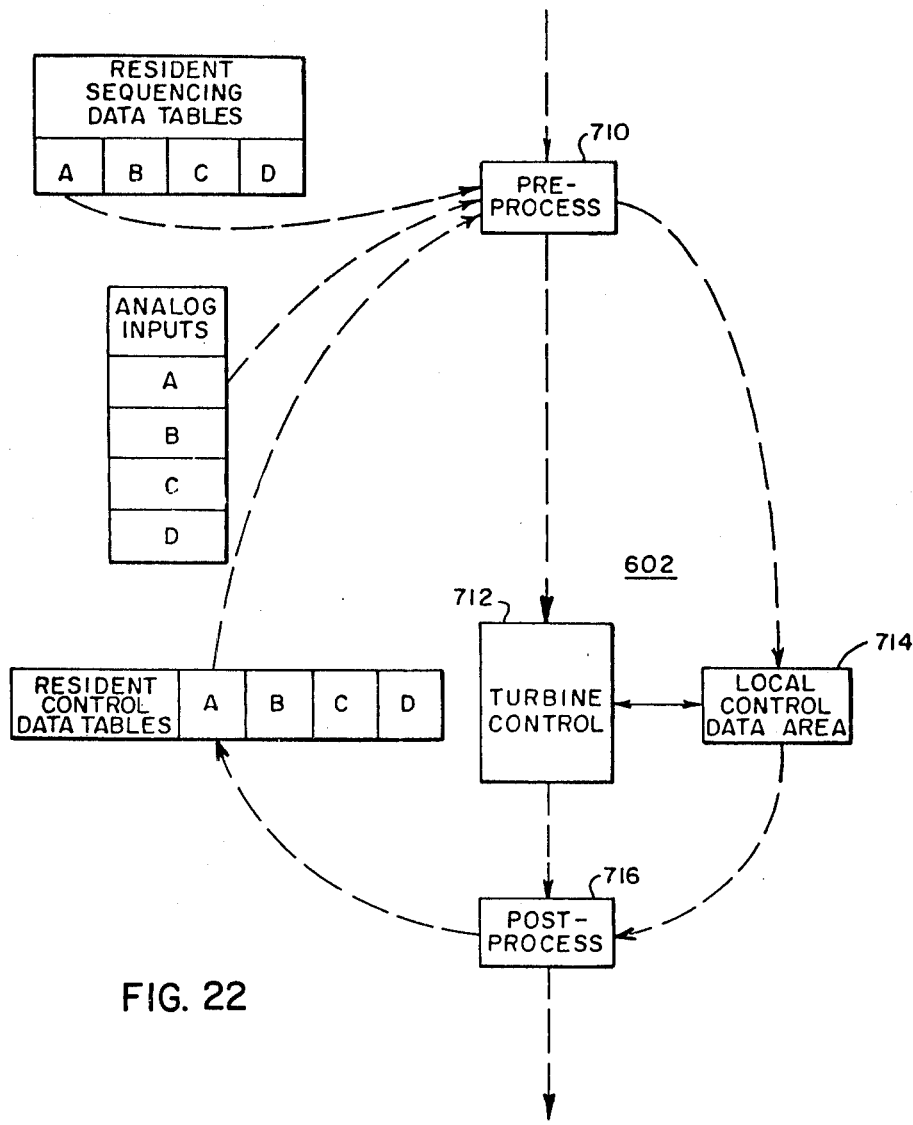
FIG. 22 shows a data flow diagram associated with control program operations during controlled operation of multiple gas turbine power plants with a single control computer.

Referring now to FIG. 22, execution of control program 602 proceeds as follows:

a. Preprocessing by block 710 of the resident control data table containing various parameters indicating current turbine status and a pointer to the sequencing table which contains a control mode indicator and the selected load and start-up status.

b. Analog control program data acquisition including blade path, exhaust and compressor inlet temperatures, combustor shell pressure, actual fuel demand signal and actual kilowatt output.

c. Reliability testing of acquired analog temperature reading to prevent overheating of critical turbine parts.

d. Execution of turbine control block 712, to be hereinafter outlined.

e. Block 716 postprocessing including table updates as indicated by the circular data flow.

The foregoing steps are repeated cyclically for turbines B, C and D if provided.

Figure 23:
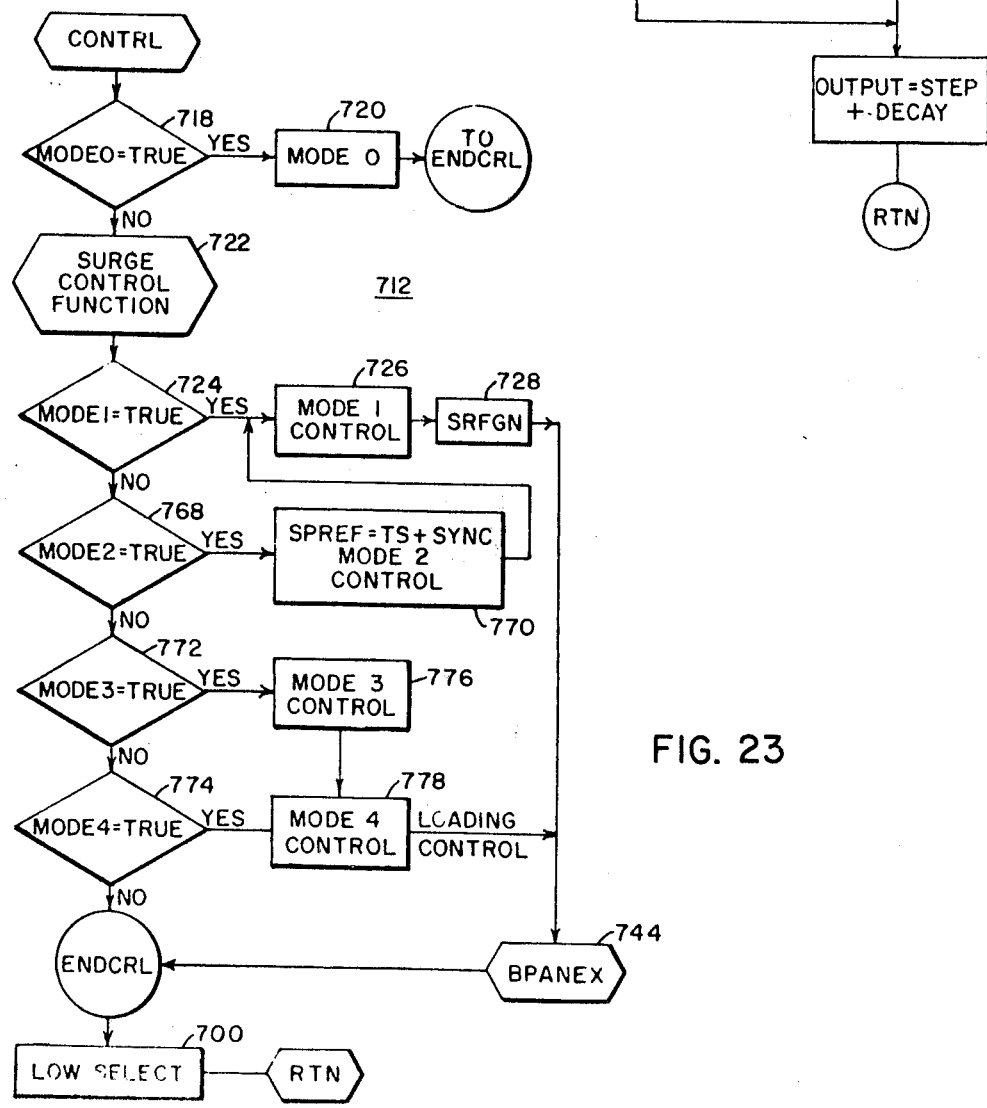
FIG. 23 illustrates a flowchart which represents control program operations in the preferred embodiment.
Figure 26:
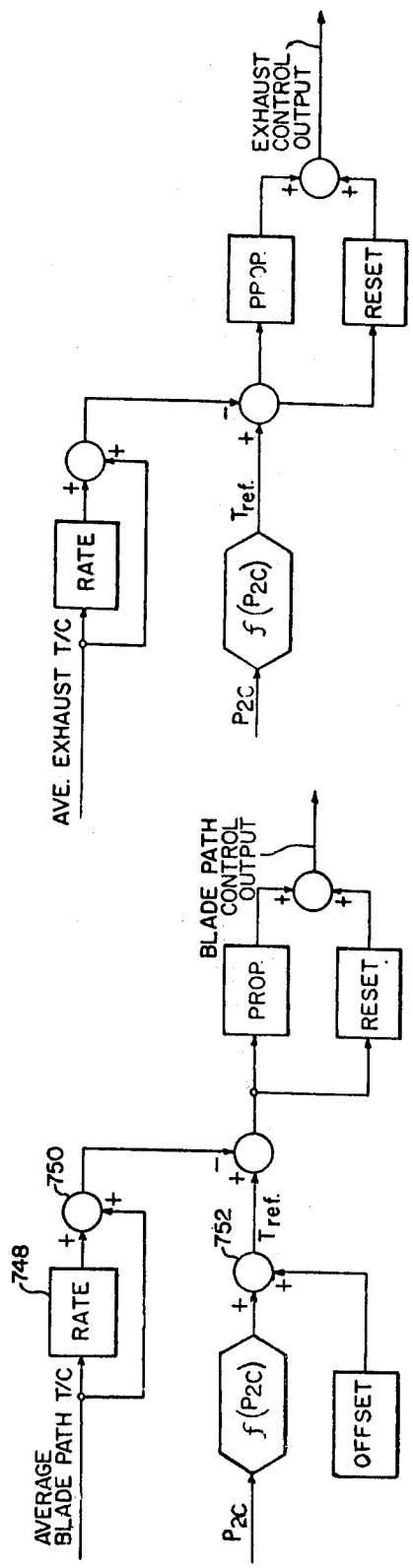
FIGS. 26A–B respectively show software control configurations for the blade path temperature and exhaust temperature limit functions.
Figure 27:
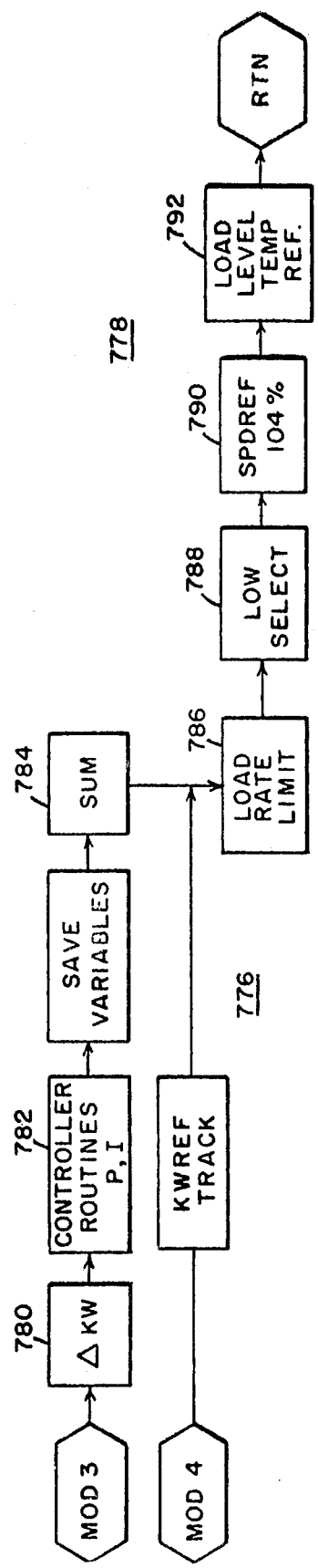
FIG. 27 shows a flow diagram for control program operations which provide load control and load limit functions for the gas turbine power plant.
Figure 28:
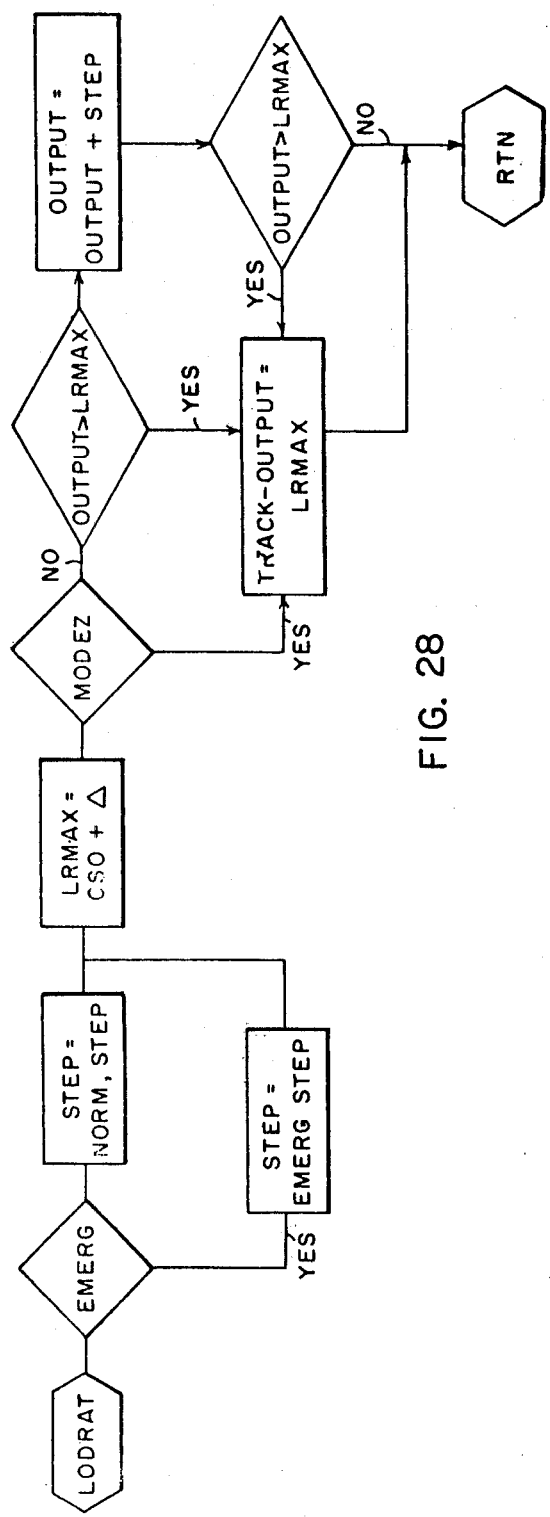
FIG. 28 illustrates a flowchart for a load rate limit function employed in the load control and limit operations illustrated in FIG. 27.
Figure 30A:
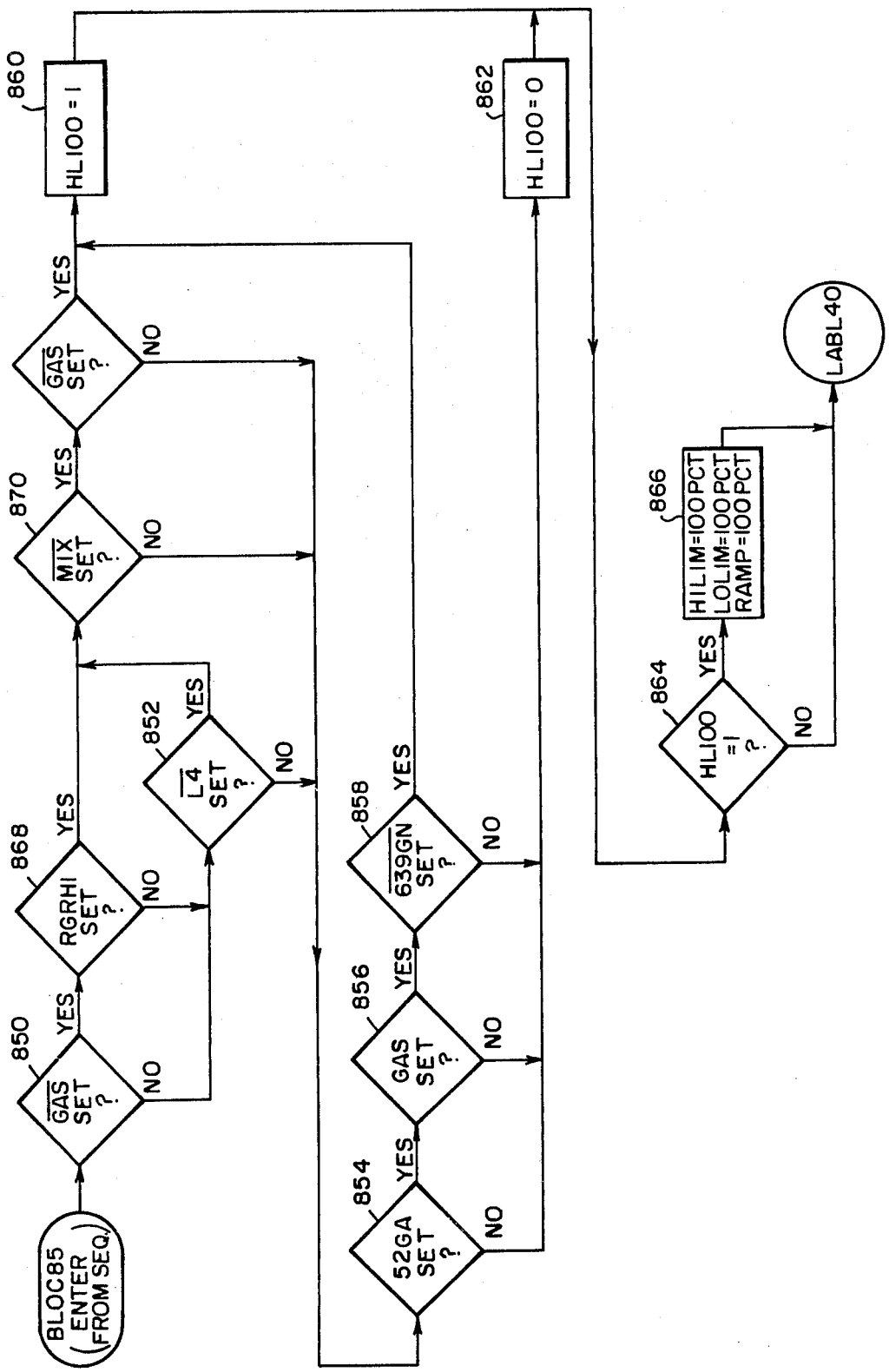
FIGS. 30A–D flowcharts for the automatic fuel transfer control function implemented in accordance with the principles of the present invention.
Figure 30B:
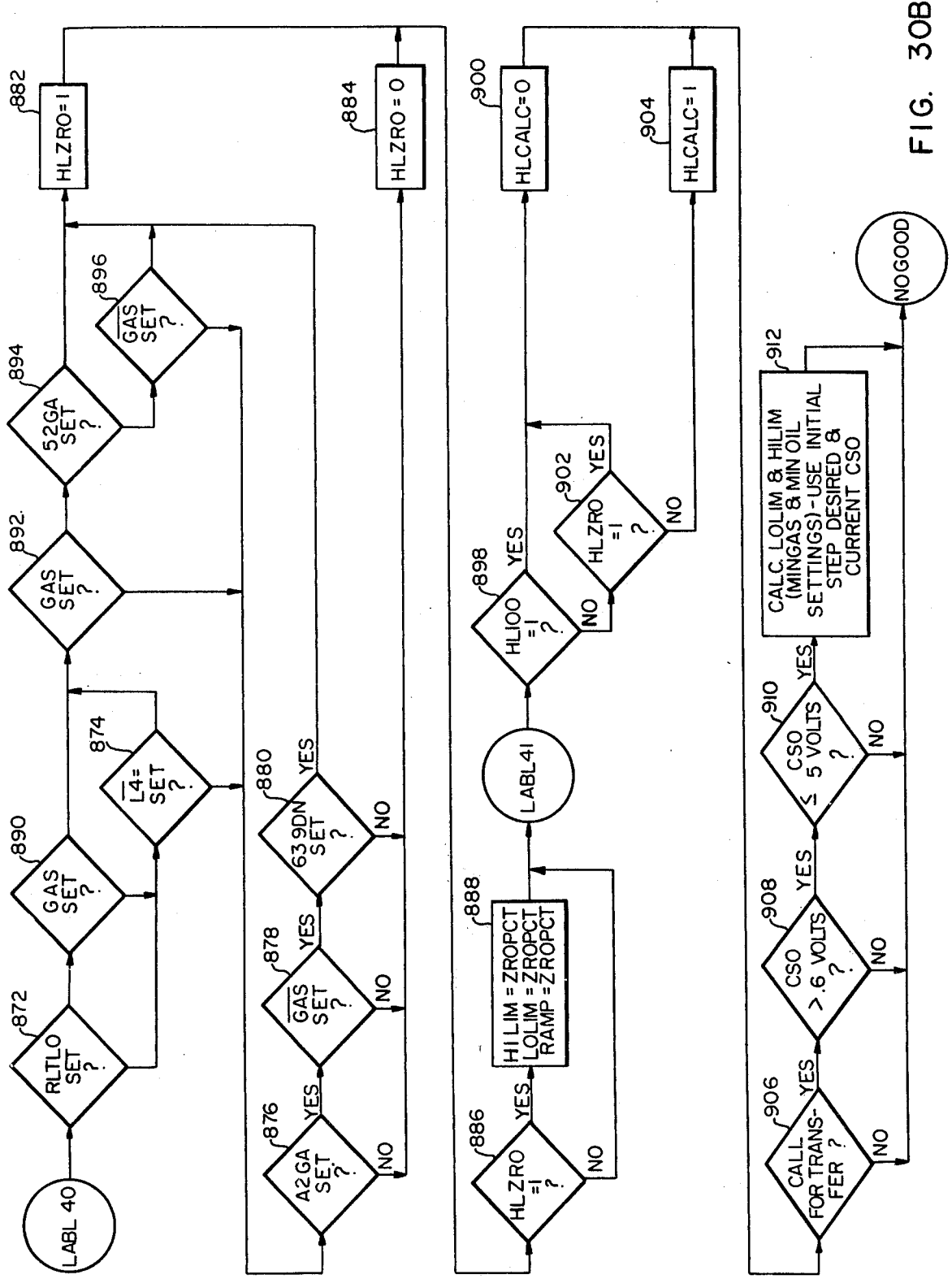
Figure 30C:
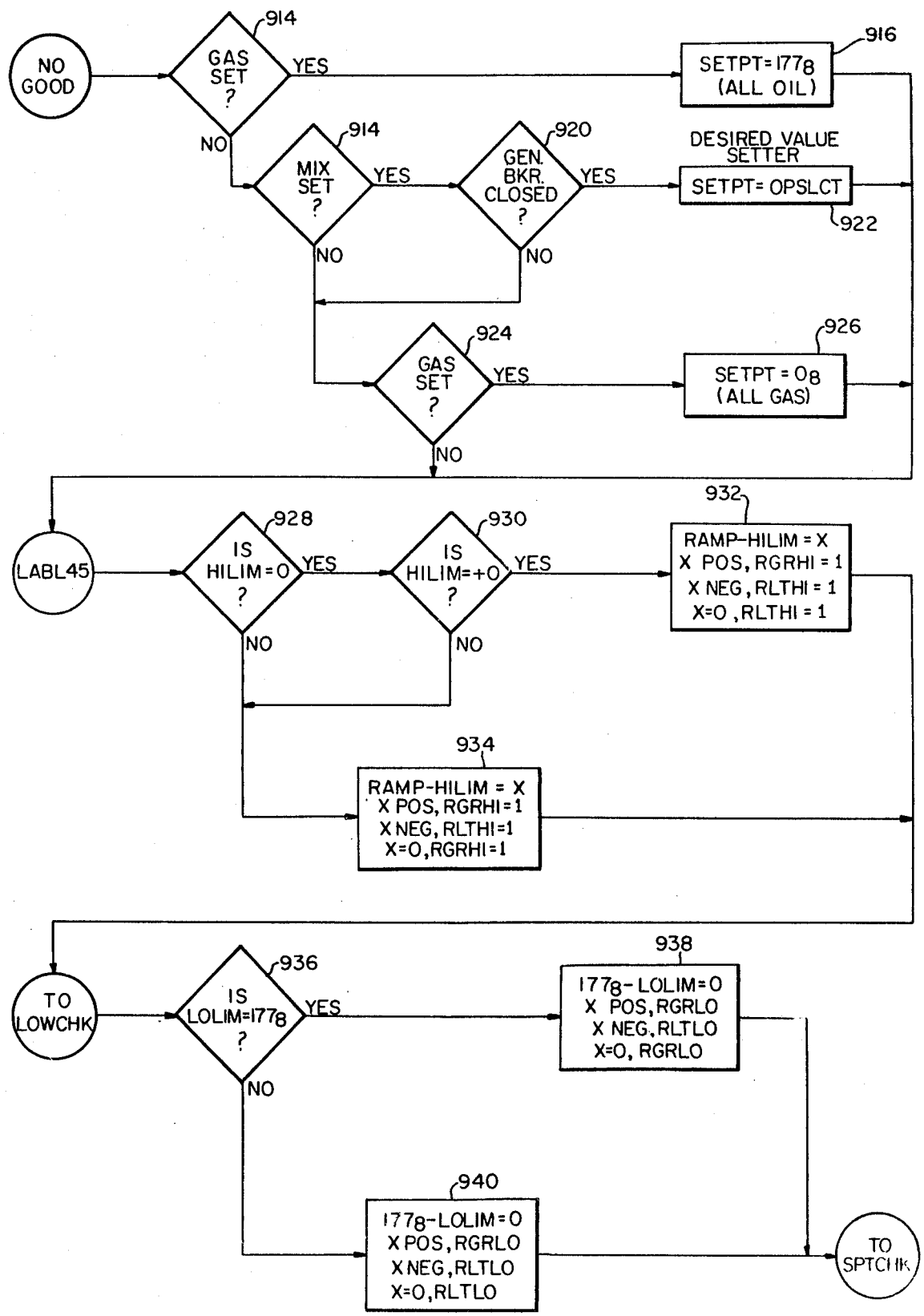
Figure 30D:
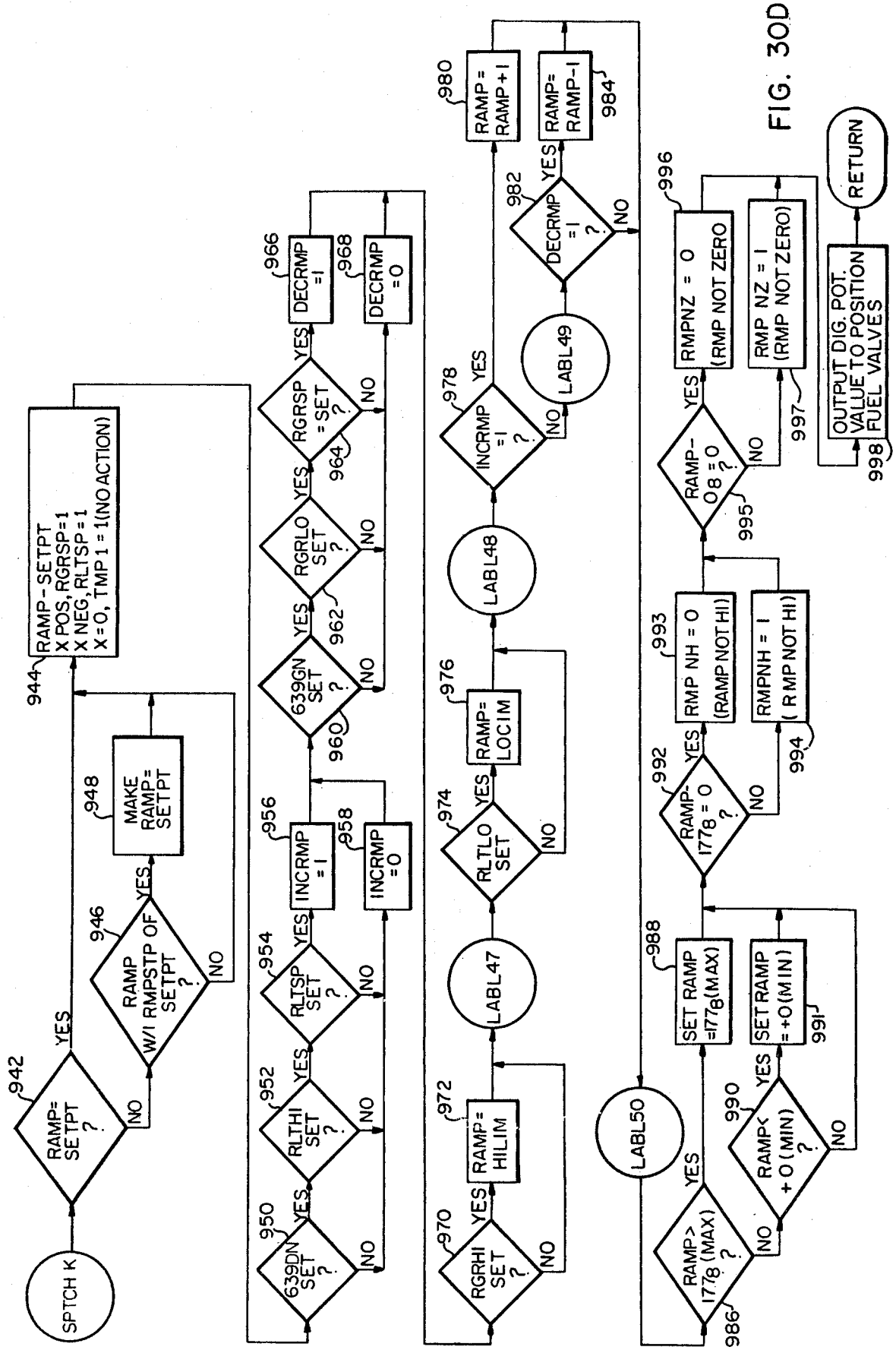
Figure 31:
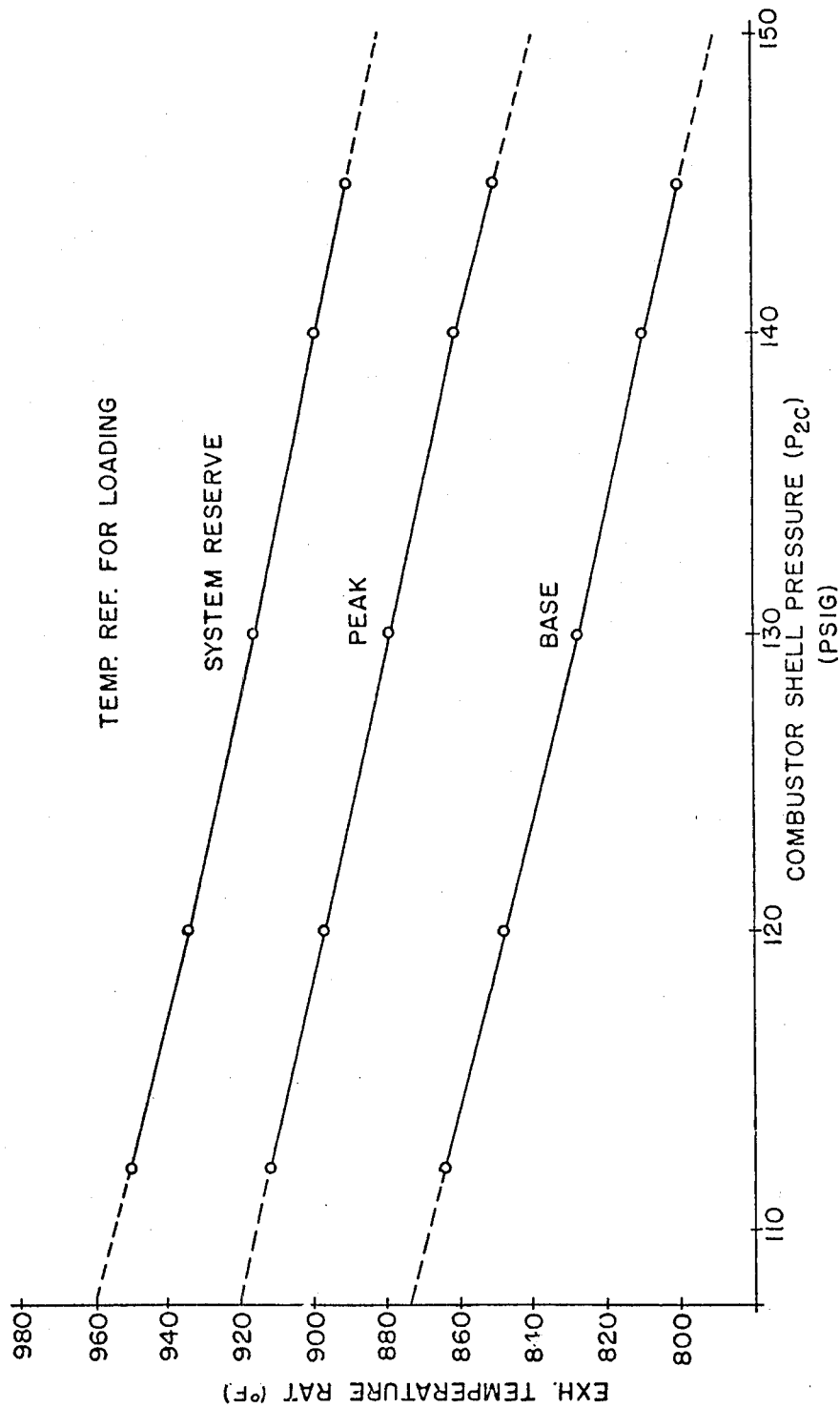
FIG. 31 illustrates various curve data employed in the control system computer of the gas turbine power plant.

Turbine control block 712 is shown in greater detail in FIG. 23. As shown, control actions are directed consistent with turbine control mole directives. If block 718 determines that the turbine is in Mode 0 status, initialization is accomplished by the execution of block 720. Actual turbine speed tracking is provided so that a smooth transition is made in the computer generated speed reference during transfer from Mode 0 to Mode 1.

If control is not in Mode 0, block 722 next determines the surge control function for use in the surge limit control loop (FIG. 21) in all other modes of operation. The surge control function determines a maximum fuel demand limit as a function of the compressor inlet temperature and the combustor shell pressure (compressor outlet pressure) which are obtained from reliability checked analog inputs. A discussion of the surge limit functional determination may be found in copending application, Ser. No. 82,470, beginning at page 186 thereof.

In Mode 1 control block 726 is executed to provide acceleration control from ignition speed of approximately 1000 RPM to the top speed of 4894 RPM. Fuel demand signal tracking is provided and a nonlinear temperature reference is generated in a manner similar to that employed in surge limit functional determination, again, as discussed in the aforementioned copending application, Ser. No. 82,470. Temperature references as a function of combustor shell pressure are determined for both normal and emergency startups.

Repeated executions of the control routine 712 are made during the time period that the gas turbine 104 is placed under sequencing and acceleration operations in Mode 1 control. A speed reference for analog output to the speed control 327 is provided in block 728. Such reference is derived from a previously input nonlinear curve representative of optimum fixed time acceleration for both normal and emergency startup as previously indicated. A linear interpolation routine similar to that described in connection with the surge limit functional determination is employed to derive acceleration values at working time points between the time points corresponding to the stored curve points. The speed reference algorithm may be found at page 50 of copending application Ser. No. 82,470.

The speed reference generation program is shown in greater detail in FIG. 24. Block 730 first determines if the gas turbine 104 has attained top or substantially synchronous speed. If this condition is satisfied, the speed reference routine is bypassed and a return is made to the turbine control program execution. If not, block 734 determines whether an emergency start has been requested. Block 736 and 738 correspond respectively to emergency and normal startups, and as shown a change in the speed reference required for the next sampling time interval is calculated. In block 740, the speed reference step change is added to the preceding speed reference.

A top speed limit is next placed on the speed reference by block 742 if block 744 detects an excessive speed reference value. If not, the speed reference value is stored and a return is made to the execution of the control block 712.

Temperature control is provided as shown in FIG. 25. In the temperature limit routine 744, a temperature error is first determined by taking the difference between the temperature reference previously derived and the actual and preprocessed average blade path temperature. The output of block 746 is compared with a predetermined deadband in block 754. If an error exists outside the deadband, the sign is determined in block 756. If the blade path temperature error is negative, control action is imposed by block 758 with a proportional routine and an integral routine. Blade path temperature and temperature error variables are stored by block 760 and block 762 sums the results of the proportional and integral operations of block 758 to generate the blade path output limit representation BPSGNL.

If the blade path temperature error is positive, fuel demand signal tracking block 764 is executed so that faster control action may follow a change in temperature error from positive to negative, since through this device, the reset routines do not have to integrate back from some saturated output value. In particular, the tracking action is such that the reset block output never exceeds the fuel demand signal by more than a difference value.

To obtain the tracking action, the desired difference value is added to the low selected fuel demand signal and the result is differenced from the output of a reset or integrator routine and applied to the input of the reset routine. The output of the integration operation accordingly tracks the fuel demand signal with a positive bias. Such tracking operation allows the tracking control loop to enter quickly into fuel control if required by a change in the error quantity controlled by the tracking control loop. The integration routine may be found at page 202 of copending application Ser. No. 82,467.

After execution of the block 762, the exhaust temperature control of tracking action is determined in a series of blocks similar to those just considered in connection with blade path temperature control and tracking action. Further, a save variable block 769 provides for storing the exhaust temperature error and the track function output initiated by block 769. After the exhaust temperature output limit is determined in block 766, a return is made to the routine 712 in FIG. 23. Next, a software low selection is made by block 700 in Mode 1 control program execution.

Once synchronous speed is reached, block 768 in FIG. 23 directs the program into Mode 2 control operations. In block 770, the speed reference is set equal to the top speed value plus any speed change entered into the control loop by manual synchronization operations or by automatic synchronization program execution. Further, the program operations are redirected through blocks 726, 728, 744 and 700 as in the case of Mode 1 control.

After synchronization, block 772 or 744 directs control program operations to a Mode 3 control block 766 or a Mode 4 control block 778, according to the operator's panel selection. Mode 3 control provides for determining killowatt error from the difference between a kilowatt reference and actual kilowatts. Proportional and integral control routines are then applied to the kilowatt error and the resultant controller outputs are summed in order to provide for constant kilowatt control with temperature limit backup. Further, a loading rate limit is imposed to prevent excessive thermal transients due to excessive loading rates under automatic or manual incremental loading. A discussion of the loading limit subroutine and its operation in Modes 1, 2 and 3 may be found at page 194 of copending application Ser. No. 82,470.

Initially, in Mode 3 operation, the kilowatt reference is set at a minimum value pending operator selection of a reference value which may not exceed a value corresponding to the base load exhaust temperature limit. Thus, the primary Mode 3 controls are the exhaust temperature control and the constant kilowatt control, with blade path and surge controls providing backup protection.

Mode 4 control differs from Mode 3 control in that no constant kilowatt function is provided for Mode 4. However, a loading rate limit is imposed. A temperature reference is determined for use in the blade path and exhaust temperature limit control block 744.

In both Mode 3 and Mode 4, the block 744 is executed in a manner considered previously in connection with Mode 1. Since no constant kilowatt function is provided for Mode 4, the block 744 provides for a temperature loading operation through exhaust temperature limit action. Under temperature control, the generated power varies with the ambient error temperature such that more power is generated with lower inlet air temperature.

Load Mode 3 and load Mode 4 program executions are completed through low select block 700 which selects the lowest fuel demand representation associated with the temperature, surge and load limits to provide the control operation as described. Control program execution through the block 766 and/or 788, 744 and 700 continues for the duration of Mode 3 or Mode 4 load control.

Referring again to FIG. 17, the interface between the sequencing program 600 and control program 602 is therein represented. At this point it would be desirable again to consider, briefly, the function of the sequencing program 600 as its operation concerns the dual fuel control program of FIG. 30.

As previously discussed, the squencing program 600 is run once each second. During preprocessing and startup various analog and contact closure inputs are processed, and appropriate entries made to the various data tables to be accessed in later execution of the various program segments or modules comprising the control system.

More specifically, as concerns the dual fuel subsystem control program, data entries of significance are those which define the fuel control options earlier discussed, the contact closure input defining percent of oil for fuel mixing operation, desirable load level, and the turbine operating mode.

The dual fuel subsystem control program, FIG. 30, although functionally considered a portion of control program 602, is executed as a portion of the sequencing program as shown at the entry point 850. As already noted, FIG. 20C represents a portion of the turbine control system sequencing functions, which logic diagram may be considered as an alternative embodiment of certain aspects of the dual fuel control system herein presented in software form.

Turning now to the functional organization of the dual fuel subsystem control program of FIGS. 30A-D, the following segments define distinct functions to be hereinafter considered individually:

A. HIGH LIMIT SETTER—FIG. 30A.
B. LOW LIMIT SETTER—FIG. 30B, blocks 872–896.
C. MINIMUM GAS & OIL COMPUTATIONS—Blocks 898–912.
D. DESIRED VALUE SETTER—Blocks 914–926.
E. HIGH LIMIT COMPARATOR—Blocks 928–934.
F. LOW LIMIT COMPARATOR—Blocks 936–940.
G. DESIRED VALUE COMPARATOR—Blocks 942–948.
H. RAMP MANIPULATION—Blocks 950–984.
I. VERIFICATION OF RAMP & OUTPUT TO DIGITAL POTENTIOMETER—Blocks 986–998.

At the entry point 850 of the dual fuel subsystem control program, program segment A, the HIGH LIMIT SETTER function, interrogates various switches, i.e., determines values of logical variables equivalent to program switches. At 850, a first determination is made concerning present fuel scheduling. To be noted is the designation GAS, "Not Gas" which implies oil. Barred or primed logical variables indicate the negative or "Not" value so that "GAS set—yes" implies present operation on oil. Upon a determination that the turbine is not presently operating on oil, block 852 interrogates a program switch L4, set when turbine startup is initiated. If the turbine is operating, a check is made of switch 52GA which is set on closing of the generator breaker. If the turbine is not running switch MIX is interrogated at 870. (Not Mix). If mixed fuel operation has been specified, a check is made of switch 52GA, so that the logic path to block 854 is followed in this instance as well. As shown, no action may be taken respecting fuel ratioing or fuel transfer as long as the generator breaker is open. This is logically equivalent to imposing a constraint on dual fuel operating options that no action may be taken once startup has been initiated, unless the turbine has become synchronized with the power system.

Continuing along path 854, 856, 868 and 862 it is seen that the program logic provides some redundant checks in order that all possibble operating conditions dictating a program branch to 854 will be detected and an appropriate action directed. Considering this path in its entirety and summarizing; the following logically equivalent statement may be made: "If operation is presently on oil; the operator panel GAS button is depressed, and the generator breaker is closed, maintain operation on oil until there is sufficient gas pressure for smooth transfer".

Along path 850, 868, 870, and 860, there are also redundant checks, again, ensuring that all possible sensed operating conditions occasion a unique computer response. An exit from block 850 indicating present operation on oil ("GAS set—yes"), may indicate that a transfer or fuel mixing operation is presently in progress. In this event it is necessary to determine how far such action has progressed at block 868. The limiting action will be discussed subsequently. For an understanding of this logic path, logically equivalent imperatives are presented:

"If presently operating on oil and no transfer is in progress, take no additional action. If presently operating on gas and fuel transfer or mixing operations are in progress, continue ramping action until such action has raised the oil/gas ratio to a predefined limit". (The predefined limit appears as HILIM in FIG. 13).

Path 850, 852, 870 and 860 merely represent a machine cycling action in the event that turbine startup has not as yet commenced. A change in selected dual fuel subsystem operating mode is allowed during this time interval.

A branch to LABL40 occurs upon completion of determination of the foregoing conditions and direction of appropriate responsive action. As readily seen program segment B, blocks 872 through 896, has very nearly the same organization as program segment A. Logically this segment performs functions identical to those of segment A, in respect to the opposite mixing or transfer operations, so that the following summary is applicable.

When running on gas, the oil button is depressed and the generator breaker is closed, the system is inhibited from beginning a transfer, or mixing operation until the oil pressure is insufficient.

If presently operating on gas, and no transfer is in progress, take no additional action. If presently operating on oil, and fuel transfer or mixing operations are in progress, continue ramping action until such action has lowered the gas/oil ratio to a predefined lower limit. (The predefined limit appears as LOLIM in FIG. 13).

Next to be considered is program segment C, minimum gas and oil computations. Such segment first determines the value of certain flags sets in program segments A and B to determine which operating conditions exist, and whether a transfer is to be initiated. As shown, program segment C flag HLCALC is set only if a transfer operation has been requested. In such event, program block 906 directs further examination of operating conditions relating to the voltage level of the CSO. (As will be recalled, the CSO is the output command signal indicating the total fuel demand). A check is performed to determine if such signal is within a required range of values. If not, no transfer is initiated. If so, block 912 determines the lower and upper ramp limits (FIG. 13), which as indicated, are functionally related to initial step size.

Program segment D may be summarized as follows:
1. Whenever the oil button is depressed, GAS = 1 and GAS =0. The set point = $177_8$ (all oil). In other words, the final operating condition is to be 100 percent oil, 0 percent gas.
2. Whenever the gas button is depressed, GAS = 0 and GAS = 1. The SETPT = $0_8$ (all gas). In other words, final operating condition is to be 100 percent gas, and 0 percent oil.
3. Whenever the Mix button is depressed and the generator breaker is open, a start will be initiated on gas and a transfer to oil will automatically start once the breaker is closed but it will "hang up" part way, depending on the percent of oil selected by the operator through the digit switch. Whenever the Mix button is depressed and the generator breaker is closed, the system automatically ramps to the SETPT (percent oil selected by the operator through digit switch prior to mixing) from all gas or all oil whichever is being burned when the Mix button is first depressed.

Program segment E, HIGH LIMIT COMPARATOR, is commenced at LABL 45. This segment merely determines the relative magnitudes of the present value of the ramp function and the high lamp limit. (Block 930 checks for the existence of a condition which may exist as a result of a peculiarity of operation of the particular computer utilized in this implementation. The check is included in this program implementation to prevent an immediate transfer from gas to oil at the time the oil button is depressed). The output of program segment E is a flag indicating to a subsequent program segment actions to be taken to continue or terminate ramping.

The functioning of program segment F has very nearly the same organization as program segment E. Logically this segment performs functions identical to those of segment A, in respect to the opposite mixing or transfer operations, except a determination is made as to whether ramping to operation on gas from operation on oil has proceeded to a point above LOLIM, or whether ramping has reached LOLIM.

Program segment G, Desired Value Comparator, performs operations similar to those considered in connection with program segments E and F. In this instance, however, it is sought to hang up transfer at a fuel ratio setpoint, i.e., at some point on the ramp function line, intermediate LOLIM and HILIM. Here then we have a comparison which occasions the setting of flags indicating that the present value of the ramp function is greater than, less than or equal to the setpoint. (Note that a provision exists at 948 for adjusting the ramp function value if it is within one ramp increment of the setpoint).

Turning to a consideration of program segment H, RAMP MANIPULATION, it is seen that there are two functions. The first makes a determination as to whether the ramp is to be incremented. The second determines if the ramp is to be decremented. At 950 a determination is made as to the adequacy of oil pressure allowing the commencement of transfer to oil. Upon an indication of sufficient oil pressure, the program will branch to begin execution of blocks 952 and 954 and either 956 or 958, so that the ramp function will be incremented if the value of the ramp function is either less than HILIM for transfer operations, or less than SETPT for mixing operations.

The equivalent function for transfer from operation on oil to operation on gas commences at block 960. Upon an indication of sufficient gas pressure, the program will branch to begin execution of blocks 962 and 964 and either 966 or 968, so that the ramp function will be decremented if the value of the ramp function is either greater than LOLIM for transfer operations or greater than SETPT for mixing operations.

Blocks 970 through 976 make adjustments to the ramp function values for overshoots or undershoots, i.e., if the ramp function has been incremented to a value greater than HILIM or decremented to a value lower than LOLIM. In either case the ramp function is set equal to the respective limits. Next the ramp function is incremented or decremented upon interrogation of appropriate flags or switches set during the execution of blocks 950 through 968.

At LABL50 checks are performed for ramp function values outside the digital potentiometer range which is $0_8$–$177_8$. This must be done in order to insure that the seven bit register, which corresponds to the maximum value of the digital potentiometer, has not overflowed. Such a condition would occasion an immediate transfer back to the fuel from which transfer was initiated, i.e., causing an immediate transfer to all oil or all gas. This then is merely a check to terminate ramping when hardware limits have been reached. The remaining program steps set appropriate flags and cause the digital potentiometer setting to be output. The output value is then used to control positioning of the fuel valves in a manner previously discussed.

A significant feature of the control system herein described is the alternative control modes which may be selected for turbine operation. The selection of either temperature control or kilowatt control can optimize operation subject to varying constraints. In this instance, such flexibility is of considerable importance. It is possible in the present embodiment of the preferred control system to adjust fuel mixtures or to transfer under load while maintaining a near constant generator output. It is also possible to accomplish this while maintaining near constant operating temperatures. Such control features are inherent in Mode 3 and Mode 4 implementations. The automatic dual fuel subsystem control feature is implemented within the framework of the preferred control system as described in the various copending related applications.

A variety of special control program macros and subroutines are employed in the preferred implementation of the control program 602. A discussion of such may be found in Section D8 of the aforementioned copending application Ser. No. 82,467, pages 198 to 203.

9. Alarm and Thermocouple Check Programs

In the alarm system, alarms are generated in response to sensors considered in connection with FIG. 9. Printout of alarms is made as in the following example:

| Time | Status | Turbine Identification | Description |
|------|--------|------------------------|-------------|
| 12:30 | ALRM | A | Flame A |

The status conditions of the alarms are listed below:
NORM—Normal
ALRM—Alarm

Alarms are determined by the sequencing program 600 and the thermocouple check program 616 as previously considered. The alarm program 610 is periodically executed to print out all points in alarm. Multiple confusing alarm lightings as encountered with conventional annunciator panels are thus avoided.

The thermocouple check program 616 also runs on a periodic basis. When it is executed, a check is made of the values stored for all thermocouples not checked by the control program 602 to determine if the thermocouple value is more negative than a predetermined check number stored in location CHKNO. An excessive negative number is considered an open circuit and an alarm bit is set for the alarm program 610.

10. Data Logging Program

A formated log is printed in response to execution of the log program 618 on a periodic basis selected by the plant operator within the range of 15 minutes to 2 hours. The printed readings are instantaneous values obtained from the last analog scan cycle. The plant operation may select any 20 analog points per turbine under control.

Generally, the analog conversion program 602 provides for converting entered analog values into the engineering value represented by the input and vice versa. Generally, four types of conversion are provided, i.e., flow straight-line, thermocouple, and segmented straight-line.

11. Miscellaneous Programs

The miscellaneous programs 622 include a programmer's console function program, a dead switch computer program, a power failure and restart program, and a horn and alarm lamp program. Additional programmer's console functions designated herein as being implemented by miscellaneous programs rather than the executive program include a CCI print status program, an analog engineering units print program, a contact output operate program, a test dead computer system program and a time program.

The alarm and thermocouple check programs, data logging program, and miscellaneous programs are more fully discussed in the aforementioned copending application Ser. No. 82,470, Section D9 to Section D11, pages 204 to 210.

The program system described in Section D herein substantially embraces that described in the corresponding section of application Ser. No. 82,470. Contained herein is the description of a preferred embodiment of an increment thereto giving rise to an enhanced monitoring and control capability.

Here again the detailed flowchart corresponding to the dual fuel subsystem control program printout does have certain differences from certain aspects of the described flowchart. The list of programs do provide for an essential implementation of the subject matter described herein.

Most developed system software may be characterized with relatively minor faults known as bugs which sometimes take long periods of time to detect and/or diagnose. Ordinarily the correction of such faults is within the skill of control and system programmers. The program listing which follows accordingly may be expected to contain some faults of this kind but all such faults which have been detected have required only programmer's skill for correction in field applications.

```
6534                            EJE                                              BLKS 66-86
6535                                                 ******************************
6536                                                 * FUEL TRANSFER RAMP GENERATOR *
6537                                                 ******************************
6540
6541
6542                                 ****************************** HIGH LIMIT SETTER LOGIC
6543                            NOT MIX
                                DLE -MIX/MIX+1*1
        17076  32 1 373         ENL MIX
        17077  13 0 364         EOR -0)
6544                            AS1 TMP1
        17100  37 1 376         STL TMP1,
6545
```

```
6546                              NOT GAS
                                  DLE -GAS/GAS+1*1
            17101  32 1 370       ENL GAS
            17102  13 0 364       EOR -0)
6547                              AS1 TMP2
            17103  37 1 366       STL TMP2,
6550
6551                              ANN 2,AL,RGRHI
                                  DLE -AL/AL+1*1
                                  DLE 10-2
            17104  12 1 342   .   AND RGRHI
6552                              ORR 2,AL,NOT4
                                  DLE -AL/AL+1*1
            17105  36 1 367       RJP IORSUB
                                  DLE 10-2
            17106     11263       OCT NOT4
            17107     00000       OCT 0
6553                              ANN 3,AL,TMP1,TMP2
                                  DLE -AL/AL+1*1
                                  DLE 10-3
            17110  12 1 366       AND TMP2
            17111  12 1 376       AND TMP1
6554                              AS1 TMP3
            17112  37 1 363       STL TMP3,
6555
6556                              NOT 639GN
                                  DLE -639GN/639GN+1*1
            17113  32 1 341   .   ENL 639GN
            17114  13 0 364       EOR -0)
6557                              ANN 3,AL,GAS,52GA
                                  DLE -AL/AL+1*1
                                  DLE 10-3
            17115  12 1 356       AND 52GA
            17116  12 1 370       AND GAS
6560                              ORR 2,AL,TMP3
                                  DLE -AL/AL+1*1
            17117  36 1 367       RJP IORSUB
                                  DLE 10-2
            17120     10702       OCT TMP3
            17121     00000       OCT 0
6561                              AS1 HL100
            17122  37 1 340   .   STL HL100,
6562
6563                              IFF AL,FALSE,LABL40
                                  DLE -AL/AL+1*1
                                  DLE FALSE*1
            17123  27 0 125       PJP LABL40
                                  DLE 1-FALSE*2
6564        17124  32 1 337   .   AL1 100PCT            ALL OIL
                                  ENL 100PCT,
6565        17125  36 1 336   .   RJP HLRNOS
6566
6567
6570                              ************************************ LOW LIMIT SETTER LOGIC
6571               17126    LABL40 SYN L
                                  NOT 52GA
                                  DLE -52GA/52GA+1*1
            17126  32 1 356       ENL 52GA
            17127  13 0 364       EOR -0)
6572                              ORR 2,AL,TMP1
                                  DLE -AL/AL+1*1
            17130  36 1 367       RJP IORSUB
                                  DLE 10-2
            17131     10700       OCT TMP1
            17132     00000       OCT 0
6573                              AS1 TMP3
            17133  37 1 363       STL TMP3,
6574
6575                              ANN 2,RLTLO,GAS
                                  DLE -RLTLO/RLTLO+1*1
            17134  32 1 335   .   ENL RLTLO
                                  DLE 10-2
            17135  12 1 370       AND GAS
6576                              ORR 2,AL,NOT4
                                  DLE -AL/AL+1*1
            17136  36 1 367       RJP IORSUB
                                  DLE 10-2
            17137     11263       OCT NOT4
            17140     00000       OCT 0
6577                              ANN 3,AL,GAS,TMP3
                                  DLE -AL/AL+1*1
                                  DLE 10-3
            17141  12 1 363       AND TMP3
            17142  12 1 370       AND GAS
6600                              AS1 TMP3
            17143  37 1 363       STL TMP3,
6601
6602                              NOT 639DN
                                  DLE -639DN/639DN+1*1
```

```
         17144  32 1 334  .    ENL 639DN
         17145  13 0 364       EOR -0)
6603                           ANN 3,AL,TMP2,52GA
                               DLE -AL/AL+1*1
                               DLE 10-3
         17146  12 1 356       AND 52GA
         17147  12 1 366       AND TMP2
6604                           ORR 2,AL,TMP3
                               DLE -AL/AL+1*1
         17150  36 1 367       RJP IORSUB
                               DLE 10-2
         17151     10702       OCT TMP3
         17152     00000       OCT 0
6605                            AS1 HLZRO
         17153  37 1 333  .    STL HLZRO,
6606
6607                           IFF AL,FALSE,LABL41
                               DLE -AL/AL+1*1
                               DLE FALSE*1
         17154  27 0 156       PJP LABL41
                               DLE 1-FALSE*2
6610                           AL1 ZROPCT                ALL GAS
         17155  32 1 332  .    ENL ZROPCT,
6611     17156  36 1 336       RJP HLRNOS
6612
6613           17157   LABL41  SYN L
6614                           NOT HL100
                               DLE -HL100/HL100+1*1
         17157  32 1 340       ENL HL100
         17160  13 0 364       EOR -0)
6615                           AS1 TMP3
         17161  37 1 363       STL TMP3,
6616
6617                           NOT HLZRO
                               DLE -HLZRO/HLZRO+1*1
         17162  32 1 333       ENL HLZRO
         17163  13 0 364       EOR -0)
6620                           ANN 2,AL,TMP3
                               DLE -AL/AL+1*1
                               DLE 10-2
         17164  12 1 363       AND TMP3
6621                           AS1 HLCALC            IF SET - CALLING FOR A TRANSFER
         17165  37 1 331  .    STL HLCALC,
6622
6623                           IFF AL,FALSE,NOGOOD
                               DLE -AL/AL+1*1
                               DLE FALSE*1
         17166  27 0 214       PJP NOGOOD
                               DLE 1-FALSE*2
6624     17167  32 0 330  .    BENL 1001)       IS CSO G.T. 0.6 VOLTS (1000 ADC)
6625     17170  11 1 327  .    SUB FULIND
6626                           IFF AL,FALSE,NOGOOD    NO
                               DLE -AL/AL+1*1
                               DLE FALSE*1
         17171  27 0 214       PJP NOGOOD
                               DLE 1-FALSE*2
6627                           CPS 5VLTS),FULIND   YES - IS IT L.T. OR = TO 5 VLTS (10000 ADC)
         17172  32 1 327       ENL FULIND
         17173  11 0 326  .    SUB 5VLTS)
6630                           IFF AL,FALSE,NOGOOD    NO
                               DLE -AL/AL+1*1
                               DLE FALSE*1
         17174  27 0 214       PJP NOGOOD
                               DLE 1-FALSE*2
6631                                                YES - CALCULATE MIN. GAS AND OIL SETTINGS
6632                           AL1 PT6VLT)
         17175  32 0 325  .    ENL PT6VLT),
6633     17176  16 1 324  .    RSH ACC
6634     17177  16 1 324       RSH ACC                   B24
6635     17200  36 1 323  .    RJP DIVIDE
6636     17201     17213       OCT LPROD
6637     17202     11734       OCT FULIND                B12
6640     17203     17214       OCT REMAIM
6641                           RSF 5                     B7
         17204  05 0 322  .    EDR 5)
         17205  36 1 321  .    RJP RSHSUB
6642                           AS1 LOLIM             LOW LIMIT
         17206  37 1 320  .    STL LOLIM,
6643                           AL1 100PCT
         17207  32 1 337       ENL 100PCT,
6644     17210  11 1 320       SUB LOLIM
6645                           AS1 HILIM             HIGH LIMIT = 100PCT-LOLIM
         17211  37 1 317  .    STL HILIM,
                               JPT NOGOOD
6646     17212  24 0 214       JMP NOGOOD
6647     17213     00000  LPROD  OCT 0
```

```
6650    17214    00000    REMAIM  OCT 0
6651
6652                              ********************************** DESIRED VALUE SETTER
6653             17215    NOGOOD  SYN L
                                  IFF TMP2,FALSE,LABL43        TMP2 = NOT GAS
6654                              DLE -TMP2/TMP2+1*1
        17215    32 1 366         ENL TMP2
                                  DLE FALSE*1
        17216    27 0 221         PJP LABL43
                                  DLE 1-FALSE*2
6655                              XFR 100PCT,SETPT    SET POINT IS AT ALL OIL (177)
        17217    32 1 337         ENL 100PCT
        17220    37 1 316         STL SETPT
6656                              JPT LABL45
        17221    24 0 236         JMP LABL45
6657
6660             17222    LABL43  SYN L
6661                              ANN 2,MIX,52GA
                                  DLE -MIX/MIX+1*1
        17222    32 1 373         ENL MIX
                                  DLE 10-2
        17223    12 1 356         AND 52GA
                                  AS1 TMP3
6662
        17224    37 1 363         STL TMP3,
6663                              IFF AL,FALSE,LABL44
                                  DLE -AL/AL+1*1
                                  DLE FALSE*1
        17225    27 0 230         PJP LABL44
                                  DLE 1-FALSE*2
6664                              XFR OPSLCT,SETPT    SET POINT IS AT OPERATORS SELECTED VALUE
        17226    32 1 315         ENL OPSLCT
        17227    37 1 316         STL SETPT
6665                              JPT LABL45
        17230    24 0 236         JMP LABL45
6666
6667             17231    LABL44  SYN L
6670                              NOT TMP3
                                  DLE -TMP3/TMP3+1*1
        17231    32 1 363         ENL TMP3
        17232    13 0 364         EOR -0)
6671                              ANN 2,AL,GAS
                                  DLE -AL/AL+1*1
                                  DLE 10-2
        17233    12 1 370         AND GAS
6672                              IFF AL,FALSE,LABL45
                                  DLE -AL/AL+1*1
                                  DLE FALSE*1
        17234    27 0 236         PJP LABL45
                                  DLE 1-FALSE*2
6673                              XFR ZROPCT,SETPT    SET POINT IS AT ALL GAS (0)
        17235    32 1 332         ENL ZROPCT
        17236    37 1 316         STL SETPT
6674
6675                              EJE
6676                              ********************************** HIGH LIMIT COMPARATOR LOGIC
6677             17237    LABL45  SYN L
6700                              AL1 HILIM
        17237    32 1 317         ENL HILIM,
6701    17240    20 0 241         ZJP L+2
6702                              JPT GOBCK
        17241    24 0 242         JMP GOBCK
6703                              IFF AL,FALSE,SPECOM   IF HILIM=+0,DO SPECIAL COMPARE
                                  DLE -AL/AL+1*1
                                  DLE FALSE*1
        17242    27 0 251         PJP SPECOM
                                  DLE 1-FALSE*2
6704                      GOBCK   CPR RAMP,HILIM,RGRHI,RLTHI,RGRHI     REGULAR COMPARE
        17243    32 1 314         ENL RAMP
        17244    11 1 317         SUB HILIM
        17245    36 1 313         RJP CPRSUB
        17246    11264            OCT RGRHI
        17247    11265            OCT RLTHI
        17250    11264            OCT RGRHI
6705                              JPT LOWCHK
        17251    24 0 257         JMP LOWCHK
6706                      SPECOM  CPR RAMP,HILIM,RGRHI,RLTHI,RLTHI     SPECIAL COMPARE
        17252    32 1 314         ENL RAMP
        17253    11 1 317         SUB HILIM
        17254    36 1 313         RJP CPRSUB
        17255    11264            OCT RGRHI
        17256    11265            OCT RLTHI
        17257    11265            OCT RLTHI
6707
6710                              ********************************** LOW LIMIT COMPARATOR LOGIC
6711             17260    LOWCHK  SYN L
6712                              CPS LOLIM,100PCT
        17260    32 1 337         ENL 100PCT
```

```
      17261  11 1 320        SUB LOLIM
6713  17262  20 0 271        ZJP SPECL           IF HILIM=177,DO SPECIAL COMPARE
6714                         CPR RAMP,LOLIM,RGRLO,RLTLO,RLTLO      REGULAR COMPARE
      17263  32 1 314        ENL RAMP
      17264  11 1 320        SUB LOLIM
      17265  36 1 313        RJP CPRSUB
      17266     11266        OCT RGRLO
      17267     11267        OCT RLTLO
      17270     11267        OCT RLTLO
6715                         JPT SPTCHK
      17271  24 0 277        JMP SPTCHK
6716                  SPECL  CPR RAMP,LOLIM,RGRLO,RLTLO,RGRLO      SPECIAL COMPARE
      17272  32 1 314        ENL RAMP
      17273  11 1 320        SUB LOLIM
      17274  36 1 313        RJP CPRSUB
      17275     11266        OCT RGRLO
      17276     11267        OCT RLTLO
      17277     11266        OCT RGRLO
6717
6720                         ******************************** DESIRED VALUE LOGIC
6721         17300    SPTCHK SYN L
6722                         AL1 RAMP
      17300  32 1 314        ENL RAMP,
6723  17301  11 1 316        SUB SETPT
6724  17302  20 0 377        ZJP PROCED
6725  17303  27 0 304        PJP L+2
6726                         NOT AL
                             DLE -AL/AL+1*1
      17304  13 0 364        EOR -0)
6727  17305  11 1 312        SUB RMPSTP
6730                         IFF AL,FALSE,PROCED
                             DLE -AL/AL+1*1
                             DLE FALSE*1
      17306  27 0 377        PJP PROCED
                             DLE 1-FALSE*2
6731                         XFR SETPT,RAMP
      17307  32 1 316        ENL SETPT
      17310  37 1 314        STL RAMP
6732                         JPT PROCED
      17311  24 0 377        JMP PROCED
      17312     11113        WRD
      17313     36435        WRD
      17314     11077        WRD
      17315     11112        WRD
      17316     10722        WRD
      17317     10720        WRD
      17320     10721        WRD
      17321     36442        WRD
      17322     00005        WRD
      17323     00204        WRD
      17324     00101        WRD
      17325     01000        WRD
      17326     10000        WRD
      17327     11734        WRD
      17330     01001        WRD
      17331     10715        WRD
      17332     11111        WRD
      17333     10714        WRD
      17334     11421        WRD
      17335     11267        WRD
      17336     17502        WRD
      17337     11110        WRD
      17340     10713        WRD
      17341     11415        WRD
      17342     11264        WRD
      17343     11620        WRD
      17344     11221        WRD
      17345     11162        WRD
      17346     11601        WRD
      17347     10712        WRD
      17350     10704        WRD
      17351     11157        WRD
      17352     11275        WRD
      17353     36424        WRD
      17354     00075        WRD
      17355     10703        WRD
      17356     11442        WRD
      17357     11373        WRD
      17360     11603        WRD
      17361     11227        WRD
      17362     11277        WRD
      17363     10702        WRD
      17364     37777        WRD
      17365     11317        WRD
      17366     10701        WRD
      17367     36406        WRD
      17370     11207        WRD
```

```
        17371    11274            WRD
        17372    11602            WRD
        17373    11247            WRD
        17374    36461            WRD
        17375    11276            WRD
        17376    10700            WRD
6733                               BORG BLOCK+6400
6734                      PROCED CPR RAMP,SETPT,RGRSP,RLTSP,TMP1
        17400   32 1 377  .       ENL RAMP
        17401   11 1 376  .       SUB SETPT
        17402   36 1 375  .       RJP CPRSUB
        17403    11270            OCT RGRSP
        17404    11271            OCT RLTSP
        17405    10700            OCT TMP1
6735
6736
6737                                             CHECK TO SEE IF RAMP SHOULD BE INCREMENTED
6740                              ANN 3,639DN,RLTHI,RLTSP
                                  DLE -639DN/639DN+1*1
        17406   32 1 374  .       ENL 639DN
                                  DLE 10-3
        17407   12 1 373  .       AND RLTSP
        17410   12 1 372  .       AND RLTHI
6741                              AS1 INCRMP
        17411   37 1 371  .       STL INCRMP,
6742
6743                                             CHECK TO SEE IF RAMP SHOULD BE DECREMENTED
6744                              ANN 3,639GN,RGRLO,RGRSP
                                  DLE -639GN/639GN+1*1
        17412   32 1 370  .       ENL 639GN
                                  DLE 10-3
        17413   12 1 367  .       AND RGRSP
        17414   12 1 366  .       AND RGRLO
6745                              AS1 DECRMP
        17415   37 1 365  .       STL DECRMP,
6746
6747
6750                                             SEE IF RAMP SHOULD BE SET TO HI OR LO LIMIT
6751                              IFF RGRHI,FALSE,LABL47
                                  DLE -RGRHI/RGRHI+1*1
        17416   32 1 364  .       ENL RGRHI
                                  DLE FALSE*1
        17417   27 0 021          PJP LABL47
                                  DLE 1-FALSE*2
6752                              XFR HILIM,RAMP
        17420   32 1 363  .       ENL HILIM
        17421   37 1 377          STL RAMP
6753
6754             17422    LABL47 SYN L
6755                              IFF RLTLO,FALSE,LABL48
                                  DLE -RLTLO/RLTLO+1*1
        17422   32 1 362  .       ENL RLTLO
                                  DLE FALSE*1
        17423   27 0 025          PJP LABL48
                                  DLE 1-FALSE*2
6756                              XFR LOLIM,RAMP
        17424   32 1 361  .       ENL LOLIM
        17425   37 1 377          STL RAMP
6757
6760
6761                                             NOW IMPLEMENT BOX THAT EITHER INCREMENTS OR
6762                                             DECREMENTS RAMP
6763             17426    LABL48 SYN L
6764                              IFF INCRMP,FALSE,LABL49
                                  DLE -INCRMP/INCRMP+1*1
        17426   32 1 371          ENL INCRMP
                                  DLE FALSE*1
        17427   27 0 033          PJP LABL49
                                  DLE 1-FALSE*2
6765                              SUM RAMP,RMPSTP
        17430   32 1 377          ENL RAMP
        17431   10 1 360  .       ADD RMPSTP
        17432   37 1 377          STL RAMP
6766                              JPT LABL50
        17433   24 0 040          JMP LABL50
6767
6770             17434    LABL49 SYN L
6771                              IFF DECRMP,FALSE,LABL50
                                  DLE -DECRMP/DECRMP+1*1
        17434   32 1 365          ENL DECRMP
                                  DLE FALSE*1
        17435   27 0 040          PJP LABL50
                                  DLE 1-FALSE*2
6772                              AL1 RAMP
        17436   32 1 377          ENL RAMP,
6773    17437   11 1 360          SUB RMPSTP
```

```
6774                                AS1 RAMP
         17440  37 1 377            STL RAMP,
6775
6776                                          CHECK TO SEE IF RAMP=100PCT(177) OR ZROPCT(0)
6777            17441    LABL50 SYN L
7000                                CPS RAMP,128)       IS RAMP G.T. 177
         17441  32 0 357  .         ENL 128)
         17442  11 1 377            SUB RAMP
7001                                IFF AL,FALSE,LTZRO  NO
                                    DLE -AL/AL+1*1
                                    DLE FALSE*1
         17443  27 0 046            PJP LTZRO
                                    DLE 1-FALSE*2
7002                                AL1 100PCT          YES - SET IT TO 177
         17444  32 1 356  .         ENL 100PCT,
7003                                AS1 RAMP
         17445  37 1 377            STL RAMP,
7004                                JPT GOBACK
         17446  24 0 053            JMP GOBACK
7005            17447    LTZRO  SYN L
7006                                CPS -0),RAMP        IS RAMP L.T. +0
         17447  32 1 377            ENL RAMP
         17450  11 0 355  .         SUB -0)
7007                                IFF AL,FALSE,GOBACK NO
                                    DLE -AL/AL+1*1
                                    DLE FALSE*1
         17451  27 0 053            PJP GOBACK
                                    DLE 1-FALSE*2
7010                                AL1 ZROPCT          YES - SET IT TO +0
         17452  32 1 354  .         ENL ZROPCT,
7011                                AS1 RAMP
         17453  37 1 377            STL RAMP,
7012            17454    GOBACK SYN L
7013                                AL1 RAMP
         17454  32 1 377            ENL RAMP,
7014     17455  11 1 356            SUB 100PCT
7015     17456  20 0 060            ZJP CLEAR1
7016                                MAK RMPNH,TRUE
                                    DLE TRUE*1
                                    DLE 1-TRUE*1
         17457  03 1 353  .         SMB RMPNH
7017                                JPT L+2
         17460  24 0 061            JMP L+2
7020            17461    CLEAR1 SYN L
7021                                MAK RMPNH,FALSE
                                    DLE FALSE*1
         17461  02 1 353            CMB RMPNH
                                    DLE 1-FALSE*1
7022                                AL1 RAMP
         17462  32 1 377            ENL RAMP,
7023     17463  11 1 354            SUB ZROPCT
7024     17464  20 0 066            ZJP CLEAR2
7025                                MAK RMPNZ,TRUE
                                    DLE TRUE*1
                                    DLE 1-TRUE*1
         17465  03 1 352  .         SMB RMPNZ
7026                                JPT LABL51
         17466  24 0 067            JMP LABL51
7027            17467    CLEAR2 SYN L
7030                                MAK RMPNZ,FALSE
                                    DLE FALSE*1
         17467  02 1 352            CMB RMPNZ
                                    DLE 1-FALSE*1
7031
7032
7033                                ********************************************* DIGITAL POT
7034            17470    LABL51 SYN L
7035                                AL1 CCOREG
         17470  32 1 351  .         ENL CCOREG,
7036                                AS1 DIGREG
         17471  37 0 100            STL DIGREG,
7037                                AL1 RAMP
         17472  32 1 377            ENL RAMP,
7040     17473  05 0 350  .         EOR 7)
7041     17474  36 1 347  .         RJP LSHSUB
7042     17475  13 0 077            EOR L+2
7043     17476  36 1 346  .         RJP CCOENT
7044     17477  37600               OCT 37600           BITS TO BE CHANGED
7045     17500  00000    DIGREG OCT **                  ACTUAL REGISTER
7046                                JPT BLOC89
         17501  24 0 106            JMP BLOC89
7047
7050
7051                                          STORE ACC IN HILIM,LOLIM, AND RAMP.
7052     17502  00000    HLRNOS ...
7053                                AS1 HILIM
         17503  37 1 363            STL HILIM,
```

```
7054              17504  37 1 361        AS1 LOLIM
                                         STL LOLIM,
7055                                     AS1 RAMP
                  17505  37 1 377        STL RAMP,
7056              17506  24 1 102        RTN
7057                                     EJE
7060                                              THIS ENDS THE RAMP GENERATION SECTION.
```

I claim:

1. A gas turbine electric power plant comprising a gas turbine having a compressor and combustion and turbine elements, a generator having a field winding and being coupled to said gas turbine for drive power, a fuel system having plural subsystems for supplying one or more fuels to the gas turbine combustion elements, means for exciting said generator field winding, means for cooperatively operating each of said fuel subsystems to energize said turbine and for controlling said exciting means, a control system for developing one or more fuel system control signals, said control system including a digital computer, an input/output system therefor, and associated external circuit means, said circuit means comprising at least fuel system control signal ratioing means having one or more circuit parameters capable of continuous variation, means for operating said computer to determine a total fuel demand signal value and a time varying ratio of individual fuels necessary to continuously satisfy said total fuel demand while changing from operation on one of said fuels to operation on another of said fuels, and means for developing a fuel demand signal corresponding to said determined total fuel demand value and for applying said signal across said fuel signal ratioing means to derive individual control inputs to each of said plural fuel subsystem operating means.

2. A gas turbine electric power plant as set forth in claim 1 wherein said signal ratioing means comprises a digital potentiometer.

3. A gas turbine electric power plant as set forth in claim 2 wherein one of said plural fuel subsystems schedules a gaseous primary fuel and another of said plural subsystems schedules a liquid secondary fuel.

4. A gas turbine electric power plant as set forth in claim 3 wherein said computer operating means automatically initiates ratioing of said primary and said secondary fuel on partial or total failure of said primary fuel supply.

5. A gas turbine electric power plant as set forth in claim 3 wherein said plant further comprises an operator's control panel having plural fuel system operating mode selection means thereon for selecting operation on either said primary or said secondary fuel over a first interval of turbine operation, and for selecting automatic transfer to the other of said fuels on the occurrence of one or more predefined events.

6. A gas turbine electric power plant as set forth in claim 5 wherein said operator's control panel further provides means for indicating a desired ratio of primary and secondary fuels to sustain gas turbine operation over a second time interval and wherein automatic fuel mixing is provided on the occurrence of one or more predefined events.

7. An electric power plant as set forth in claim 1 wherein there are additionally provided a plurality of sensors disposed to monitor selected turbine parameters, said plurality of sensors comprising at least an arrangement of fuel pressure sensors, said plurality of sensors providing control system inputs representative of said turbine parameters and wherein said computer operating means determines said total fuel demand and said time varying ratio of individual fuels in response to time varying combinations of said sensor inputs, each of said combinations comprising at least an input from said fuel pressure sensors.

8. An electric power plant as set forth in claim 7 wherein said computer operating means operates to determine control actions for simultaneous implementation by said plural fuel subsystem operating means to maintain gas turbine operation over a predefined range of exhaust temperatures, over at least one interval of gas turbine operation.

9. An electric power plant as set forth in claim 8 wherein means are provided for detecting generator load and said computer operating means further provides for controlling said plural fuel subsystems operating means in response to detected load to regulate the generator load substantially to a predetermined value.

* * * * *